United States Patent
Zbinden

(10) Patent No.: US 11,125,956 B2
(45) Date of Patent: Sep. 21, 2021

(54) OPTICAL TRANSCEIVER WITH VERSATILE POSITIONING

(71) Applicant: SAMTEC, INC., New Albany, IN (US)

(72) Inventor: Eric Zbinden, New Albany, IN (US)

(73) Assignee: SAMTEC, INC., New Albany, IN (US)

( * ) Notice: Subject to any disclaimer, the term of this patent is extended or adjusted under 35 U.S.C. 154(b) by 0 days.

(21) Appl. No.: 16/650,080

(22) PCT Filed: Sep. 24, 2018

(86) PCT No.: PCT/US2018/052402
§ 371 (c)(1),
(2) Date: Mar. 24, 2020

(87) PCT Pub. No.: WO2019/060817
PCT Pub. Date: Mar. 28, 2019

(65) Prior Publication Data
US 2020/0292769 A1    Sep. 17, 2020

Related U.S. Application Data

(60) Provisional application No. 62/562,447, filed on Sep. 24, 2017, provisional application No. 62/639,970, filed on Mar. 7, 2018.

(51) Int. Cl.
*G02B 6/42* (2006.01)
*H04B 10/25* (2013.01)
*H04B 10/40* (2013.01)

(52) U.S. Cl.
CPC ......... *G02B 6/4278* (2013.01); *G02B 6/4246* (2013.01); *G02B 6/4269* (2013.01);
(Continued)

(58) Field of Classification Search
CPC ..... G02B 6/4278; G02B 6/4283; G02B 6/425
See application file for complete search history.

(56) References Cited

U.S. PATENT DOCUMENTS 6,081,027 A    6/2000  Akram
6,142,802 A *  11/2000 Berg ................... H01R 12/57
                                                    385/75
(Continued)

FOREIGN PATENT DOCUMENTS

JP     2012-134178 A    7/2012

OTHER PUBLICATIONS

Flexible assemblies allow PCB innovation—Electronic Products, article posted online on May 7, 2010, https://www.electronicproducts.com/Interconnections/Connectors/Flexible_assemblies_allow_PCB_innovation.aspx, retrieved from the internet Sep. 25, 2017.
(Continued)

*Primary Examiner* — Sung H Pak
(74) *Attorney, Agent, or Firm* — BakerHostetler

(57) ABSTRACT

An optical transceiver can include a transmitter and a receiver. The optical transceiver is configured to mate with an electrical connector in first and second orientations that are opposite each other. In certain examples, a thermally conductive surface of the transceiver is configured to be placed in thermal communication with a heat dissipation member in one or both of the first and second orientations. Further examples of optical transceivers can be mounted to a base and placed in electrical communication with an electrical connector. A lid provides a compressive force that simultaneously makes electrical contact between the transceiver and a host printed circuit board (PCB) and provides a low impedance heat transfer path to dissipate heat generated during transceiver operation.

21 Claims, 24 Drawing Sheets

(52) U.S. Cl.
CPC ........... *G02B 6/4283* (2013.01); *H04B 10/25* (2013.01); *H04B 10/40* (2013.01); *G02B 6/428* (2013.01)

(56) References Cited

U.S. PATENT DOCUMENTS

| | | |
|---|---|---|
| 6,325,552 B1 | 12/2001 | Brillhart |
| 6,592,269 B1 | 7/2003 | Brophy et al. |
| 6,644,980 B2 | 11/2003 | Kameda |
| 6,705,769 B2 | 3/2004 | Brezina et al. |
| 6,940,723 B2 | 9/2005 | Ice et al. |
| 7,314,377 B2 | 1/2008 | Northey et al. |
| 7,329,054 B1 | 2/2008 | Epitaux et al. |
| 8,047,856 B2 | 11/2011 | McColloch |
| 8,351,794 B2 | 1/2013 | Meadowcroft et al. |
| 8,588,561 B2 | 11/2013 | Zbinden et al. |
| 9,419,380 B2 | 8/2016 | Sharf et al. |
| 9,494,750 B2 * | 11/2016 | Lee ................ G02B 6/4284 |
| 9,641,254 B1 | 5/2017 | Shen et al. |
| 9,735,484 B2 | 8/2017 | Brubaker et al. |
| 2004/0192091 A1 | 9/2004 | Yunker et al. |
| 2005/0013560 A1 | 1/2005 | Mazotti et al. |
| 2006/0270283 A1 | 11/2006 | Kumazawa et al. |
| 2007/0009213 A1 | 1/2007 | Meadowcroft et al. |
| 2010/0171023 A1 | 7/2010 | Asahi et al. |

OTHER PUBLICATIONS

Samtec, Ultra Micro Low Speed Optical Flyover, Low Profile Active Optical System (LPO Series), Performance Characteristics page, Aug. 2015.

\* cited by examiner

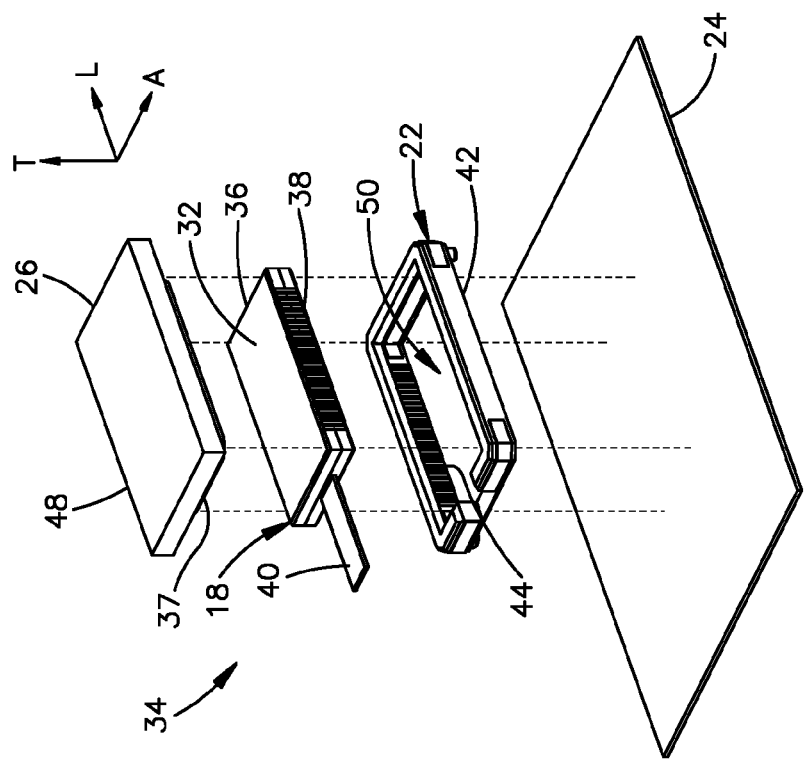
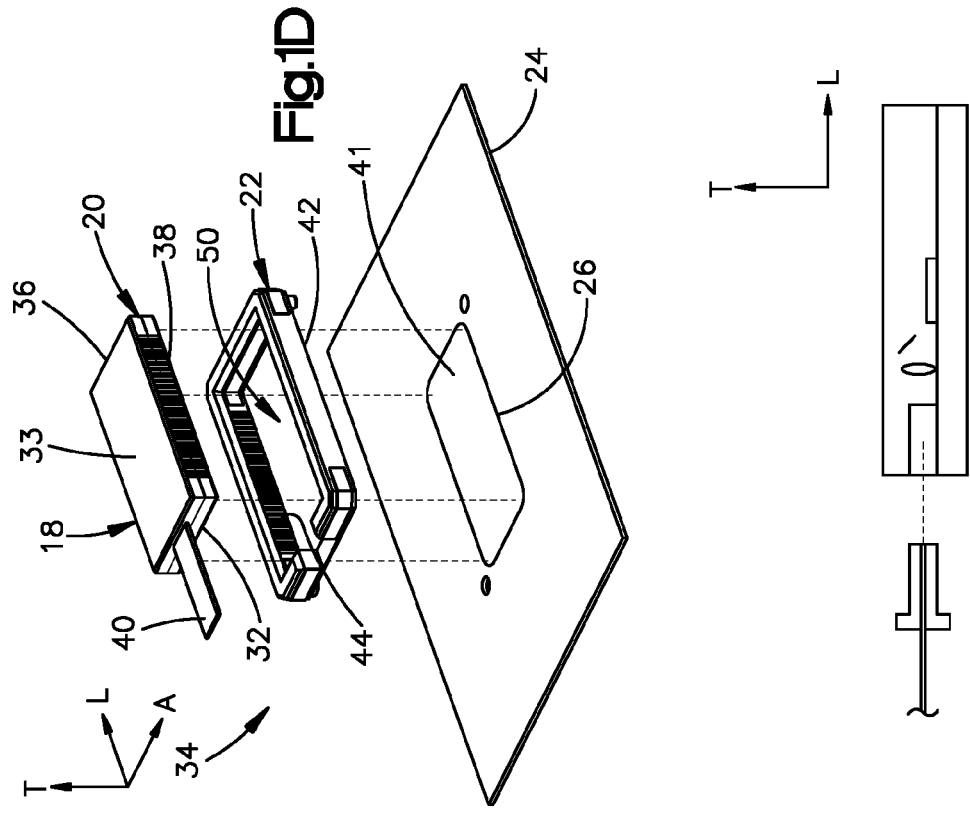
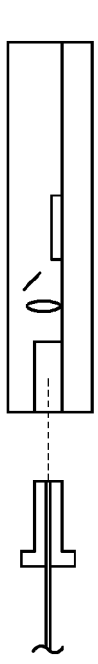

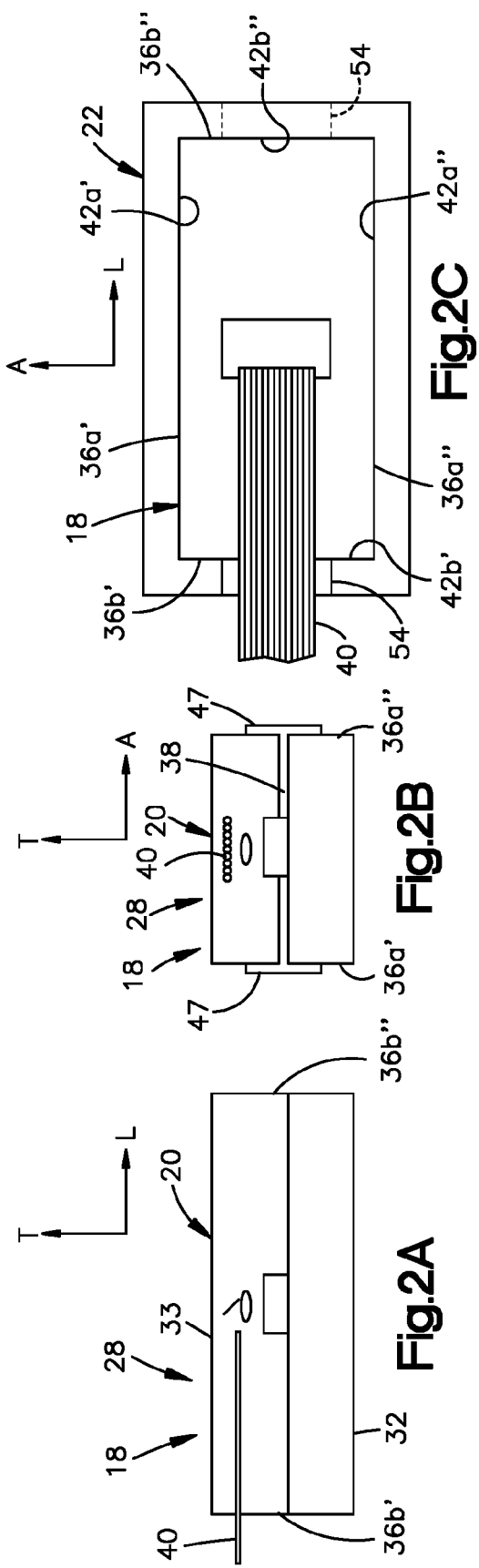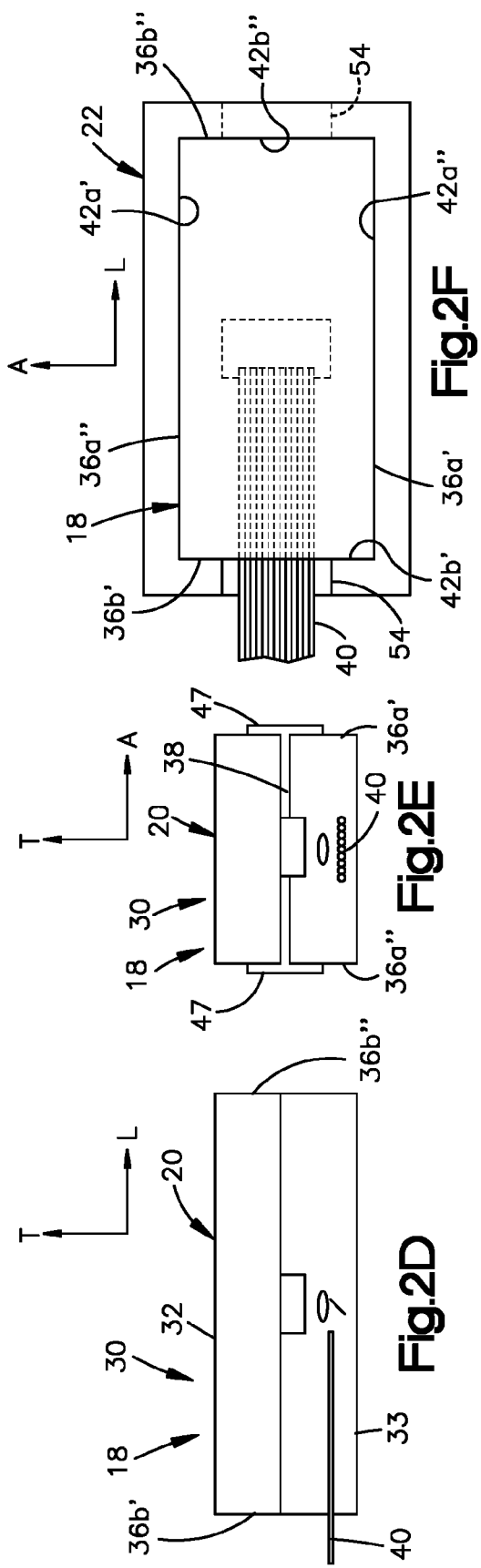

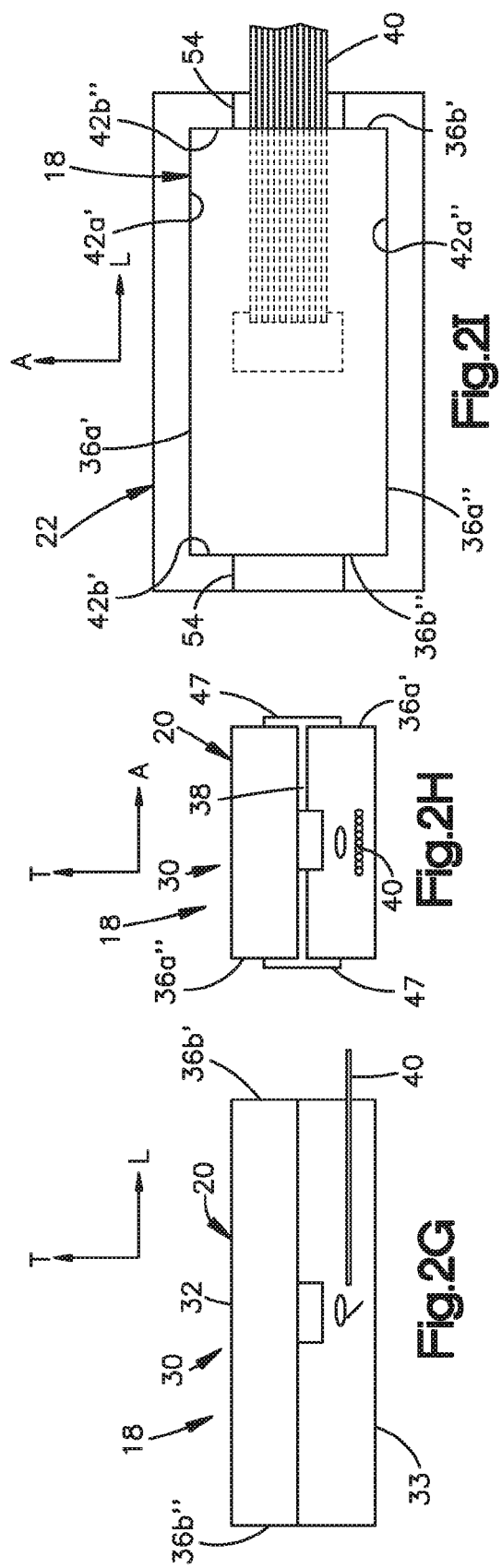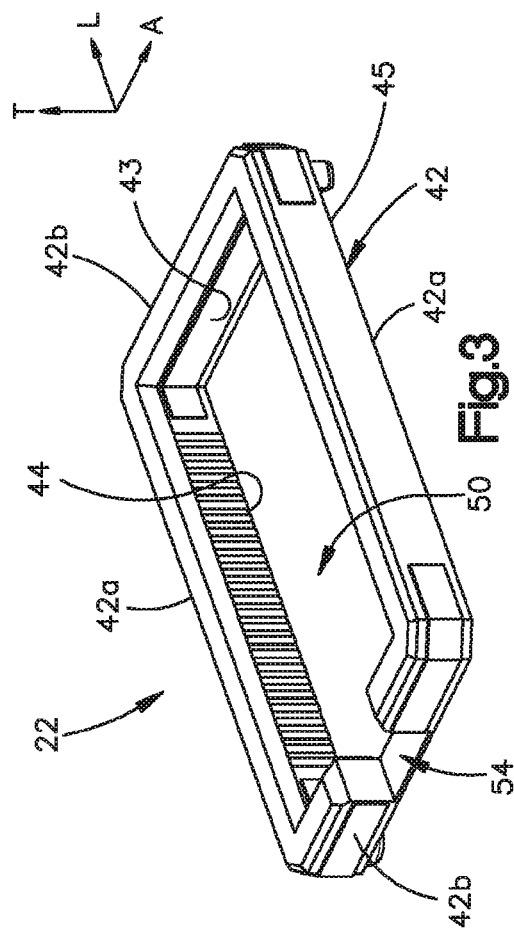

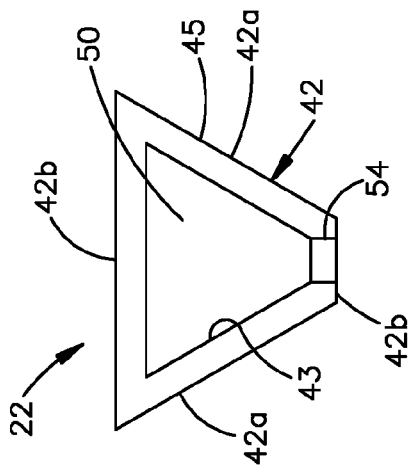
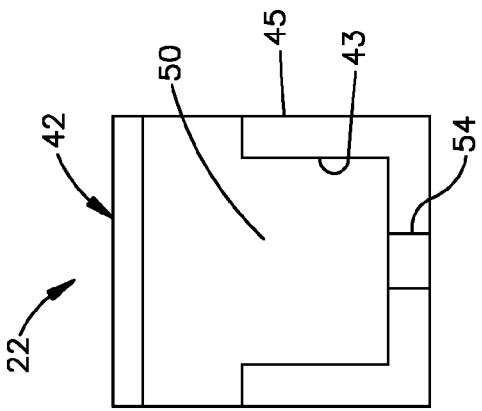
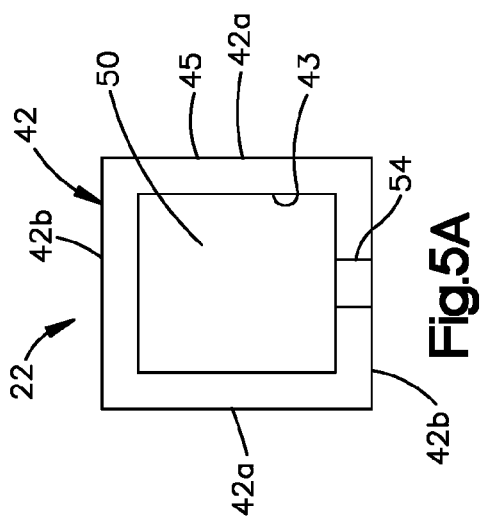
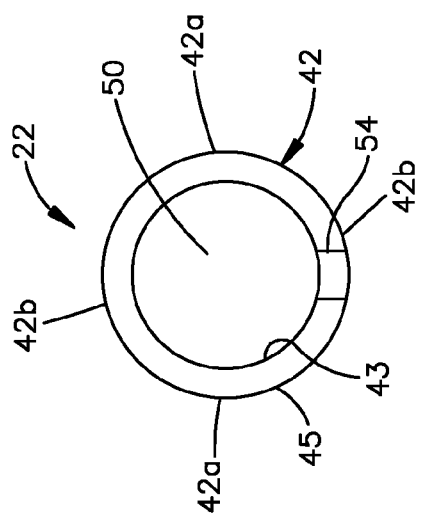

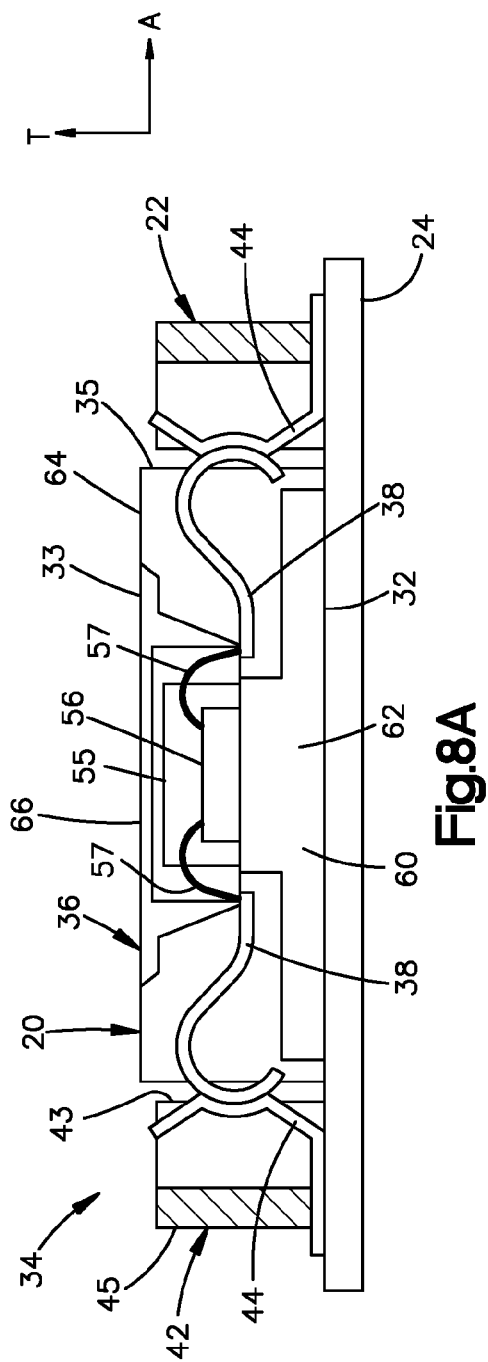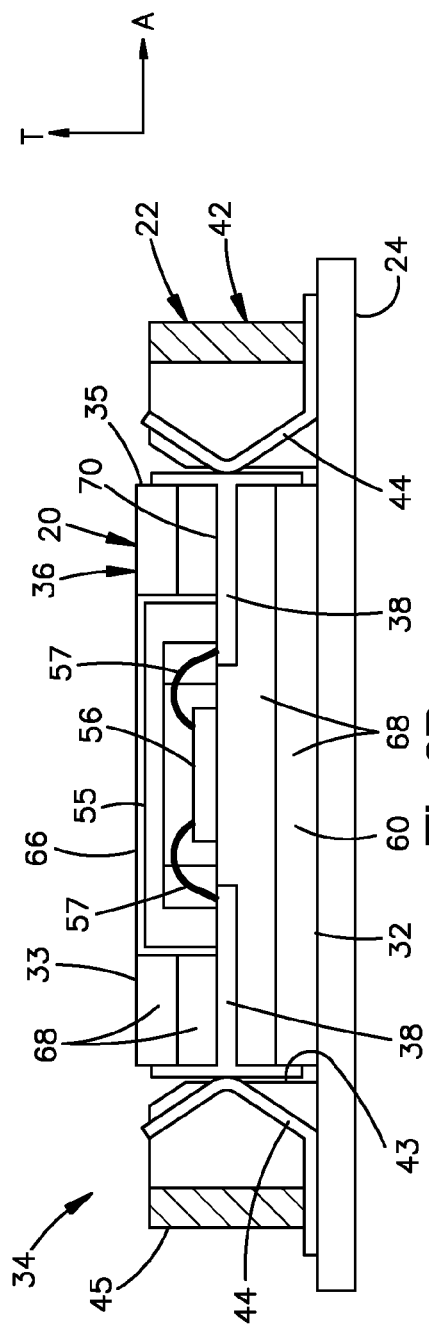

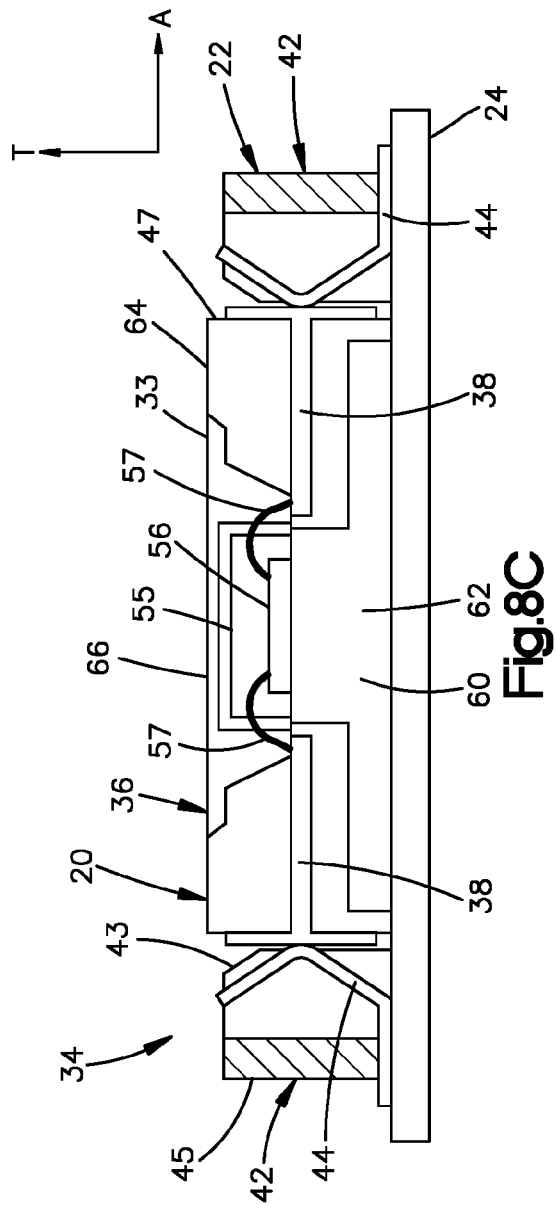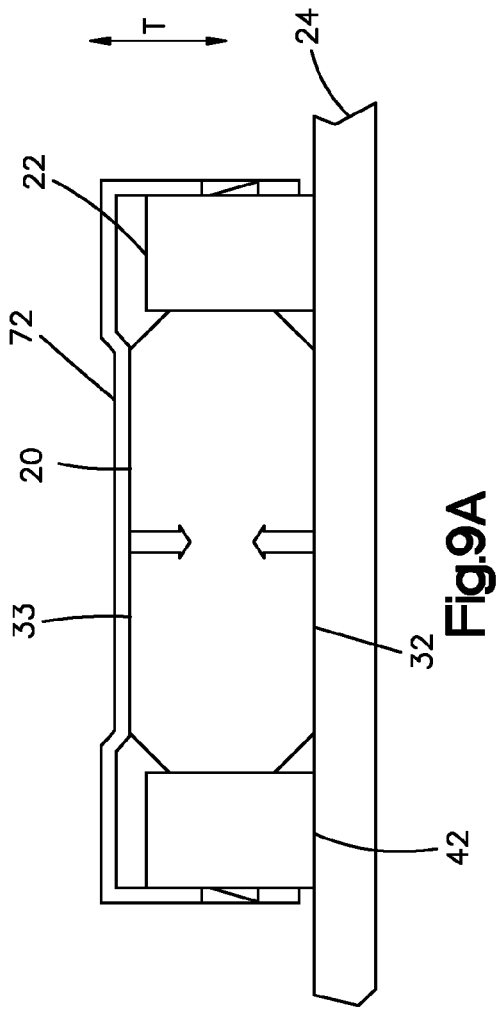

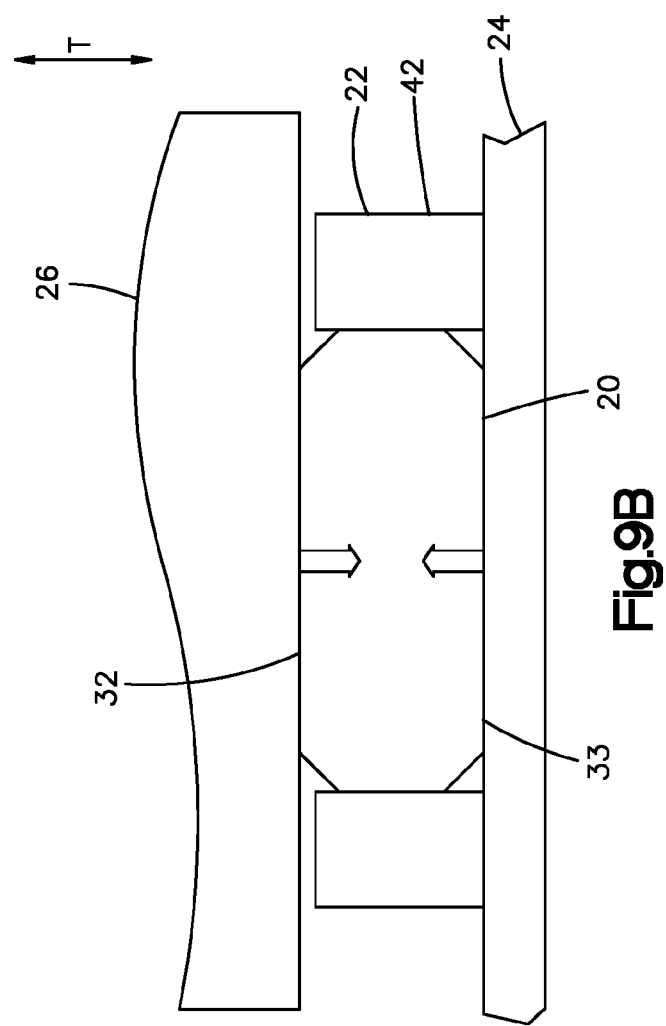

OPTICAL TRANSCEIVER WITH VERSATILE POSITIONING

CROSS-REFERENCE TO RELATED APPLICATIONS

This application is the National Stage Application of International Patent Application No. PCT/US2018/052402 filed Sep. 24, 2018, which claims priority to U.S. Provisional Patent Application Ser. No. 62/562,447 filed Sep. 24, 2017, and further claims priority to U.S. Provisional Patent Application Ser. No. 62/639,970 filed Mar. 7, 2018, the disclosure of each of which is hereby incorporated by reference as if set forth in its entirety herein.

BACKGROUND

The use of optical transceivers, instead of electrical interconnects, provides a significant gain in terms of bandwidth distance product and power dissipation reduction. Optical transceivers include optical fibers, one or more of which being configured as optical receive fibers that are configured to receive optical input signals, and one or more others of which being configured as optical transmit fibers that are configured to transmit optical output signals. Such transceivers further include electrical contacts, one or more of which being electrical receive contacts that are configured to receive electrical input signals, and one or more others of which being configured electrical transmit contacts that are configured to transmit electrical output signals. The electrical contacts of the transceiver are configured to mate with complementary electrical contacts of an electrical device, such as an electrical connector that is, in turn, mounted to an electrical component such as a substrate that can be configured as a printed circuit board (PCB).

Optical transceivers generally include an optical transmitter that receives the electrical input signals, and activates a light source to generate the optical output signals to the optical transmit fibers for use in a communication system. The optical output signals correspond to the received electrical input signals. The light source is typically a laser light source, such as a VCSEL (Vertical Cavity Surface Emitting Laser) or some other type of laser. The optical transmitter often includes an integrated circuit (IC) die that is configured as a driver that is electrically connected to the VCSEL and modulates the light output of the VCSEL. Unfortunately, VCSEL performance is degraded by operating at elevated temperatures. Depending on the type of VCSEL used, operating VCSELs at temperatures exceeding 70 C, 80 C, or 85 C may result in unacceptable VCSEL lifetime or electrical-to-optical conversion efficiency. Generally, the upper limit of the VCSEL operating temperature is significantly lower than the operating temperature limit of an IC, which may be situated adjacent the VCSEL. For example, the IC may have an operating temperature limit of 100 C. While the IC can withstand a higher operating temperature, it typically generates an order of magnitude more waste heat than the VCSEL. For example, in operation the IC may generate 2.0 W of waste heat while the VCSEL may only generate 0.1 W of waste heat.

Optical transceivers further generally include an optical receiver that receives the optical input signals, and converts the optical input signals to electrical output signals that correspond to the received optical input signals. The optical receiver typically includes one or more photodetectors that receive optical input signals, and convert the optical input signals to electrical signals that can have current levels proportional with the quantity of optical photons per unit time received in the optical signals. The optical receiver further typically includes a current-to-voltage converter, such as a transimpedance amplifier (TIA) that amplifies and convert the electrical current signals to voltage levels that are usable in data communication systems. The TIA is typically constructed as an integrated circuit (IC) die. The optical engine can be either a transmitter, a receiver, or both. Further, the transmitter can be mechanically separate from the receiver. Alternatively, the transmitter can be mechanically integrated with the receiver. The photodetectors are often configured as photodiodes that, as with the VCSELs, are adversely affected at high operating temperatures. The light source of the transmitter and photodiode of the receiver may generally be referred to as electro-optical elements, since they all are involved either with the conversion of an electrical signal to an optical signal or vice versa.

It is recognized that the performance of the electro-optical elements are adversely affected by high operating temperatures. Further, it is typically desirable to situate these components adjacent their respective TIA or driver that generates and/or receives high speed electrical signals. The high speed electrical signals may be analog or digital signals having communication rates greater than 10 Gpbs and in some cases significantly higher rates such as 28 Gpbs, 56 Gpbs, or even higher data rates. To maintain acceptable signal integrity on these high speed signals it is desirable to make the conductive electrical path between the IC and the optical elements as short as possible. A convenient, low cost method of making a conductive electrical path is with wire bonds that electrically connect conductive pads situated on the top of a TIA and/or driver integrated circuit and with conductive pads on an electro-optical element. Another convenient, low cost method of making a conductive electrical path between and IC and a electro-optical device is to flip chip the devices and connect them via impedance matched micro strips or striplines.

In operation, optical transceivers generate heat and thus typically are provided with heat dissipation systems. Thus, optical transceivers typically include one or more heat transport and, or dissipation members that are in thermal communication with one or more heat producing elements and transfer the heat to the periphery of the transceiver housing, which in turn is connected to a heat dissipation member or heat dissipation plate. Conventional transceiver design limits from which side or sides the heat can be removed from the transceiver, and in turn limits design options for integrating the optical transceiver into a communication system.

SUMMARY

In one example, an optical transceiver can include a transceiver housing that defines a first surface and a second surface opposite the first surface along a transverse direction. The optical transceiver can further include a plurality of electrical contacts supported by the transceiver housing. The optical transceiver can further include an optical engine supported by the transceiver housing and in electrical communication with respective ones of the electrical contacts. The electrical contacts are configured to be placed in electrical communication with a complementary electrical device both when the optical transceiver is selectively in a first orientation with respect to the electrical device, and when the optical transceiver is in a second orientation that is different than the first orientation, and wherein the complementary electrical device is configured to be placed in electrical communication with a host substrate.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 1D is an exploded perspective view of the communication system illustrated in FIG. 1A, but shown in still another configuration;

FIG. 1E is an exploded perspective view of the communication system illustrated in FIG. 1A, but shown in still another configuration;

FIG. 1F is an exploded perspective view showing an optical transceiver having a detachable optical fiber;

FIG. 2A is a schematic side elevation view of the transceiver of FIGS. 1A-1E, showing the transceiver in a first orientation;

FIG. 2B is a front elevation view of the transceiver illustrated in FIG. 2A

FIG. 2C is a schematic top view showing the transceiver illustrated in FIG. 2A mated with an electrical connector;

FIG. 2D is a schematic side elevation view showing the transceiver in a second orientation opposite the first orientation shown in FIG. 2A in one example;

FIG. 2E is a front elevation view of the transceiver illustrated in FIG. 2A;

FIG. 2F is a schematic top view showing the transceiver illustrated in FIG. 2A mated with an electrical connector;

FIG. 2G is a schematic side elevation view showing the transceiver in a second orientation opposite the first orientation shown in FIG. 2A in another example;

FIG. 2H is a front elevation view of the transceiver illustrated in FIG. 2G;

FIG. 2I is a schematic top view showing the transceiver illustrated in FIG. 2G mated with an electrical connector;

FIG. 3 is a perspective view of the electrical connector illustrated in FIGS. 1A-1E;

FIG. 5A is a schematic top plane view of the electrical connector illustrated in FIG. 3 in accordance with one example;

FIG. 5B is a schematic top plane view of the electrical connector illustrated in FIG. 3 in accordance with another example;

FIG. 5C is a schematic top plane view of the electrical connector illustrated in FIG. 3 in accordance with still another example;

FIG. 5D is a schematic top plane view of the electrical connector illustrated in FIG. 3 in accordance with yet another example;

FIG. 8A is a schematic sectional side elevation view of the transceiver illustrated in FIGS. 1A-1E in one example;

FIG. 8B is a schematic sectional side elevation view of the transceiver illustrated in FIGS. 1A-1E in another example;

FIG. 8C is a schematic sectional side elevation view of the transceiver illustrated in FIG. 8A, but having electrical contacts having mating ends as illustrated in FIG. 8B;

FIG. 9A is a schematic side elevation view of the communication system illustrated in FIGS. 1A-1E, showing the transceiver under compression in one example;

FIG. 9B is a schematic side elevation view of the communication system illustrated in FIGS. 1A-1E, showing the transceiver under compression in another example;

DETAILED DESCRIPTION

Figure 1A:
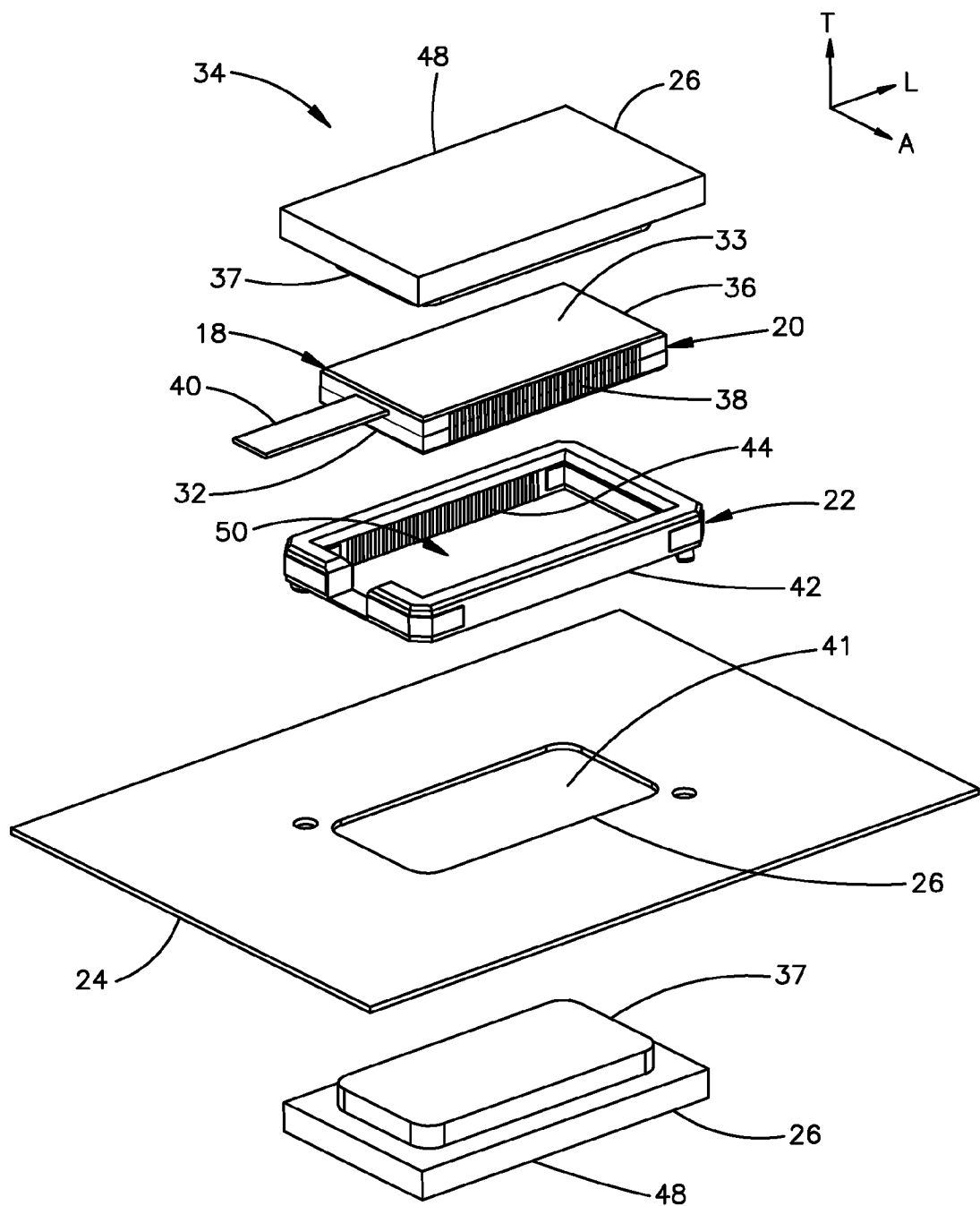
FIG. 1A is an exploded perspective view of a communication system constructed in accordance with one example including a transceiver, an electrical connector, a substrate, and at least one heat dissipation member.
Figure 1C:
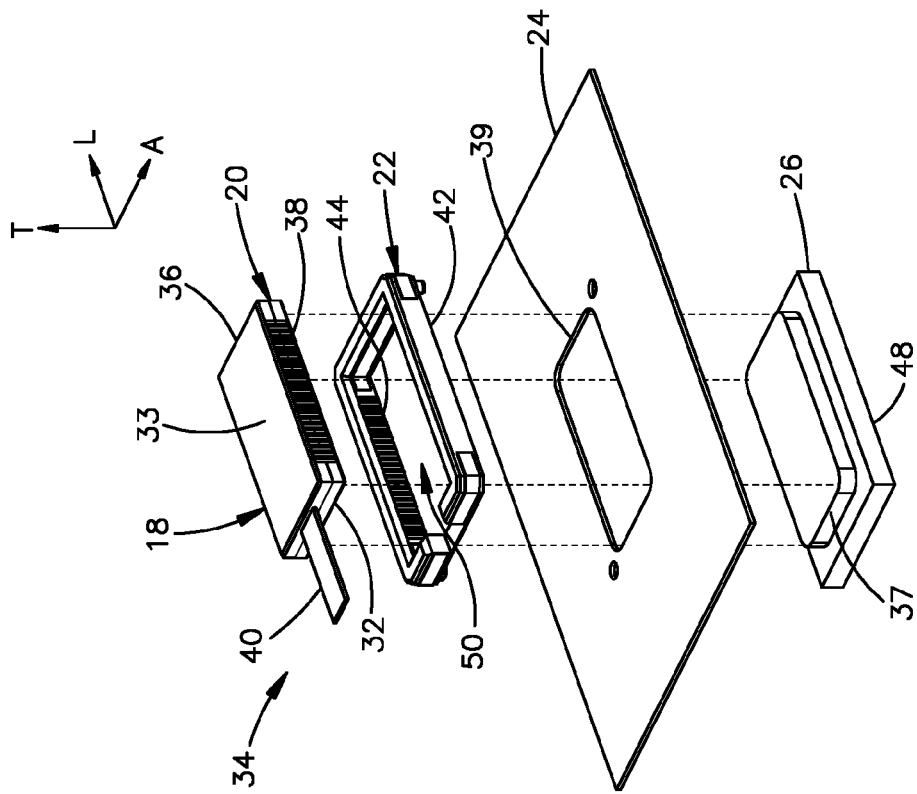
FIG. 1C is an exploded perspective view of the communication system illustrated in FIG. 1A, but shown in another configuration.

Referring to FIGS. 1A-2B, a transceiver 18 can be configured to mate with a complementary electrical device such as an electrical connector 22 that, in turn, is mounted to an underlying host substrate 24. Thus, the electrical connector 22 is placed in electrical communication with the host substrate 24. As used herein, the directional terms "upward," "above," and derivatives thereof refer to a direction away from the host substrate 24. The directional terms "downward," "below," and derivatives thereof refer to a direction toward the substrate. The upward direction and the downward direction can each be defined along a bidirectional transverse direction T. One aspect of the present disclosure recognizes that some applications are designed for the transceiver 18 to dissipate heat through a heat dissipation member 26 that is disposed below the transceiver 18 or through the host substrate 24. Other applications are designed for the transceiver to dissipate heat through a heat dissipation member 26 that is disposed above the transceiver 18. Thus, heat can be dissipated selectively in a first direction and in a second direction that is different than the first direction. For instance, the first and second directions can be opposite each other.

Instead of constructing first and second different transceivers that have upward-facing thermally conductive surfaces and downward-facing thermally conductive surfaces, respectively, for use in the various applications, the present disclosure recognizes that a single transceiver 18 can be constructed that is configured for use in both types of applications. In particular, the transceiver 18 is configured to mate with the same electrical connector 22 in both a first orientation 28 (FIG. 2A) and in a second orientation 30 (FIGS. 2D and 2G) that is opposite the first orientation 28 about at least one axis. For example, in the first orientation 28, a thermally conductive first surface 32 of the transceiver 18 can face the downward direction so as to dissipate heat through a heat dissipation member 26 that is disposed below the transceiver 18. In the second orientation, the thermally conductive first surface 32 can face the upward direction so as to dissipate heat through a heat dissipation member 26 that is disposed above the transceiver 18. Thus, the first orientation 28 can be opposite the second orientation 30 with respect to the transverse direction T. The first surface 32 can be referred to as a heat dissipation surface.

It should be appreciated, however, as further described below, that the first and second orientations 28 and 30 can alternatively or additionally be opposite each other along a direction perpendicular to the transverse direction T. Thus, the first surface 32 can face the host substrate 24 both when the transceiver 18 is in the first orientation and when the transceiver 18 is in the second orientation. Alternatively, the first surface 32 faces away from the host substrate 24 both when the transceiver 18 is in the first orientation and when the transceiver 18 is in the second orientation.

Referring now to FIGS. 1A-1E in particular, a communication system 34 can include the host substrate 24, the electrical connector 22 that is configured to be mounted to the host substrate 24, and the transceiver 18 that is configured to mate with the electrical connector 22. The transceiver 18 can be configured to mate with the electrical connector 22 prior to mounting the electrical connector 22 to the host substrate 24. Thus, a communication system can be self-supporting whereby the transceiver 18 is configured to mate with the electrical connector 22 and support the electrical connector 22. Thus, the electrical connector 22 need not rely upon the host substrate 24 for support. The transceiver 18 can be configured as an optical transceiver 20. The optical transceiver 20 includes a transceiver housing 36, a plurality of electrical contacts 38 supported by the transceiver housing 36, and a transmitter, and/or a receiver. The transmitter and/or receiver can be supported by a substrate that combine so as to define an optical engine. The transceiver 18 can be configured as an optical transceiver 20. The transceiver 18 includes a transceiver housing 36, a plurality of electrical contacts 38 supported by the transceiver housing 36, and a transmitter, and/or a receiver. The transmitter and/or receiver can be supported by a substrate that combine to define an optical engine of the optical transceiver 18.

The transceiver 18 can also include at least one optical fiber 40 supported by the transceiver housing 36. Alternatively, as illustrated in FIG. 1F, the optical fibers 40 can be attached to the transceiver 18 and detached from the transceiver 18. Thus, in some examples, it can be said that the transceiver 18 is configured to connect to at least one optical fiber. The at least one optical fiber 40 can include a plurality of optical fibers 40. Optical signals generated by the optical transmitter 20 can be output along the optical fibers 40. Further, the receiver can receive optical signals from the optical fibers 40. The electrical contacts 38 define a plurality of mating ends 47 that are configured to mate with complementary mating ends of the electrical connector 22 so as to mate the transceiver 18 to the electrical connector 22. The electrical contacts 38 include a plurality of electrical input contacts and/or a plurality of electrical output contacts. Similarly, the optical fibers 40 can include at least one optical input fiber and/or at least one optical output fiber. The electrical connector 22 includes an electrically insulative connector housing 42 and a plurality of electrical contacts 44 that are supported by the connector housing 42. The optical fibers 40 can include any suitable type of optical waveguide, such as polymer waveguides.

Figure 11A:
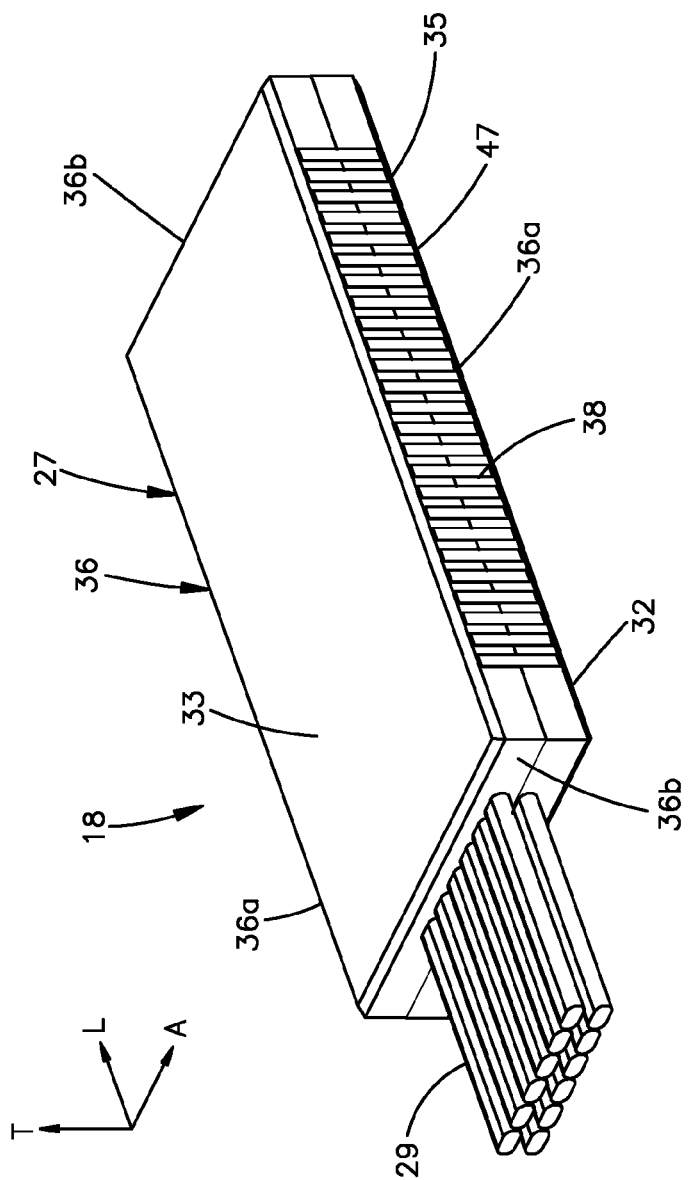
FIG. 11A is a perspective view of an electrical transceiver inter-mateable with the electrical connector illustrated in FIG. 3 that also is designed to mate with the transceiver illustrated in FIGS. 1A-1E.
Figure 11B:
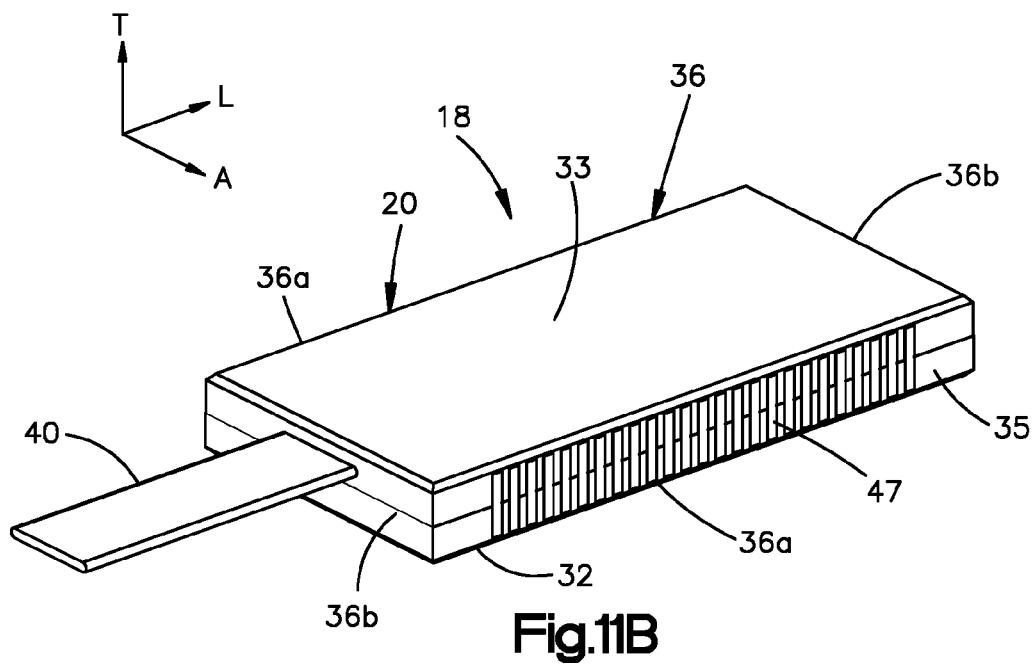
FIG. 11B is a perspective view of an electrical transceiver inter-mateable with the electrical connector illustrated in FIG. 3.

Alternatively, referring also to FIG. 11A, the transceiver 18 can be an electrical transceiver 27 including at least one electrical cable 29 that extends out from the transceiver housing 36. The at least one electrical cable 29 can be configured for the respective input and output of electrical signals to and from the transceiver 27, respectively, with or without signal reconditioning. Thus, the electrical transceiver 27 can include at least one signal reconditioning member that generates heat during operation. The generated heat can be dissipated in any manner described herein. The electrical transceiver 27 operates without converting the electrical input signals into optical output signals, but rather transmits electrical signals to and from the at least one electrical cable 29 with or without signal reconditioning. Thus, it can be said that the transceiver 18 can include at least one cable that can be configured as at least one optical fiber 40 or at least one electrical cable 29.

In some examples, the transceiver 18 includes only one or more optical fibers 40 and no electrical cables 29. In other examples, the transceiver 18 includes one or more electrical cables 29 and no optical fibers 40. In still other examples, it is contemplated that the transceiver 18 can include both at least one optical fiber 40 and at least one electrical cable 29. In yet another example it is contemplated that the transceiver does not include either of an electrical cable or optical fiber but has a connector to 1) connect to at least one optical fiber, 2) connect to a different connector that, in turn, connects to at least one electrical cable or 3) connect to both at least one optical fiber and at least one copper cable. Furthermore the transceiver 18 can be configured to transmit optical or electrical signals through space via free space optics, microwave or radio wave. As will be appreciated from the description below, any such transceiver can be configured to mate with the same electrical connector in both the first orientation and the second orientation. Alternatively, this concept can be extended to a chip package where all I/O (inputs/outputs) are conducted through the connector 22 to which the chip package can be mated in both the first orientation and the second orientation. Therefore, unless indicated otherwise, description herein with reference to the optical transceiver 20 can apply equally to any example of the transceiver 18 described herein, including the electrical transceiver 27, and chip package. Further, the chip package, the transceiver 18, all other transceivers described herein can be referred to as heat generating units that generate heat as a byproduct during operation. It should be appreciated that chip packages can be provided without optical or electrical cables. Thus, when mating a chip with an electrical connector, the electrical connector can be devoid of channel 54. As described herein, the heat generating units can be mated with a complementary electrical device selectively in a first orientation and a second orientation so as to dissipate heat in one of two corresponding directions. It should be appreciated that both the optical transceiver 20 and the electrical transceiver 27 can include substantially identically constructed transceiver housings 36 and electrical contacts 38. For instance, the transceiver housings 36 can have identical shapes and geometries, and identical locations of the electrical contacts 38. Further, the electrical contacts 38 can have identical shapes and geometries. Further, the cables can exit the transceiver housings 36 at identical locations. Thus, descriptions herein of the transceiver housing 36 and electrical contacts 38 with respect to one of the transceivers 20 and 27 apply equally to the other of the transceivers 20 and 27.

During operation, when the optical transceiver 20 is mated with the electrical connector 22, the electrical contacts 38 of the transceiver 20 are placed in electrical communication with respective complementary electrical contacts 44 of the electrical connector 22. Further, the electrical contacts 38 and 44 define a separable interface, such that the optical transceiver 20 can be unmated from the electrical connector without destroying the electrical contacts 38, the electrical contacts 44, or both. When the electrical connector 22 is mounted to the host substrate 24 such that the complementary electrical contacts 44 are in electrical communication with respective electrical conductors of the host substrate 24, the electrical contacts 38 of the transceiver 20 are placed in electrical communication with the electrical conductors of the host substrate 24.

Accordingly, during operation, the transmitter of the optical transceiver 20 receives electrical input signals from the electrical input contacts, converts the electrical input signals to optical output signals, and applies the optical output signals to the optical output fibers. In this regard, it should be appreciated that the electrical connector 22 causes the electrical input signals to travel from the host substrate 24 to the electrical input contacts of the transceiver 20. Conversely, the receiver of the optical transceiver 20 receives optical input signals from respective optical input fibers, converts the optical input signals to electrical output signals, and outputs the electrical output signals to the electrical output contacts. The electrical output signals travel through the respective complementary electrical contacts 44 of the electrical connector 22 to respective electrical conductors of the host substrate 24. In one example, the host substrate 24 can be configured as a printed circuit board (PCB). In another example, the host substrate 24 can be configured as a flex circuit. It should be appreciated however, that the host substrate 24 can be configured as any suitable electrical component as desired.

Referring also to FIGS. 2A, 2C, and 2E, and as will be appreciated from the description below, the optical transceiver 20 is configured to mate with the electrical connector 22 both when the optical transceiver 20 is in the first orientation 28 and when the optical transceiver 20 is in the second orientation 30 that is different than the first orientation 28. For instance, the first and second orientations can be opposite each other. The transceiver housing 36 defines the first surface 32 and a second surface 33 that is opposite the first surface 32 along the transverse direction T. The transverse direction T can include both the upward direction and the downward direction. It can thus be said that the electrical contacts 38 of the transceiver 20 are configured to mate with the complementary electrical contacts of a common electrical connector both when the optical transceiver 20 is in the first orientation 28 and when the optical transceiver 20 is in the second orientation 30. That is, the transceiver 20 is configured to mate with the same electrical connector both when the transceiver is in the first orientation and when the transceiver is in the second orientation. The common electrical connector can be configured as described herein with respect to the electrical connector 22, or any suitable alternative electrical connector as desired.

In both the first and second orientations, the optical transceiver 20 can be disposed adjacent the electrical connector 22 along a plane that is oriented perpendicular to the transverse direction T. Further, the transceiver 20 and the electrical connector 22 can be constructed such that no portion of the connector housing 42 overlaps any portion of the transceiver housing 36 along the transverse direction T both when the transceiver 20 is mated to the electrical connector 22 in the first orientation, and when the transceiver 20 is mated to the electrical connector 22 in the second orientation. Because the transceiver 20 is not stacked on top of the electrical connector 22 to which it is mated, the communication system 34 can have a lower profile along the transverse direction T than conventional transceivers that are stacked onto the electrical connectors to which they are mated.

The first surface 32 can be a thermally conductive surface of the transceiver 20 that is configured to dissipate heat from one or more components of the transceiver 20 through a heat dissipation member 26 of the communication system 34 (see FIG. 1E). The heat dissipation member 26 can be placed in thermal communication with the first surface 32. For instance, the heat dissipation member 26 can be placed in mechanical contact with the first surface 32. In one example, the heat dissipation member 26 can be configured as a thermally conductive heat dissipation plate 48, which can be configured as a cold plate. In some examples, a thermally conductive pad or a thermally conductive grease can be positioned between the heat dissipation member 26 and the first surface 32.

Figure 1B:
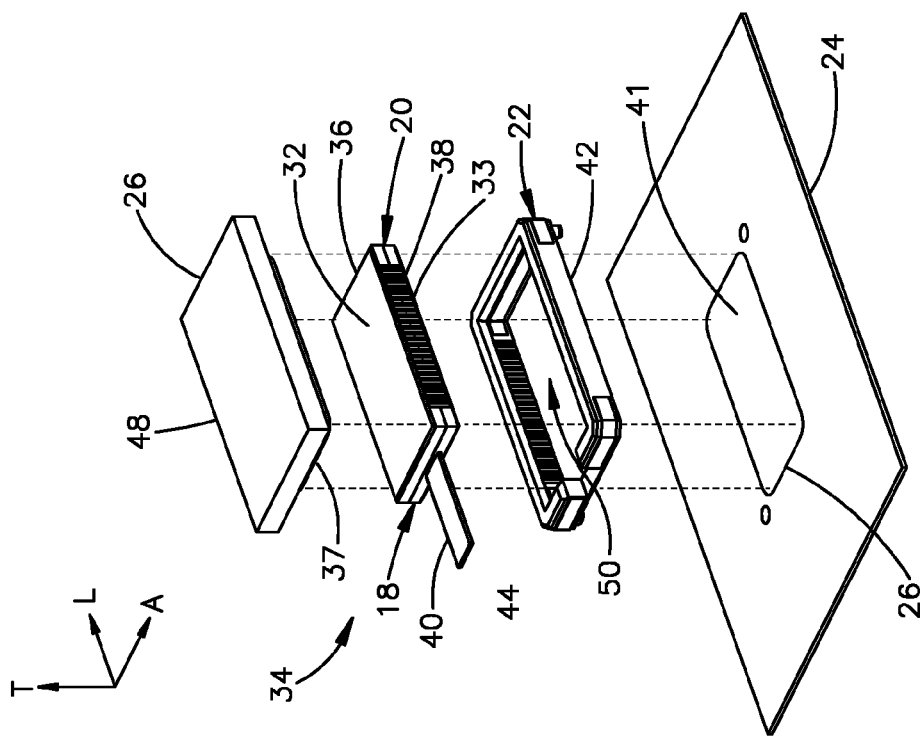
FIG. 1B is an exploded perspective view of the communication system illustrated in FIG. 1A, but shown in one configuration.

When the transceiver 20 is in the first orientation 28 such that the first surface 32 faces in the downward direction, the heat dissipation plate 48 can be disposed below the transceiver 20 so as to dissipate heat from the first surface 32. In this regard, it should be appreciated that the heat dissipation plate 48 can have a raised portion 37 that is configured to extend through an aperture 39 of the host substrate 24 (see FIG. 1C). Thus, the raised portion 37 can be placed in thermal communication, such as mechanical contact, with the first surface 32 through the aperture 39. In another example (see FIG. 1D), the host substrate 24 can include a heat spreader 41, such that the first surface 32 of the transceiver 20 can be placed in thermal communication, such as mechanical contact, with the heat spreader 41. When the transceiver 20 is in the second orientation (see FIGS. 1B and 1E) such that the first surface 32 faces in the upward direction away from the host substrate 24, the heat dissipation plate 48 can be disposed above the transceiver 20 so as to dissipate heat from the first surface 32. When the transceiver 20 is in the second orientation, the substrate 24 can include the heat spreader 41. In this regard, communication system 34 can include the same substrate 24 both when the transceiver 20 is in the first orientation and when the transceiver is in the second orientation. In particular, the substrate 24 can include the aperture 39 (FIG. 1C) or the heat spreader 41 (FIGS. 1B and 1D). Alternatively, as illustrated in FIG. 1E, the substrate 24 can be devoid of both the heat spreader 41 and the aperture 39. The heat dissipation member 26 can be made of any suitable thermally conductive material. For instance, the heat dissipation member 26 can be metallic. Alternatively, the heat dissipation member 26 can be non-metallic but thermally conductive, such as a ceramic. The heat dissipation member can be passive or active, air-cooled, cooled by circulating a liquid internally, cooled by immersion, radiatively, or simply conduct the heat to a further component, any combination of the above, or by any other suitable heat dissipation member.

Figure 7A:
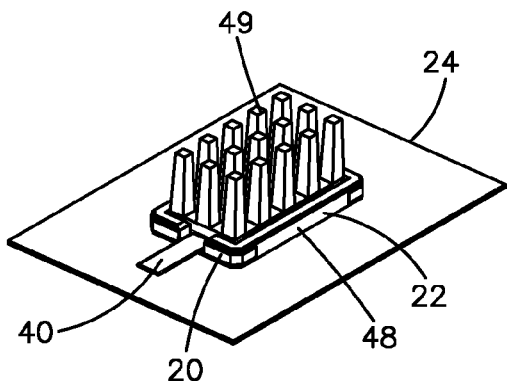
FIG. 7A shows an upper heat spreader illustrated in FIG. 1B constructed as a heat sink having fins, which can be configured as pins.
Figure 7B:
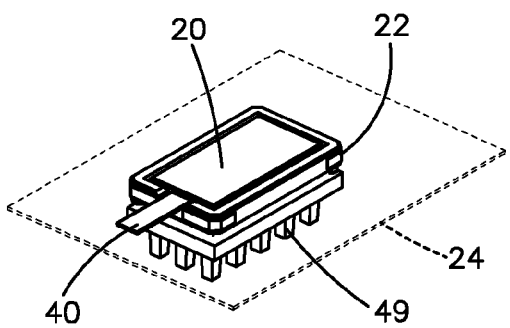
FIG. 7B shows a lower heat spreader illustrated in FIG. 1C constructed as a heat sink having fins.

As illustrated in FIGS. 7A-7B, the heat dissipation member 26 can further include a plurality of fins 49, which can be configured as pins, elongate fins, or any suitable alternative fin construction designed to transfer the heat load to the air, another gas or atmosphere or to a liquid, that extend out from the heat dissipation plate 48 so as to define a heat sink. For instance, as illustrated in FIG. 7A, when the heat dissipation member 26 is positioned above the transceiver 20, the fins 49 can extend in the upward direction from the heat dissipation plate 48. As illustrated in FIG. 7B, when the heat dissipation member 26 is positioned below the transceiver 20, the fins 49 can extend in the downward direction from the heat dissipation plate 48 through a hole in the PCB that allows thermal communication between the transceiver 20 and the heat dissipation member 26. Alternatively, as described in more detail below, the transceiver 20 can include fins 49 that extend out from the first surface 32 and dissipate heat generated by the transceiver 20.

It should be appreciated throughout this disclosure that when thermally conductive structures are said to be in thermal communication with each other, the thermally conductive structures can be in direct mechanical contact with each other or in indirect mechanical contact with each other through one or more intermediate thermally conductive structures. Thus, in one example, thermally conductive structures that are referred to as in thermal communication with each other can define a path of thermal conduction for heat dissipation. It should be further appreciated that while FIGS. 1A-1E shows various combination of heat dissipation members 26, the communication system 34 need not include all heat dissipation members 26 shown, but rather can include one or more of the illustrated heat dissipation members 26 in various combinations, depending on the construction of the transceiver 20.

Referring now to FIGS. 1A-1E, 3, and 6A-6D, and as described above, the electrical connector 22 includes an electrically insulative connector housing 42 and a plurality of electrical contacts 44 that are supported by the connector housing 42. The electrical contacts 44 define mounting ends that are configured to be mounted to the host substrate 24, and mating ends 52 that are configured to mate with the respective mating ends 47 of the electrical contacts 38 of the transceiver 20. The connector housing 42 can define an internal space 50 that is sized to receive the transceiver 20 so as to mate the transceiver 20 to the electrical connector 22, such that the electrical contacts 38 of the transceiver 20 mate with respective ones of the complementary electrical contacts 44 of the electrical connector 22 both when the transceiver 20 is in the first orientation and when the transceiver 20 is in the second orientation. Thus, the connector housing 42 can be configured as an annular housing that defines the internal space 50. In this regard, the electrical connector 22 can be referred to as a ring connector. In one example, the mating ends 47 of the transceiver 20 can be equidistantly spaced from the first and second surfaces 32 and 33 with respect to the transverse direction T.

Figure 4B:
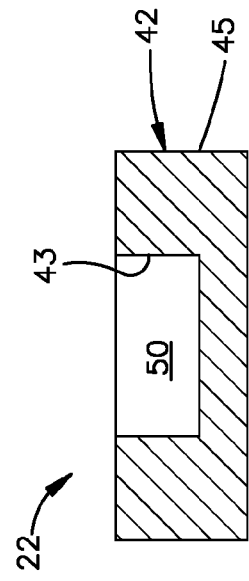
FIG. 4B is a schematic side elevation view of the electrical connector illustrated in FIG. 3 but showing the internal space in accordance with another example.
Figure 4D:
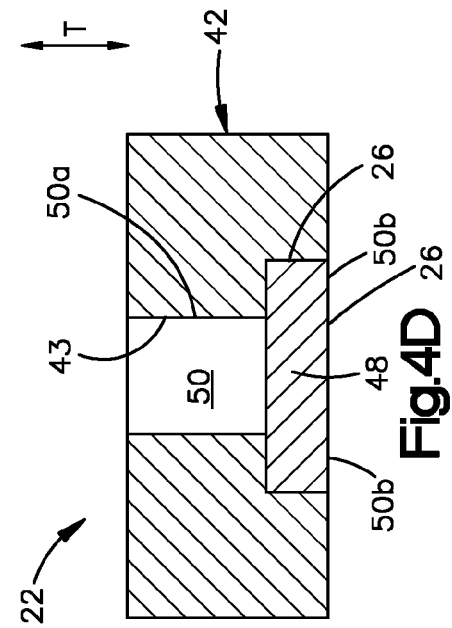
FIG. 4D is a schematic side elevation view of the electrical connector illustrated in FIG. 3 but showing the internal space in accordance with still another example.
Figure 4A:
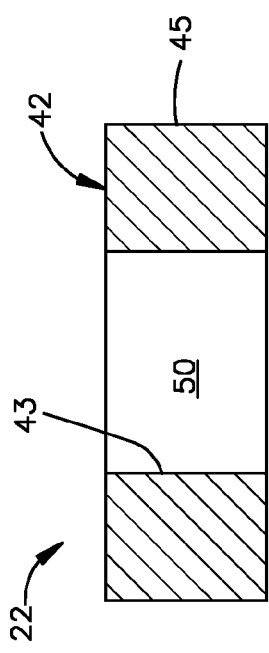
FIG. 4A is a schematic side elevation view of the electrical connector illustrated in FIG. 3 showing an internal space.
Figure 4C:
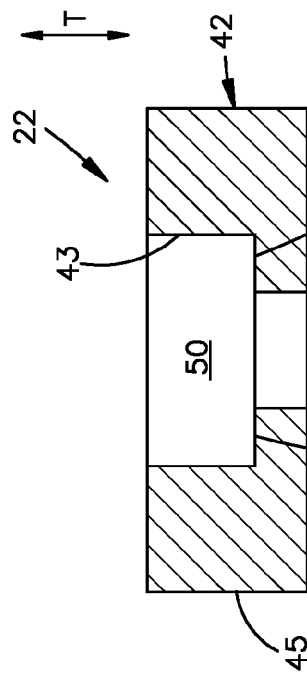
FIG. 4C is a schematic side elevation view of the electrical connector illustrated in FIG. 3 but showing the internal space in accordance with still another example.

As illustrated in FIG. 4A, an entirety of the internal space 50 can extend through the connector housing 42 along the transverse direction T. Alternatively, as illustrated at FIG. 4B, the internal space 50 can extend into the connector housing 42 along the transverse direction T, but can terminate without extending through the connector housing 42. In particular, the internal space 50 can extend into the connector housing 42 in the downward direction. The connector housing 42 can define a base of the internal space 50. Alternatively still, as illustrated in FIG. 4C, a first portion 50a of the internal space 50 can extend through the connector housing 42 along the transverse direction T, and a second portion 50b of the internal space 50 can extend into but not through the connector housing 42 along the transverse direction T. For instance, the second portion 50b can extend into the upper end of the connector housing 42 toward the lower end, but not through the lowed end. In still another example illustrated in FIG. 4D, the first portion 50a of the internal space 50 can extend through the connector housing 42 along the transverse direction T, and the second portion 50b of the internal space 50 can extend into the lower end of the connector housing 42 toward the upper end, but not through the upper end. Thus, the second portion 50b of the opening 50 can combine with a lower end of the first portion 50a of the opening 50 to define a cavity that can receive the heat dissipation member 26. For instance, the heat dissipation member 26 can be configured as the heat dissipation plate 41. The heat dissipation plate can include fins as described above as desired.

Referring now to FIGS. 3 and 5A-5D, the connector housing 42 can define an inner surface 43 that defines the internal space 50, and an outer surface 45 that is opposite the inner surface 43. The inner surface 43 defines an inner perimeter of the connector housing 42. The connector housing 42, and in particular the inner surface 43, can substantially surround the transceiver 20 along a plane that is oriented perpendicular to the transverse direction T when the transceiver 20 is mated to the electrical connector 22. For instance, the connector housing 42 can entirely surround the transceiver 20 along the plane. Alternatively, the connector housing 42 can be interrupted by a channel 54 along the plane. The channel 54 can extend at least into the connector housing 42 along the transverse direction T. For instance, the channel 54 can extend down into the connector housing from a top surface of the connector housing 42. The channel 54 can terminate at a location spaced from a bottom surface of the connector housing 42 in the upward direction. Alternatively, at least a portion of the channel 54 can extend entirely through the connector housing along the transverse direction T. The bottom surface of the connector housing 42 can face the host substrate 24 when the electrical connector 22 is mounted to the host substrate 24. The top surface of the connector housing 42 is opposite the bottom surface along the transverse direction T. The channel 54 can be open to both the internal space and to the outer surface 45 of the connector housing 42. The channel 54 can be sized such that the cable or optical fibers 40 extend through the channel 54 when the transceiver 20 is mated to the electrical connector 22 in either the first orientation 28 (FIG. 2A) or the second orientation 30 (FIGS. 2C and 2E). Thus, the channel 54 can be referred to as a fiber-receiving channel or cable.

The transceiver 20 and the electrical connector 22 can be keyed to ensure that the transceiver 20 is mated in the electrical connector 22 in a proper predetermined orientation. For instance, the transceiver 20 can include a first keying member, and the electrical connector 22 can include a second keying member that is configured to mate with the first keying member so as to permit the transceiver 20 to mate with the electrical connector 22 when the transceiver 20 is in the proper orientation relative to the electrical connector 22. When the transceiver 20 is in an improper orientation relative to the electrical connector, at least one of the keying members of one of the transceiver 20 and electrical connector 22 can be a stop surface that abuts the other of the transceiver 20 and the electrical connector 22, thereby preventing the transceiver 20 from mating with the electrical connector 22. In one example, the first keying member can be configured as a protrusion and the second keying member can be configured as a recess that receives the protrusion. Alternatively, the second keying member can be configured as a protrusion and the first keying member can be configured as a recess that receives the protrusion. The protrusion can define the stop surface when attempting to mate the transceiver 20 with the electrical connector 22 when the transceiver 20 is in the improper orientation relative to the electrical connector 22. It is also recognized that the optical fibers 40 can extend through the channel 54 when the transceiver is in the proper orientation relative to the electrical connector 22. Further, as will be appreciated from the description below with respect to FIGS. 12A-12B, when the transceiver is panel-mounted, the second keying member can be carried by the electrical connector, the panel, or any suitable alternative structure.

The connector housing 42 can define first and second opposed sides 42a that are opposite each other along a lateral direction A that is oriented perpendicular to the transverse direction T. The connector housing 42 can further define first and second opposed ends 42b that are opposite each other along a longitudinal direction L. The longitudinal direction L is perpendicular to each of the lateral direction A and the transverse direction T. The opposed ends 42b are connected between the sides 42a. The mating ends 52 of the electrical contacts 44 can be disposed at any one or more of the opposed sides 42a and the opposed ends 42b. In particular, the mating ends 52 can be disposed at the inner surface 43 of the connector housing 42. In one example, the mating ends 52 of the electrical contacts 44 are disposed along the opposed sides 42a, and none of the mating ends 52 are disposed at either or both of the opposed ends 42b. Alternatively, some, up to all, of the mating ends 52 can be disposed along one or both of the opposed ends 42b. Thus, in some example, none of the mating ends 52 are disposed along either or both of the opposed sides 42a. Alternatively still, some of the mating ends 52 can be disposed at the opposed sides 42a, and others of the mating ends 52 can be disposed along one or both of the opposed ends 42b. In one specific example, the mating ends 52 are disposed along the opposed sides 42a and a select one of the opposed ends 42b. It should be appreciated that still other arrangements of the electrical contacts 44 are contemplated.

The channel 54 can extend into one or both of the ends 42b. For instance, the channel 54 can extend into the select one of the opposed ends 42b. Alternatively or additionally, the channel can extend into the end 42b that is opposite the select one of the opposed ends 42. Alternatively or additionally, one or more channel 54 can extend into one or both of the sides 42a. The optical fibers 40 can extend through the channel 54 both when the transceiver 20 is in the first orientation, and when the transceiver is in the second orientation.

It should be appreciated that the sides 42a and the ends 42b can combine so as to define any shape of the connector housing as desired. Thus, the mating ends 52 can be arranged along a path that at least partially defines the shape. Further, the inner surface 43 of the connector housing 42 can define the shape. Further still, an outer perimeter of the internal space 50 can define the shape. The outer perimeter can be along a plane that is oriented perpendicular to the transverse direction T. The shape can be continuous or interrupted, for instance by the channel 54. It should be appreciated that the shape can be any one of a circle, a trapezoid, a triangle, a rectangle, a square, an ellipse, or any alternative open polygon or closed polygon as desired along a plane that is perpendicular to the transverse direction. FIG. 5A illustrates the shape as a rectangle, whereby the sides 42a are longer than the ends 42b. FIG. 5B illustrates the shape as a trapezoid. FIG. 5C illustrates the shape as a circle. FIG. 5D illustrates the shape as a rectangle, wherein the sides 42a are discontinuous. Further, 5D illustrates that the internal space 50 can define any suitable shape as desired, such as T-shaped. Alternatively, the internal space 50 can be rectangular such as square (FIG. 5A), triangular (FIG. 5B), round such as circular (FIG. 5C), or any suitable alternative shape as desired that is suitable to mate with the transceiver in the first and second orientations. In this regard, it should be appreciated that any one or more up to all of the sides 42a and the ends 42b can be discontinuous or continuous as desired. Alternatively or additionally, the electrical contacts 44 of the electrical connector can be arranged continuously or discontinuously along the housing 42. While the sides 42a can be connected to each of the ends 42b, and the ends 42b can be connected to each of the sides 42a so as to define an enclosed polygon, it should be appreciated that the connector housing 42 can be open at any one of the sides 42a and the ends 42b. Thus, the connector housing 42 can be U-shaped, C-shaped, or define any suitable alternative open shape as desired. The opening of the shape can also define the channel 54 as desired.

Additionally, it should be appreciated that the shape of the connector housing can define a plane of symmetry. The plane of symmetry can be defined by the transverse direction T and the longitudinal direction L. Alternatively, the plane of symmetry can be defined by the transverse direction T and the lateral direction A. Thus, it can be said that the plane of symmetry can be defined by the transverse direction T and a second direction that is oriented perpendicular to the transverse direction T. Alternatively, the connector housing can be asymmetrical so long as the electrical connector is configured to mate with the transceiver both when the transceiver is in the first orientation and when the transceiver is in the second orientation. Alternatively still, the transceiver can be mated with a first electrical connector when the transceiver is in the first orientation, and with a second electrical connector when the transceiver is in the second orientation. The second electrical connector can be a mirror image of the first electrical connector. This example can be especially useful when, for instance, the transceiver and the first and second electrical connectors are asymmetrical. The asymmetry of the transceiver and the electrical connector can provide a keying feature whereby the transceiver is prevented from mating with the electrical connector in an improper orientation. Alternatively or additionally, the transceiver and the electrical connector can include respective keying members of the type described herein.

Figure 6A:
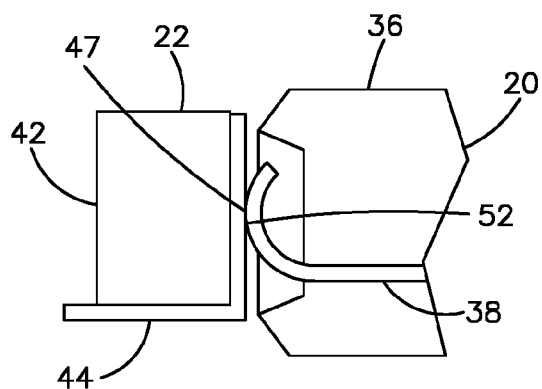
FIG. 6A is a schematic view showing an electrical contact of the transceiver mated with a complementary electrical contact of the electrical connector in one example.
Figure 6B:
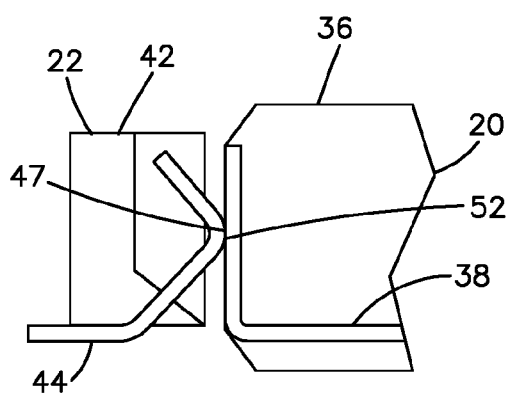
FIG. 6B is a schematic view showing an electrical contact of the transceiver mated with a complementary electrical contact of the electrical connector in another example.
Figure 6C:
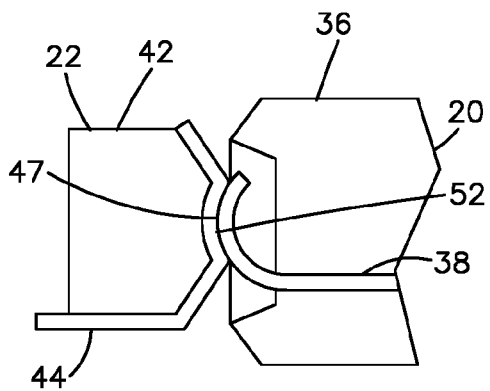
FIG. 6C is a schematic view showing an electrical contact of the transceiver mated with a complementary electrical contact of the electrical connector in yet another example.
Figure 6D:
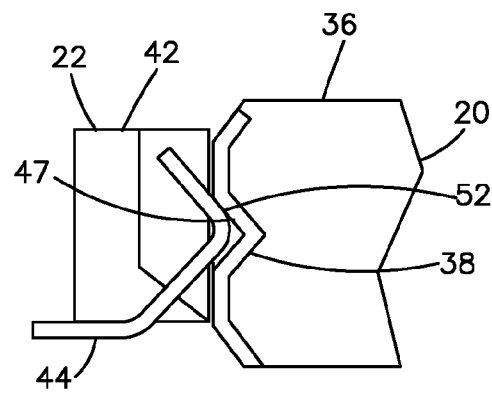
FIG. 6D is a schematic view showing an electrical contact of the transceiver mated with a complementary electrical contact of the electrical connector in still another example.

As illustrated in FIGS. 6A-6D, the mating ends 52 of the electrical contacts 44 of the electrical connector 22 can be planar (FIG. 6A), can be concave with respect to the mating ends 47 of the transceiver 20 (FIG. 6C), or can be convex with respect to the mating ends 47 of the transceiver 20 (FIGS. 6B and 6D), as they extend along the transverse direction T. Further, the mating ends 47 of the electrical contacts 38 of the transceiver 20 can be planar (FIG. 6B), can be concave with respect to the mating ends 52 of the electrical connector 22 (FIG. 6D), or can be convex with respect to the mating ends 52 of the electrical connector 22 (FIGS. 6A and 6C) as they extend along the transverse direction T. The concave or convex mating ends 52 and 47 can be defined by one or more curved surfaces (FIGS. 6A and 6C). Alternatively or additionally, the concave or convex mating ends 47 and 52 can be defined by one or more planar surfaces (FIGS. 6B and 6D). The mating ends 47 and 52 are configured to mate with each other both when the transceiver 20 is in the first orientation and when the transceiver is 20 in the second orientation as described above.

The mating ends 47 of the electrical contacts 38 of the transceiver 20 can be identical to each other (e.g., within manufacturing tolerance). Similarly, the mating ends 52 of the electrical contacts 44 of the electrical connector 22 can be identical to each other (e.g., within manufacturing tolerances). Further, the mating ends 47 and 52 can be arranged along respective common planes that are oriented perpendicular to the transverse direction T. The respective common planes can be coincident with each other when the transceiver 20 is mated with the electrical connector 22. The respective common planes can be defined by the lateral direction A and the longitudinal direction L.

Referring now to FIGS. 6A-6B, the respective mating ends 47 and 52 can be in edge contact or point contact (for instance due to manufacturing tolerances) with each other when they mate. Thus, the mating ends 47 of the electrical contacts 38 of the transceiver 20 can define an edge that is in contact with a surface of the mating ends 52 of the electrical contacts 44 of the electrical connector 22 as illustrated in FIG. 6A. Alternatively, the mating ends 52 of the electrical contacts 44 of the electrical connector 22 can define an edge that is in contact with a surface of the mating ends 47 of the electrical contacts 38 of the transceiver 20 as illustrated in FIG. 6B. In the configurations illustrated in FIGS. 6A-6B, the engagement of the mating ends 47 and 52 with each other does not locate the position of the transceiver 20 relative to the electrical connector 22 along the transverse direction and allows proper electrical contact between the two connector halves over a range of positions along the transverse direction T.

Alternatively still, referring now to FIGS. 6C-6D, the respective mating ends 47 and 52 can be in surface contact with each other when they mate. It is recognized that though the mating ends 47 and 52 are designed to be in surface contact with each other, manufacturing tolerance can cause the mating ends 47 and 52 to contact each other at multiple points of contact during operation. For instance, as illustrated in FIG. 6C, the mating ends 47 of the electrical contacts 38 of the transceiver 20 can nest in the mating ends 52 of the electrical contacts 44 of the electrical connector 22. Alternatively, as illustrated in FIG. 6D, the mating ends 52 of the electrical contacts 44 of the electrical connector 22 can nest in the mating ends of the electrical contacts 38 of the transceiver 20. The nesting of the mating ends 47 and 52 can function to locate, for instance center or locate at a location off-center with respect to the transverse direction T, the mating ends 47 and 52 relative to each other, and thus can function to correspondingly position the transceiver 20 with respect to the electrical connector 22 along the transverse direction T. When the mating ends 47 and 52 are centered with respect to each other, the mating ends 52 of the electrical contacts 44 of the electrical connector 22 do not bias the transceiver 20 upward or downward along the transverse direction. It should be appreciated that the shapes of the mating ends 47 and 52 can be chosen or adjusted as desired so as to provide contact between the mating ends 47 and 52 at any location along the transverse direction as desired.

As illustrated in FIG. 6D, the nesting of the mating ends 47 and 52 can locate the mating ends 47 and 52 in an off-centered position such that the mating ends 52 of the electrical contacts 44 of the electrical connector 22 applies a biasing force to the transceiver 20 along the transverse direction T. The biasing force can urge the transceiver 20 against the heat dissipation member 26 (see FIGS. 1A-1E). For instance, the biasing force can be oriented in the upward direction so as to urge the transceiver 20 into mechanical contact with the heat dissipation member 26 when the heat dissipation member is positioned above the transceiver 20. Alternatively, the biasing force can be oriented in the downward direction so as to urge the transceiver 20 into mechanical contact with the heat dissipation member 26 when the heat dissipation member is positioned below the transceiver 20.

It should be appreciated that deflection of at least one of the mating ends 47 of the transceiver 20 and the mating ends 52 of the electrical connector 22 can provide a contact force against the other one of the mating ends 47 and 52. The contact force can provide continuous electrical contact between mating end 47 and mating end 52 in the presence of manufacturing tolerance variations as well as in the presence of forces, accelerations, shocks and vibrations. The contact forces, combined with the geometry of the contact ends 47 and 52 provide a retention force along the transverse direction T that can be overcome when mating the transceiver 20 and connector 22, and when unmating the transceiver 20 from the connector 22. For instance, the mating ends 47 can be spaced from the transceiver housing 36 along a direction perpendicular to the transverse direction T. Alternatively or additionally, the mating ends 52 of the electrical connector 22 can be spaced from the connector housing 42 along a direction perpendicular to the transverse direction T. For instance, as illustrated in FIGS. 6A and 6C, the mating ends 47 of the transceiver 20 are spaced from the transceiver housing 36. The mating ends 52 of the connector 22 can abut the connector housing 42. As illustrated in FIGS. 6B and 6D, the mating ends 52 of the electrical connector 22 are spaced from the connector housing 42. The mating ends 47 of the transceiver can abut the transceiver housing 36. Alternatively, both mating ends 47 and 52 can be spaced from their respective housing 36 and 42. The spaced mating ends can flex toward the respective housing as the transceiver 20 is mated to the electrical connector 20, thereby applying a contact force to the opposed electrical contact.

The transceivers 20 and 27 will now be further described with reference to FIGS. 2A-3, 8A-8C and 11A-11C. It should be appreciated that the construction of the transceiver 18 can apply to both the electrical transceiver 27 illustrated in FIG. 11A and the optical transceiver 20 illustrated in FIGS. 11B-11C, with the exception that the electrical transceiver 27 includes one or more, up to all, of the electrical cables 29, and the optical transceiver 20 includes one or more optical fibers 40 as described above. The transceiver housing 36 defines an outer surface 35 that faces the inner surface 43 of the connector housing 42 when the transceiver 18 is mated to the electrical connector 22. The outer surface 35 can define an outer perimeter of the transceiver housing 36. The outer surface 35 can define first and second opposed sides 36a of the transceiver housing 36 that are opposite each other along the lateral direction A. The outer surface 35 can further define first and second opposed ends 36b of the transceiver housing 36 that are opposite each other along the longitudinal direction L. The opposed ends 36b are connected between the sides 36a.

Figure 11C:
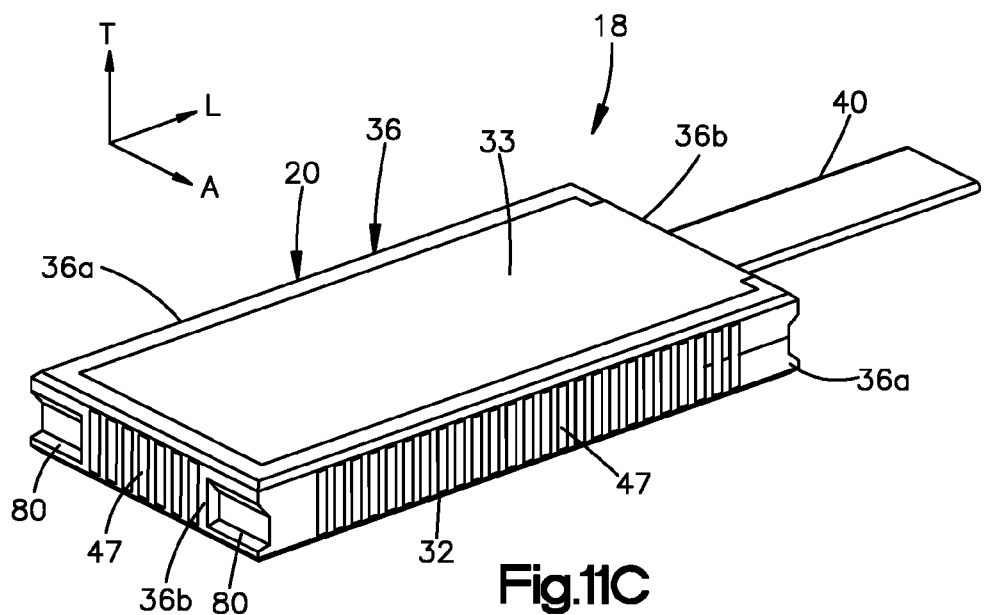
FIG. 11C is another perspective view of an optical transceiver similar to the optical transceiver illustrated in FIG. 11B, but including latch receiving pockets.

Ones of the mating ends 47 of the transceiver 18 can be disposed at a first side 36a' of the transceiver housing 36, and others of the mating ends 47 of the transceiver 18 can be disposed at the second side 36a" of the transceiver housing 36. Alternatively, as illustrated in FIG. 11C, ones of the mating ends 47 can be disposed at the first side 36a', others of the mating ends can be disposed at the second side 36a", and others still can be disposed at one of the ends 36b of the transceiver housing 36. The other one of the ends 36b can be devoid of mating ends 47. The one of the ends 36b can be a first end 36b' that is disposed opposite the second end 36b" from which the at least one optical fiber 40 (or electrical cable) extends. Alternatively or additionally, respective ones of the mating ends 47 can be disposed at each of the ends 36b. Further, as described above, ones of the mating ends 52 of the electrical connector 22 can be disposed at a first side 42a' of the connector housing 42, and others of the mating ends 52 of the electrical connector 22 can be disposed at a second side 42a" of the connector housing 42. Alternatively or additionally, ones of the mating ends 52 of the electrical connector 22 can be disposed at a first end 42b' of the connector housing 42 opposite the second end 42b" that defines the fiber or cable-receiving channel. Alternatively or additionally still, ones of the mating ends 52 of the electrical connector 22 can be disposed at both of the ends of the connector housing.

The first and second orientations 28 and 30 will now be described in more detail with reference to FIGS. 2A-2I. In particular, when the transceiver 18 is in the first orientation 28 as shown in FIGS. 2A-2C, the thermally conductive first surface 32 can face the downward direction, and thus can face the underlying substrate. When the transceiver 18 is in the second orientation 30 as shown in FIGS. 2D-2I, the thermally conductive first surface 32 can face the upward direction away from the underlying substrate.

As illustrated in FIGS. 2A-2C, when the transceiver 18 is in the first orientation 28, the first side 36a' of the transceiver 18 faces the first side 42a' of the electrical connector 22, and the second side 36a" of the transceiver 18 faces the second side 42a" of the electrical connector 22. Further, the first end 36b' of the transceiver 18 faces the first end 42b' of the electrical connector 22, and the second end 36b" of the transceiver 18 faces the second end 42b" of the electrical connector 22. Thus, referring also to FIGS. 3 and 11A-11C, the mating ends 47 at the first side 36a' of the transceiver 18 mate with respective ones of the mating ends 52 at the first side 42a' of the electrical connector 22, and the mating ends 47 at the second side 36a" of the transceiver 18 mate with respective ones of the mating ends 52 at the second side 42a" of the electrical connector 22. Further, the mating ends 47 at the first end 36b' of the transceiver 18 mate with respective ones of the mating ends 52 at the first end 42a' of the electrical connector 22. Thus, the fibers 40 or cable 29 that exit from the first end 36b' of the transceiver 18 can extend through the portion of the channel 54 that extends through the first end 42b' of the connector housing 42. Further, a portion of the channel 54 can extend into a first transverse outer surface of the connector housing 42.

As illustrated in FIGS. 2D-2F, when the transceiver 18 is in the second orientation 30 in one example, the transceiver is opposite the transceiver of the first orientation 28 about an axis that extends along the longitudinal direction L. The term "about an axis" as used herein refers to a rotation about that axis. Of course, it is appreciated that the transceiver 18 need not in fact be rotated about the axis, but the second orientation can be positioned as if the transceiver were rotated about the axis from the first orientation to achieve the second orientation. Thus, the first side 36a' of the transceiver 18 faces the second side 42a" of the electrical connector 22, and the second side 36a" of the transceiver 18 faces the first side 42a' of the electrical connector 22. Further, the first end 36b' of the transceiver 18 faces the first end 42b' of the electrical connector 22, and the second end 36b" of the transceiver 18 faces the second end 42b" of the electrical connector 22. Thus, referring also to FIGS. 3 and 11A-11C, the mating ends 47 at the first side 36a' of the transceiver 18 mate with respective ones of the mating ends 52 at the second side 42a" of the electrical connector 22, and the mating ends 47 at the second side 36a" of the transceiver 18 mate with respective ones of the mating ends 52 at the first side 42a' of the electrical connector 22. Further, the mating ends 47 at the first end 36b' of the transceiver 18 mate with respective ones of the mating ends 52 at the first end 42b' of the electrical connector 22. Thus, the fibers 40 or cable 29 that exit from the first end 36b' of the transceiver 18 can extend through the portion of the channel 54 that extends through the first end 42b' of the connector housing 42. Further, another portion of the channel 54 can extend through a second transverse outer surface of the connector housing 42 that is opposite the first surface along the transverse direction T. It should be appreciated that the connector 22 can be provided with only one portion of the channel 54. For instance, when the second orientation 30 is opposite the first orientation 28 about an axis that extends in the longitudinal direction L, the fibers 40 or cable 29 can extend through the same portion of the channel 54. Thus, the channel 54 can include one or more portions configured to receive the fibers 40 or cable 29.

As illustrated in FIGS. 2G-2I, when the transceiver 18 is in the second orientation 30 in another example, the transceiver 18 is opposite the transceiver 18 of the first orientation 28 about an axis that extends along the transverse direction T. Further, the transceiver 18 in the second orientation 30 is opposite the transceiver 18 of the first orientation 28 about an axis that extends along the longitudinal direction L. Alternatively, the transceiver 18 in the second orientation 30 can be opposite the transceiver in the first orientation about an axis that extends along the lateral direction A. Thus, the first side 36a' of the transceiver 18 faces the first side 42a' of the electrical connector 22, and the second side 36a" of the transceiver 18 faces the second side 42a" of the electrical connector 22. Further, the first end 36b' of the transceiver 18 faces the second end 42b" of the electrical connector 22, and the second end 36b" of the transceiver 18 faces the first end 42b' of the electrical connector 22. Thus, referring also to FIGS. 3 and 11A-11C, the mating ends 47 at the first side 36a' of the transceiver 18 mate with respective ones of the mating ends 52 at the first side 42a' of the electrical connector 22, and the mating ends 47 at the second side 36a" of the transceiver 18 mate with respective ones of the mating ends 52 at the second side 42a" of the electrical connector 22. Further, the mating ends 47 at the first end 36b' of the transceiver 18 mate with respective ones of the mating ends 52 at the second end 42a" of the electrical connector 22. Thus, the fibers 40 or cable 29 that exit from the first end 36b' of the transceiver 18 can extend through the portion of the channel 54 that extends through the second end 42b" of the connector housing 42.

As illustrated in FIGS. 2G-2I and described above, the second orientation 30 can be opposite the first orientation 28 about an axis that extends along the transverse direction T. Alternatively or additionally, as described above, the second orientation 30 can also be opposite the first orientation 28 about an axis that is perpendicular to the transverse direction T. For instance, the axis that is perpendicular to the transverse direction T can be oriented in the longitudinal direction L (FIGS. 2G-2I), thereby rendering the second orientation 30 out of plane with respect to the first orientation 28. It should be appreciated, however, that the second orientation 30 can alternatively be opposite the first orientation 28 only about the axis that extends along the transverse direction T in one example. Thus, in this example, the second orientation 30 is not opposite the first orientation 28 about an axis that is perpendicular to the transverse direction T. Accordingly, the second orientation 30 can be said to be in-plane with the first orientation 28. Further still, the second orientation 30 can be in a position other than opposite the first orientation 28 when the second orientation 30 is in-plane with the first orientation 28. For instance, the second orientation 30 can be angularly offset with respect to the first orientation 28 any amount as desired about the axis that extends along the transverse direction T.

As described above with respect to FIGS. 2A-2I, the second orientation 30 can be different than the first orientation 28 about at least one axis that can extend along any direction as desired. Regardless of the direction of the at least one axis, it should be appreciated that the second orientation 30 can be angularly offset with respect to the first orientation 28 between 1 degree and 180 degrees about the at least one axis. For instance, the second orientation 30 can be angularly offset with respect to the first orientation 28 substantially 90 degrees about one or more axes that can extend along the transverse direction T, the longitudinal direction L, the lateral direction A, or any other direction as desired. Thus, in some examples the second orientation 30 can be different than the first orientation 28 but not opposite the first orientation 28. Thus, the portions of the channel 54 can be disposed at any respective locations of the connector housing 42 as desired. For instance, a first portion of the channel 54 can be disposed at an end of the connector housing 42, and a second portion of the channel 54 can be disposed at a side of the connector housing. Alternatively, the second orientation 30 can be opposite the first orientation 28. Thus, a first portion of the channel 54 can be disposed at a first side of the connector housing 42, and a second portion of the channel 54 can be disposed at a second side of the connector housing. Alternatively, a first portion of the channel 54 can be disposed at a first end of the connector housing 42, and a second portion of the channel 54 can be disposed at a second end of the connector housing. Regardless of the amount of angular offset of the second orientation 30 with respect to the first orientation 28, the channel 54 of the electrical connector 22 can be said to be configured to receive the fibers or cables 40 both when the transceiver 18 is in the first orientation and when the transceiver 18 is in the second orientation. Thus, portions of the channel 54 need not be aligned with each other along a straight line for it to be said that the portions of the channel can define a single channel.

Further, because the transceiver 18 includes the optical engine as described above, it should be appreciated that when the transceiver 18 is in the first orientation 28, the optical engine is also in the first orientation. Similarly, when the transceiver 18 is in the second orientation 28, the optical engine is also in the second orientation. Further, when the transceiver is mated with a complementary electrical device such as the electrical connector 22, the optical engine is similarly placed in electrical communication with the complementary electrical device, such as the electrical connector.

In this regard, it should be appreciated that the electrical connector 22 can include a channel 54 having portions that extend through both ends 42b' and 42b" so as to mate with the transceiver 18 regardless of the orientation of the transceiver 18. The channel can have portions disposed at any location as desired in any suitable orientation so as to receive the fibers when the transceiver in in any of the first and second orientations described herein. For instance at least one portion of the channel 54 can extend into at least one of the sides of the connector housing 42, and at least one other portion of the channel 54 can extend into at least one of the ends of the connector housing 42. Alternatively, a first electrical connector 22 can define the channel 54 extending through the second end 42a" of the connector housing, and thus is configured to mate with the transceiver 18 in the first orientation 28 and first example of the second orientation 30, and a second electrical connector 22 can define the channel 54 extending through the first end 42a' of the connector housing, and thus is configured to mate with the transceiver 18 in the second example of the second orientation 30.

In this regard, the channel 54 can have first and second portions that are discontinuous with respect to each other, and are positioned at different locations of the connector housing 42. For instance, the first and second portions can be opposite each other. In one example, the first and second portions can be opposite each other along the transverse direction T. Alternatively or additionally, the first and second portions can be opposite each other along a direction that is perpendicular to the transverse direction T. For instance, the first and second portions can be opposite each other along the longitudinal direction L. In another example, the first and second portions can be aligned with each other along a plane that is defined by the longitudinal direction L and the lateral direction A. One of the first and second portions can extend into an end of the connector housing 42, and the other of the first and second portions can extend into a side of the connector housing 42.

In one example, it can be decided whether an actual orientation of the transceiver 18 is designed to be in the first orientation or the second orientation. Thus, the electrical traces of the host substrate 24 can be routed according to the predetermined orientation of the transceiver 20, it being recognized that the electrical contacts 44 of the electrical connector 22 will mate with first respective ones of the electrical contacts 38 of the transceiver 20 when the predetermined orientation is the first orientation 28, and the electrical contacts 44 of the electrical connector 22 will mate with second respective ones of the electrical contacts 38 of the transceiver 20 when the predetermined orientation is the second orientation 30. The first respective ones of the electrical contacts 38 are different than the second respective ones of the electrical contacts 38. Further, it should be appreciated that first mating ends of the mating ends 47 of the transceiver 18 at the first side 36a' and second mating ends of the mating ends 47 of the transceiver 18 at the second side 36" can be symmetrical with respect to a longitudinal midplane that extends centrally through the transceiver 18 along the longitudinal and transverse directions. Alternatively or additionally, it should be appreciated that first mating ends of the mating ends 47 of the transceiver 18 at the first side 36a' and second mating ends of the mating ends 47 of the transceiver 18 can be symmetrical with respect to a lateral midplane that extends centrally through the transceiver 18 along the lateral and transverse directions. Thus, the midplanes can thus be oriented orthogonal to each other. Alternatively still, the first mating ends and the second mating ends can be asymmetrically arranged. Thus, it is envisioned in certain examples that one or more mating ends 47 of the transceiver 18 can mate with the electrical connector 22 when the transceiver 18 is in the first orientation, but not mate with the electrical connector 22 when the transceiver 18 is in the second orientation.

While the transceiver includes electrical contacts that mate with respective mating ends of the electrical connector both when the transceiver is in the first orientation and in the second orientation, it should be appreciated that the transceiver can include one or more additional electrical contacts having mating ends that mate with the mating ends of the electrical connector when the transceiver is in the first orientation but not the second orientation. Conversely, the transceiver can include one or more mating ends that mate with the mating ends of the electrical connector when the transceiver is in the second orientation but not the first orientation.

Referring again to FIGS. 3, 8A-8C and 11A-C, the mating ends 47 of the electrical contacts 38 of the transceiver 18 can be disposed at the outer surface 35 of the transceiver housing 36. Further, the mating ends 47 can face away from a central transverse axis of the optical transceiver 18 that is oriented along the transverse direction. That is, the mating ends 47 can face a direction that has at least a directional component that extends away from the central transverse axis. Further, the mating ends 47 can be positioned such that the transceiver 18 is configured to mate to the complementary electrical device in the form of the electrical connector 22 at a location outboard of the optical engine. Thus, an electrical contact region of the transceiver 18 can be displaced from the optical engine in a direction substantially parallel to the major surfaces of the host substrate. The electrical contact region can be defined by the mating ends of the electrical contacts of the transceiver 18. The optical transceiver can define a height off a top surface of the host substrate along the transverse direction that is less than a distance in a group consisting of 5 mm, 3 mm, and 2.5 mm.

In one example, the mating ends 47 of the electrical contacts 38 are disposed at the opposed sides 36a and none of the mating ends 47 are disposed at either or both of the opposed ends 36b. Alternatively, some, up to all, of the mating ends 47 can be supported at one or both of the opposed ends 36b. Thus, none of the mating ends 47 can be supported at either or both of the opposed sides 36a. Alternatively still, some of the mating ends 47 can be disposed at the opposed sides 36a, and others of the mating ends 47 can be disposed at the opposed ends 36b. It should be appreciated that still other arrangements of the electrical contacts 38 are contemplated. One or more optical fibers 40 can extend out from one or more of the opposed sides 36a and the opposed ends 36b. In particular, the optical fibers 40 can exit the transceiver housing 36 at a location between the first and second surfaces 32 and 33 with respect to the transverse direction T, and spaced from each of the first and second surfaces 32 and 33 so as to provide clearance both when the transceiver 18 is in the first orientation and when the transceiver 18 is in the second orientation. For instance, the optical fibers 40 can exit the transceiver housing 36 at a location that is closer to (or further from) the second surface 33 than the first surface 32 with respect to the transverse direction T. Alternatively, the optical fibers 40 can exit the transceiver housing 36 at a location that is equidistantly spaced to the first and second surfaces 32 and 33, respectively, along the transverse direction T.

In one example, the at least one optical fiber and/or at least one electrical cable of the transceiver 18 can extend out from the same one of the opposed ends 36b, and extend through the same channel 54 of the electrical connector 22 both when the transceiver 18 is mated to the electrical connector 22 in the first orientation, and when the transceiver 18 is mated to the electrical connector 22 in the second orientation. In another example, the at least one optical fiber and/or at least one electrical cable of the transceiver 18 can extend out from opposed ones of the opposed ends 36b, and extend through different channels 54 of the electrical connector 22 both when the transceiver 18 is mated to the electrical connector 22 in the first orientation, and when the transceiver 18 is mated to the electrical connector 22 in the second orientation. In yet another example, the at least one optical fiber and/or at least one electrical cable of the transceiver 18 can extend out from the same one of the opposed sides 36a, and extend through the same channel 54 of the electrical connector 22 both when the transceiver 18 is mated to the electrical connector 22 in the first orientation, and when the transceiver 18 is mated to the electrical connector 22 in the second orientation. In still another example, the at least one optical fiber and/or at least one electrical cable of the transceiver 18 can extend out from opposed ones of the opposed sides 36a, and extend through different channels 54 of the electrical connector 22 both when the transceiver 18 is mated to the electrical connector 22 in the first orientation, and when the transceiver 18 is mated to the electrical connector 22 in the second orientation. The routing of the signal traces in the underlying substrate 24 can be determined according to the intended orientation of the transceiver 18.

It should be appreciated that, as described above with respect to the electrical connector 22, the outer surface 35 of the transceiver housing at the opposed sides 36a and the opposed ends 36b can combine so as to define any shape as desired. The shape can be an annular shape in a plane that is oriented perpendicular to the transverse direction T. In this regard, it should be appreciated that an optical transmitter that is configured to receive electrical input signals, and activate a light source to the outer perimeter of the transceiver housing 36, can define the shape. The outer perimeter of the transceiver housing 36 can be along a plane that is oriented perpendicular to the transverse direction T. Further, the mating ends 47 can be arranged along a path that at least partially defines the shape. The shape can be continuous or interrupted, for instance by the optical fibers 40. It should be appreciated that the shape can be any one of a circle, a triangle, a rectangle, a square, an ellipse, or any alternative polygon as desired along a plane that is perpendicular to the transverse direction T. It should be appreciated that any one or more up to all of the sides 36a and the ends 36b can be discontinuous or continuous as desired.

Referring now to FIGS. 8A-8C in particular, the optical transceiver 20 can include at least one optical engine 56 that is supported by the transceiver housing 36 and in electrical communication with respective ones of the electrical contacts 38. For instance, the at least one optical engine 56 can be configured as an optical transmitter that is configured to receive electrical input signals, and activate a light source to generate optical signals that correspond to the electrical input signals for use in an optical communication system 34. Alternatively or additionally, the at least one optical engine 56 can be configured as an optical receiver that is configured to receive optical signals, and convert the received optical signals to electrical signals suitable for use in a data communication system. In this regard, the at least one optical engine 56 can include a first optical engine that defines the optical transmitter, and a second optical engine that is separate from the first optical engine and define the optical receiver. Alternatively, the at least one optical engine 56 can define a single optical engine that provides both the optical transmitter and the optical receiver.

The optical transmitter can include an opto-electrical element that is configured as at least one light source that generates and emits optical signals corresponding to the electrical input signals. The light source is typically a laser light source, such as a VCSEL (Vertical Cavity Surface Emitting Laser) or an alternative type of laser. The optical transmitter can further include a photonic integrated circuit (PIC) that receives the light emitted from the light source. Alternatively, the optical transmitter can include one or more lenses and one or more fibers that receive light from the light source that travels through the one or more lenses. The optical transmitter can further include a light source driver that drives the pulsation or modulation of the light source. It is recognized that the performance of the light source primarily but also of the driver can be adversely affected at high operating temperatures. Therefore, it is desirable to remove heat from the transmitter. Because the light source driver can produce large amounts of heat, it can be desirable to remove heat from the light source driver. While one example of an optical transceiver has been described, it should be readily apparent to one having ordinary skill in the art that the functionality of the transmitter and the receiver can be achieved using any suitable alternative construction, and that all such constructions are contemplated under the scope of the present disclosure. Heat from heat-generating apparatus of the transceiver can be dissipated in any manner described herein in all such suitable alternative constructions.

The optical receiver can include at least one opto-electrical element that can be configured at least one photodetector, such as an array of photodetectors, that receives optical signals from at least one optical input cable, and convert the optical signals to electrical signals that can have current levels proportional with the quantity of optical photons per unit time received in the optical signals. The photodetectors can be configured as photodiodes in accordance with certain examples. The optical receiver can include a current-to-voltage converter, such as a transimpedance amplifier (TIA) that receives the electrical signals from the photodetectors amplifies the electrical signals to voltage levels that can be output to the electrical output contacts for use in a data communication system. Thus, the at least one optical engine 56 of the optical transceiver 20 can be configured as an optical receiver. The performance of photodiodes and TIA can be adversely affected at high operating temperatures. Therefore, it can be desirable to remove heat from the current-to-voltage converter, which can produce large amounts of heat during operation.

The at least one optical engine 56 can be wire bonded to the electrical contacts 38 via one or more wire bonds 57. It should be appreciated, of course, that the at least one optical engine 56 can be placed in electrical communication with the electrical contacts in any suitable alternative manner as desired. For instance, the transmitter can be wire bonded to the electrical input contacts, flipped chipped, directly or indirectly, to the electrical input contacts or otherwise placed in electrical communication with the electrical input contacts. In one example, the optical driver can be wire bonded to the electrical input contacts, or otherwise placed in electrical communication with the electrical input contacts. Further, the receiver can be wire bonded to the electrical output contacts, or otherwise placed in electrical communication with the electrical output contacts. In one example, the current-to-voltage amplifier can be wire bonded to the electrical output contacts, or otherwise placed in electrical communication with the electrical output contacts. The wire bonds 57 can be disposed between the electrical contacts 38 and the second surface 33 with respect to the transverse direction T.

The optical transceiver 20 can further include an optical coupler 55 that is configured to operatively couple the at least one optical engine 56 to the optical fibers. Thus, the optical signals from the optical input fibers can be coupled to the photodetectors, and the optical signals from the optical transmitter can be coupled to the optical output fibers.

As described above, it can be desired to remove heat from the at least one component of the at least one optical engine 56 so as to maintain the temperature of the corresponding at least one optical element. For instance, it can be desired to remove heat from at least one or both of the light source driver and from the current-to-voltage converter. Accordingly, the transceiver housing 36 can place the at least one optical engine 56 in thermal communication with the thermally conductive first surface 32. In particular, the transceiver housing 36 can include at least one thermally conductive body 60 that is in mechanical contact with the at least one optical engine 56 and further defines the thermally conductive first surface 32. Accordingly, the thermally conductive body 60 establishes a thermally conductive path from the at least one optical engine 56 to the thermally conductive first surface 32. Accordingly, when the first surface 32 is in mechanical contact with a heat dissipation member, a thermally conductive path is established from the at least one optical engine 56 to the heat dissipation member.

As illustrated in FIGS. 8A and 8C in particular, the at least one thermally conductive body 60 can be a metallic body 62, that is thus electrically conductive. For instance, the thermally conductive body 60 can be made of copper. It should be appreciated that the thermally conductive body can be made of any suitable alternative metal as desired. Further, the at least one thermally conductive body 60 can be a single monolithic body that extends from the at least one optical engine 56 to the first surface 32. Alternatively, the at least one thermally conductive body 60 can be configured as a plurality of thermally conductive bodies that can be made of the same material or different materials. The materials of the respective bodies can be any combination of metallic and non-metallic materials as desired.

When the at least one thermally conductive body 60 is metallic, it is desirable to electrically insulate the electrical contacts 38 from the thermally conductive body 60. Thus, the transceiver housing 36 can include an electrically non-conductive body 64, and respective portions of the electrical contacts 38 can be embedded in the electrically nonconductive body 64 such that the electrical contacts 38 are electrically isolated from the metallic body 62, and thus from the metallic first surface 32. In one example, the respective portions of the electrical contacts 38 can be insert molded in the electrically nonconductive body 64. Alternatively, the respective portions of the electrical contacts 38 can be inserted into the electrically nonconductive body 64. The transceiver housing 36 can further include potting 66 that at least partially surrounds the optical coupler 55. The second surface 33 can thus be at least partially defined by the potting 66. Alternatively or additionally, the second surface 33 can be at least partially defined by the electrically nonconductive body 64. In one example, the electrically nonconductive body 64 and the potting 66 can combine so as to define the second surface 33. In this regard, it should be appreciated that the first surface 32 can be thermally conductive, and the second surface 33 can be thermally non-conductive or insulative. Alternatively, at least a portion of the second surface 33 can be thermally conductive. However, the transceiver can be constructed such that a majority of heat produced by one or more components of the transceiver travels to the first surface 32. For instance, the transceiver can be constructed such that a majority of heat produced by one or more components of the transceiver conducts to the first surface 32.

Further, the thermal resistance of the second surface 33 can be engineered to be more or less resistive to meet a certain goal such as maximizing heat dissipation through that surface 33. Alternatively, the second surface 30 can be made thermally insulative to prevent heat generated by external components from travelling through the transceiver to the first surface 32. This can occur, for instance, if the PCB is hotter than the transceiver and the transceiver is oriented in the second orientation 30 with surface 32 facing up. Alternatively a thermal insulating layer applied to surface 33 can be used to increase thermal isolation.

Referring now to FIG. 8B, the at least one thermally conductive body 60 can be electrically insulative and non-metallic, such as a ceramic. The ceramic can be a multilayer ceramic. The thermally conductive body 60 can include one or more layers 68 of a non-metallic material. The non-metallic material can further be electrically non-conductive. Adjacent ones of the layers 68 can be disposed adjacent each other at a respective interface 70. Respective portions of the electrical contacts 38 can be embedded in the electrically non-conductive body 60. For instance, the respective portions of the electrical contacts 38 can be disposed at one of the interfaces 70 between first and second electrically non-conductive layers 68. One of the layers 68 can define the first surface 32 of the transceiver housing 36. In one example, the layers 68 can be made of the same material. One of the layers 68 can define the first surface 32, and another one of the layers 68 can at least partially define the second surface 33. For instance, as described above with respect to FIGS. 8A and 8C, the transceiver housing 36 can include potting 66 that at least partially surrounds the optical coupler 55. The second surface 33 can thus be at least partially defined by the potting 66 and one of the layers 68. In this regard, the first surface 32 and at least a portion of the second surface 33 can be thermally conductive. Further, the first surface and the at least a portion of the second surface 33 can be in thermal communication with each other and with the at least one optical engine 56. Thus, each of the first and second surfaces 32 and 33 can be configured to be placed in mechanical contact with respective heat dissipation members.

While the transceivers of the type described herein are configured to be placed into contact with the heat dissipation member 26 as shown in FIGS. 1A-1E, it should be appreciated that the transceiver can further include fins 49 (see FIGS. 7A-7B) that extend directly out from the thermally conductive first surface 32 along the transverse direction T. For instance, the fins 49 can be monolithic with the first surface 32. Alternatively, the fins 49 can be attached to the first surface 32 in any manner as desired. Alternatively still, the first surface 32 can be placed in thermal communication with the fins 49 in any manner described herein, such that the fins 49 define the heat dissipation member 26.

In FIGS. 8A-8C, the transceiver housing 36 can span an entirety of the height of the transceiver along the transverse direction T. Accordingly, the transceiver housing 36 can be configured to absorb at least a portion of the compression forces applied to the transceiver 20 from the heat dissipation member without transmitting the absorbed portion of the compression forces to the optical engine 56 or the optical coupler 55. For instance, referring to FIG. 9A, the communication system 34 can include a lid 72 that is configured to releasably secure the transceiver 18 to the electrical connector 22. The lid 72 can bear against the upper surface of the transceiver 20 and bias the transceiver 20 against the underlying substrate 24. Thus, the lid 72 can cooperate with the host substrate 24 so as to capture the optical transceiver 20 therebetween along the transverse direction T. Otherwise stated, the heat dissipation member 26, configured as the heat spreader 41 of the host substrate 24 or the heat dissipation plate 48 (FIG. 1A) that extends through the host substrate 24, can cooperate with the lid 72 so as to apply the compressive force against the first surface 32 when the transceiver 20 is in the first orientation. As illustrated in FIG. 9B, when the transceiver 20 is in the second orientation, the heat dissipation plate 48 can apply the compressive force along the transverse direction T to the first surface 32, such that the transceiver 20 is captured between the heat dissipation plate 48 and the host substrate 24.

The electrical contacts of both transceiver constructions illustrated in FIGS. 8A-8C can be constructed in accordance with any example disclosed herein. In this regard, it should be appreciated that the electrical contacts of the transceiver constructions of can be different than each other as illustrated in FIGS. 8A and 8B, or the same as each other as illustrated in FIGS. 8B and 8C. It will thus be appreciated that both transceiver constructions illustrated in FIGS. 8A and 8C, and the transceiver construction illustrated in FIG. 8B can be configured to mate with the same electrical connector 24 in both the first orientation and the second orientation.

While FIGS. 8A-8C illustrate respective potential constructions for the optical transceiver 20, it should be appreciated that the optical transceiver 20 can be alternatively constructed in any suitable manner as desired so as to define the thermally conductive first outer surface 32 in thermal communication with at least one optical engine.

Referring now to FIGS. 10A-10H generally, it is recognized that the communication system 34 can include a motion limiter 74 that limits movement of the optical transceiver 20 with respect to the electrical connector 22 along the transverse direction T. In one example, the motion limiter 74 can define a mechanical stop that prevents further movement of the transceiver 20 relative to the electrical connector 22 in one or both of the upward and downward directions. In another example, the motion limiter 74 can apply a locating or centering force to the transceiver 20 that resists movement of the transceiver 20 with respect to the electrical connector 22 in each of the upward and downward direction. In still another example, the motion limiter can apply a biasing force to the transceiver that urges the transceiver 20 to move with respect to the electrical connector 22 in the upward direction. In yet another example, the motion limiter can apply a biasing force to the transceiver that urges the transceiver 20 to move with respect to the electrical connector 22 in the downward direction. The locating force of the motion limiter 74 can be provided in addition to, or instead of, a locating force that can be applied by the mating ends 47 and 52 as described above. Thus, the locating force of the motion limiter 74 can be overcome when the transceiver 20 is mated to the connector 22, and when the transceiver 20 is removed from the connector 22.

The motion limiter 74 can be defined, in combination, by the optical transceiver 20 and the electrical connector 22. For instance, the motion limiter 74 can include a first motion limiter element 76 that is defined by the transceiver 20, and a second motion limiter element 78 that is defined by the electrical connector 22. One of the first and second motion limiter elements 76 and 78 can mechanically interfere with the other of the first and second motion limiter elements 76 and 78 so as to limit movement of the transceiver 20 relative to the electrical connector 22 along the transverse direction T as described above.

The first motion limiter element 76 can be configured as at least one first pocket 80 (see also FIG. 11C) that extends into the transceiver 20. For instance, the at least one first pocket 80 can extend into the transceiver housing 36. In one example, the at least one first pocket 80 can extend into the outer surface 35 of the transceiver housing 36. The at least one first pocket 80 can include a plurality of first pockets 80 that extend into the outer surface 35 of the transceiver housing 36. In one example, the first pockets 80 can extend into ones of the sides 36a or the ends 36b, respectively, (see, e.g., FIG. 11A-11C) and the mating ends of the electrical contacts of the transceiver 20 can be disposed at the other of the sides 36a and the ends 36b. Thus, the first pockets 80 can be configured so as to not disrupt the electrical contacts of the transceiver 20. In one example, the mating ends of the electrical contacts can be carried at the opposed sides 36a, and the first pockets 80 can be disposed at one or both of the opposed ends 36b (FIG. 11C).

Similarly, the second motion limiter element 78 can be configured as at least one second pocket 82 that extends into the electrical connector 22. For instance the at least one second pocket 82 can extend into the connector housing 42. In one example, the at least one second pocket 82 can extend into the inner surface 43 of the connector housing 42. The at least one second pocket 82 can include a plurality of second pockets 82 that extend into the inner surface 43 of the connector housing 42. In one example, the second pockets 82 can extend into ones of the sides 42a or the ends 42b, respectively, (see, e.g., FIG. 3) and the mating ends of the electrical contacts of the connector can be disposed at the other of the sides 42a and the ends 42b. Thus, the second pockets 82 can be configured so as to not disrupt the electrical contacts of the electrical connector 22. In one example, the mating ends of the electrical contacts can be carried at the opposed sides 42a, and the second pockets 80 can be disposed at one or both of the opposed ends 42b.

Respective pairs of first and second pockets 80 and 82 can be operatively aligned with each other, such that a latch 84 disposed in one of the first and second pockets 80 and 82 of the pair can removably extend into the other one of the first and second pockets 80 and 82 of the pair. In this regard, one of the first and second motion limiter elements 76 and 78 can further include at least one latch 84 that resides in a respective one of the first and second pockets 80 and 82 of each operatively aligned pair of pockets, and can move into the other of the first and second pockets 80 and 82, of the operatively aligned pair of pockets.

Thus, the latch 84 can be configured to move between a first unlatched position to a second latched position. In the unlatched position, the latch 84 is disposed in the respective one of the first and second pockets 80 and 82, and does not extend into the other of the first and second pockets 80 and 82. Thus, the latch 84 does not limit movement of the transceiver 20 with respect to the electrical connector 22 when the latch 84 is in the unlatched position. In the latched position, the latch 84 extends from the one of the first and second pockets 80 and 82 into the other of the first and second pockets 80 and 82. Thus, when the latch 84 is in the latched position, the latch 84 is configured to limit movement of the transceiver 20 relative to the electrical connector 22, and thus relative to the host substrate 24 and heat dissipation member, with respect to the transverse direction T. For instance, the latch 84 can reside in the first pocket 80 of the transceiver 20, and can move into second pocket 82 of the electrical connector 22 when in the latched position. Alternatively, the latch 84 can reside in the second pocket 82 of the electrical connector 22, and can move into first pocket 80 of the transceiver 20 when in the latched position.

Figure 10A:
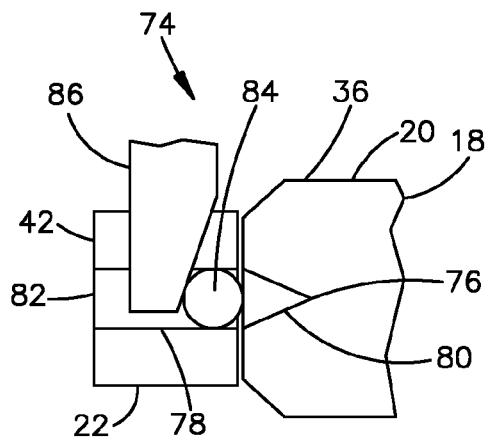
FIG. 10A is a schematic side elevation view of a portion of a motion limiter constructed in one example, showing a lock member in an unlocked position.
Figure 10B:
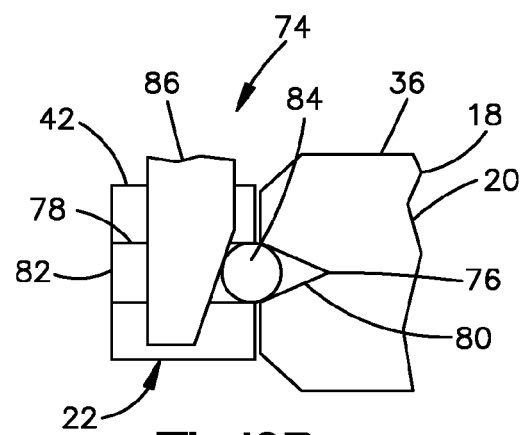
FIG. 10B is a schematic side elevation view of the motion limiter illustrated in FIG. 10A, but showing the lock member in a locked position.

The latch 84 can receive a latching force that urges the latch 84 to the latched position. For instance, as illustrated in FIG. 10A-10B, the motion limiter 74 can include a lock member 86 that is configured to move between an unlocked position and a locked position. As shown in FIG. 10A, when the lock member 86 is in the unlocked position, the lock member 86 is disengaged from the latch 84, such that the lock member 86 does not urge the latch 84 to move from the one of the pockets 80 and 82 to the other of the pockets 80 and 82. As shown in FIG. 10B, the lock member 86 can move from the unlocked position to the locked position, whereby the lock member 86 urges the latch 84 into the latched position. The lock member 86 can move between the unlocked position and the locked position along a direction that is angled with respect to the direction of travel of the latch 84 as it moves between the latched position and the unlatched position.

During installation, the transceiver 20 is mated with the electrical connector with the lock member 86 in the unlocked position. The lock member 86 can then be moved to the locked position to thereby move the latch to the latched position. This effectively constrains the motion of the transceiver 20 along the transverse direction T. When it is desired to unmate the transceiver 20 from the electrical connector 22, the lock member 86 can be moved to the unlocked position. Next, the transceiver 20 can be removed from the electrical connector 22 along the transverse direction T, such as in the upward direction. In this regard, the latch 84 can define one or more surfaces or features, like a spring, that causes the latch 84 to move to the unlatched position as the transceiver 20 is unmated from the electrical connector 22. For instance, an upper surface of the latch 84 can be angled, such as straight or curved, with respect to the plane normal to the transverse direction T. Alternatively or additionally, the upper surface of the transceiver 20 or the electrical connector 22 that defines the other of the first and second pockets 80 and 82 can be angled, such as straight or curved, with respect to the plane normal to the transverse direction T. The upper surfaces can engage so as to urge the latch 84 to move to the unlatched position as the transceiver 20 is unmated and removed from the electrical connector 22.

It should be appreciated that FIGS. 10A-10F show the motion limiter 74 schematically, and that in practice additional features can be added to ensure that the motion limiter 74 operates properly. For instance, the motion limiter 74 can include one or more members that prevents the latch 84 from becoming removed from the channel 78. Alternatively or additionally, the motion limiter 74 can include additional channels that guide and provide reaction surfaces for the lock member 86.

In one example, a first mechanism can be provided that moves the latch 84 from the unlatched position to the latched position as well as a second mechanism that moves the latch 84 from the latched position to the unlatched position. Either or both of the first and/or second mechanisms can be configured as a mechanical component that applies a biasing force and motion onto the latch 84. Alternatively one or both of the first and second mechanism can be configured as a spring that applies a biasing force and motion onto the latch 84. In one example, the second mechanism can be the shape of the transceiver or connector walls 36 and 42 respectively and of the pocket 76 or 78 that provides a biasing force to move the latch 84 to the unlatched position when the transceiver in either inserted into or removed from the electrical connector.

Alternatively or additionally, referring now to FIGS. 10C-10H, the motion limiter 74 can include a spring member 88 that is configured to apply the latching force to the latch 84. The spring member 88 can be seated in the housing that defines the one of the first and second pockets 80 and 82. For instance, if the latch 84 resides in the second pocket 82 of the electrical connector 22, then the spring member 88 can be seated against the connector housing 42 at one end and attached to the latch 84 at its opposite end. Alternatively, the latch 84 can reside in the first pocket 80 of the transceiver 20. In this example, the transceiver housing 36 can support the spring member 88, such that the spring member 88 biases the latch 84 toward the connector housing 42, and thus toward the latched position.

During operation, the transceiver 20 is mated with the electrical connector 22, and the spring member 88 biases the latch 84 to move to the latched position. For instance, a lower surface of the latch 84 can be angled, such as straight or curved, with respect to the plane normal to the transverse direction T. Alternatively or additionally, a surface of the transceiver 20 or the electrical connector 22 that defines the other of the first and second pockets 80 and 82 can be angled, such as straight or curved, with respect to the plane normal to the transverse direction T. The latch 84 can be naturally biased to the latched position. Accordingly, the surface of the latch and the surface of the transceiver or electrical connector can engage so as to urge the latch 84 to move to the unlatched position against the spring force as the transceiver 20 mated to the electrical connector 22. Once the transceiver 20 and the electrical connector 22 are mated, the latch 84 is aligned with the other of the first and second pockets 80 and 82. The spring member 88 can thus drive the latch 84 to move into latched position. Alternatively, the latch 84 can be naturally biased to the unlatched position and a additional mechanism forces the latch in the closed position.

When it is desired to unmate the transceiver 20 from the electrical connector 22, the transceiver 20 can be removed from the electrical connector 22 along the transverse direction T, such as in the upward direction. In this regard, the latch 84 can define one or more surfaces that cases the latch 84 to move to the unlatched position as the transceiver 20 is unmated from the electrical connector 22. For instance, an upper surface of the latch 84 can be angled, such as straight or curved, with respect to the plane normal to the transverse direction T. Alternatively or additionally, the upper surface of the transceiver 20 or the electrical connector 22 that defines the other of the first and second pockets 80 and 82 can be angled, such as straight or curved, with respect to the plane normal to the transverse direction T. The upper surfaces can engage so as to urge the latch 84 to move to the unlatched position against the force of the spring member 88 as the transceiver 20 is unmated and removed from the electrical connector 22.

It should be appreciated that the latch 84 can define any suitable size and shape as desired. In one example, the latch 84 can be rounded as illustrated in FIGS. 10A-10B. For instance, the latch 84 can define a sphere, a portion of a sphere, a cylinder, an ellipse, a portion of an ellipse, or any suitable alternative rounded structure. It should be appreciated that, as used herein, the rounded latch 84 can define angled upper and lower faces that can be curved when the latch is rounded. Alternatively, as illustrated in FIGS. 10C-10H, the latch 84 can be wedge shaped. It should be appreciated that, as used herein, the rounded latch 84 can define angled upper and lower faces that can be straight or curved when the latch 84 is wedge shaped. One or both of the upper and lower surfaces that define the other of the first and second pockets 80 and 82 can further be angled. Alternatively or additionally, as illustrated in FIGS. 10D-10F, one or both of the upper and lower surfaces that define the other of the first and second pockets 80 and 82 can be planar along a plane that extends perpendicular to the transverse direction T.

Figure 10C:
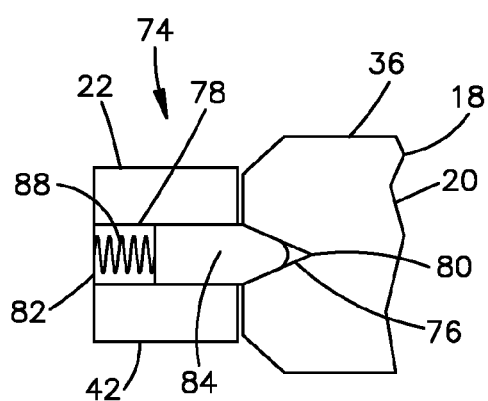
FIG. 10C is a schematic side elevation view of a portion of a motion limiter constructed in accordance with another example.
Figure 10D:
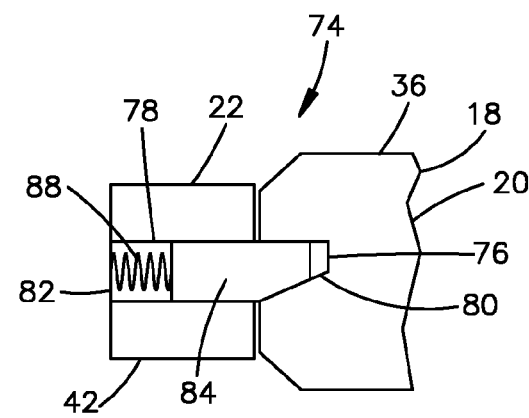
FIG. 10D is a schematic side elevation view of a portion of a motion limiter constructed in accordance with still another example.
Figure 10E:
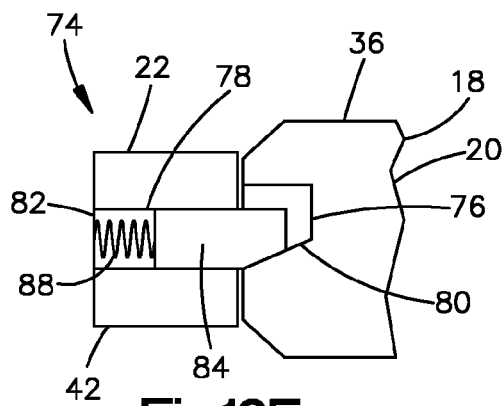
FIG. 10E is a schematic side elevation view of a portion of a motion limiter constructed in accordance with yet another embodiment.
Figure 10F:
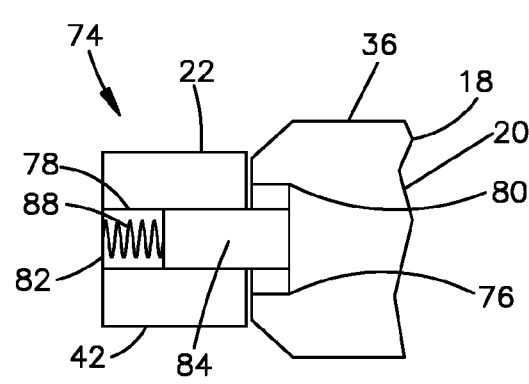
FIG. 10F is a schematic side elevation view of a portion of a motion limiter constructed in accordance with another example.
Figure 10G:
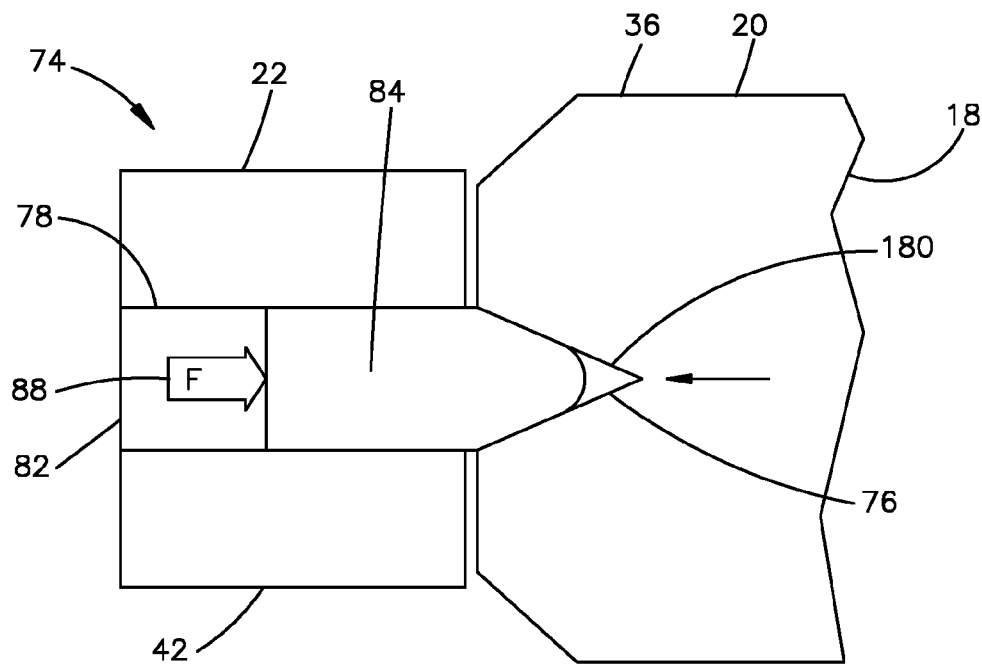
FIG. 10G is a schematic side elevation view of a portion of a motion limiter constructed in accordance with another example.
Figure 10H:
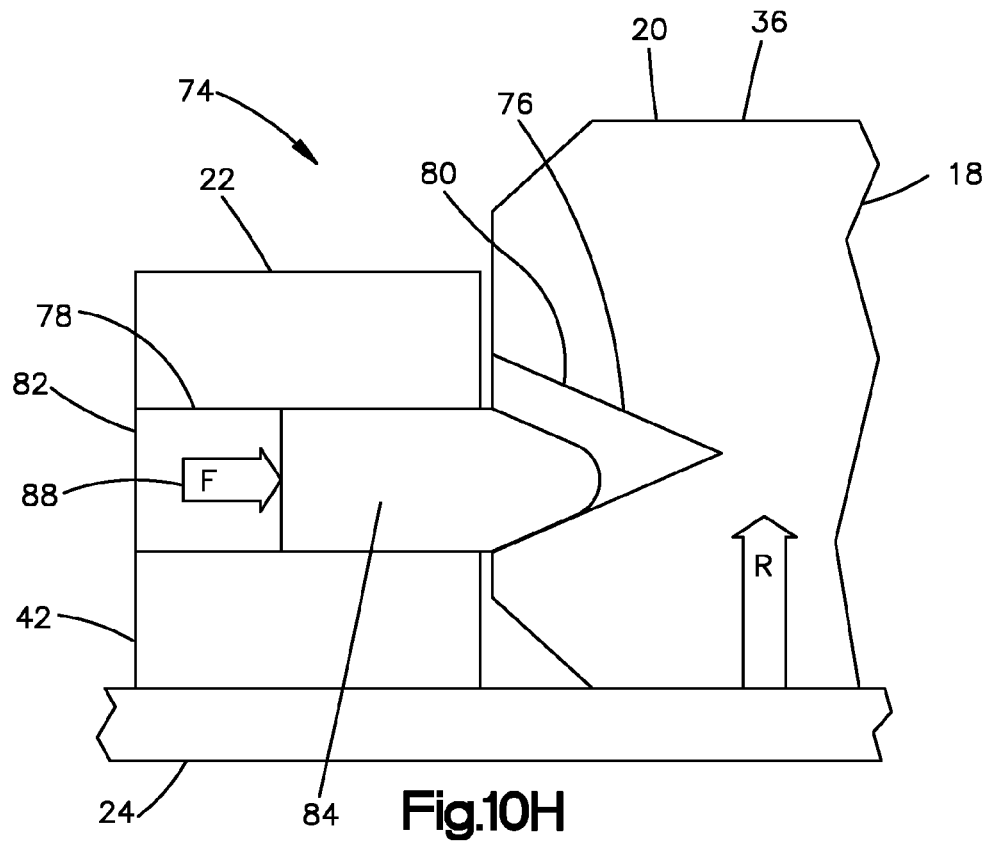
FIG. 10H is a schematic side elevation view of a portion of a motion limiter constructed in accordance with another example.

Referring now to FIGS. 10A-10C, the upper and lower surfaces of the latch 84 can be angled so as to self-locate in the other if the first and second pockets 80 and 82 (illustrated as the second pocket 80 in FIGS. 10A-10C), which can be partially defined by angled upper and lower surfaces (see also FIG. 10G). Alternatively, as referring to FIG. 10D, the upper surface of the latch 84 can be planar along a respective plane that extends perpendicular to the transverse direction T. Similarly, the upper surface of the other of the first and second pockets latch 84 can be planar along a respective plane that extends perpendicular to the transverse direction T. Thus, the upper surfaces can engage so as to prevent further movement of the transceiver 20 relative to the electrical connector 22 in the downward direction. Further, the lower surfaces of the latch 84 and the other of the first and second pockets 80 and 82 can be angled so as to urge the transceiver 20 in the downward direction relative to the electrical connector 22 until the planar surfaces engage each other. As illustrated in FIG. 10E, the upper surface of the other of the first and second pockets 80 and 82 can be spaced from the upper surface of the latch 84 along the transverse direction. Accordingly, the angled lower surfaces can engage so as to bias the transceiver 20 in the downward direction with respect to the electrical connector 22 and thus the underlying substrate 24 (see also FIG. 10H). As illustrated in FIG. 10H, the host substrate 24 can define an upward reactive force R that counters the biasing force against the transceiver 20 in the downward direction. As illustrated in FIG. 10F, the upper and lower surfaces that define the other of the first and second pockets 80 and 82 can be spaced from each of the upper and lower surfaces of the latch 84, respectively, along the transverse direction. Thus, the transceiver 20 can float relative to the electrical connector 22 up and down along the transverse direction T, but are prevented from moving further along the transverse direction when the surfaces contact each other.

Generally, the transceiver 18 and the electrical connector 22 can include any suitably construction motion limiter that restricts motion of the transceiver 18 relative to the electrical connector 22 along the transverse directions during operation and that can be disengaged to install and remove the transceiver 18 into and from the electrical connector 22. Such a motion limiter can limit the motion of the transceiver 18 relative to the electrical connector 22 at a certain location, provide a bias force to urge the transceiver 18 against an external surface, or limit the motion of the transceiver 18 over a range of positions along the transverse direction. Alternatively the transceiver 18 and electrical connector 22 can be devoid of a motion limiter. In such an example, the normal forces of the mated electrical contact 38 and 44 can retain the transceiver 18 in the electrical connector 22. Alternatively, an external component such as the substrate and a cold plate can provide forces that retain the transceiver 18 in the electrical connector. Thus, it should be appreciated that the latch can be external of the transceiver 18 and electrical connector 22.

Referring to FIG. 10C, the latch 84 can have a geometry that will center the transceiver 18 relative to the electrical connector 22 at a predetermined position along the transverse direction T. In particular, each of the upper and lower surfaces of the latch 84 can define biasing surfaces of the latch 84 that are configured to provide a centering force to the transceiver 18. If motion of the transceiver 18 is blocked before reaching this predetermined position, the latch 84 will provide a biasing force against the transceiver that urges the transceiver 18 toward this predetermined position.

Referring to FIG. 10D, the latch 84 can have a geometry that will center the transceiver 18 relative to the electrical connector 22 at a predetermined position along the transverse direction T. In particular, one of the upper and lower surfaces of the latch 84 can define a biasing surface that is configured to provide a centering force to the transceiver 18 in a select direction. This latch design can be particularly useful when it is known in which direction the transceiver 18 is likely to be off-center. If motion of the transceiver is blocked before reaching this predetermined position, the biasing surface of the latch 84 can urge the transceiver 18 toward this predetermined position in the select direction but not a direction opposite the select direction.

Referring to FIG. 10E, the latch 84 can include the single biasing surface as described above with respect to FIG. 10D. However, because the surface opposite the biasing surface is spaced from the transceiver 18 so as to define a gap therebetween, the biasing surface can be configured to urge the transceiver 18 in one direction up to a certain position. Subsequently, the gap can allow the transceiver 18 to further move in the one direction without pressure from the latch up to a second position, whereby the surface of the latch opposite the biasing surface bears against the transceiver 18.

Figure 12A:
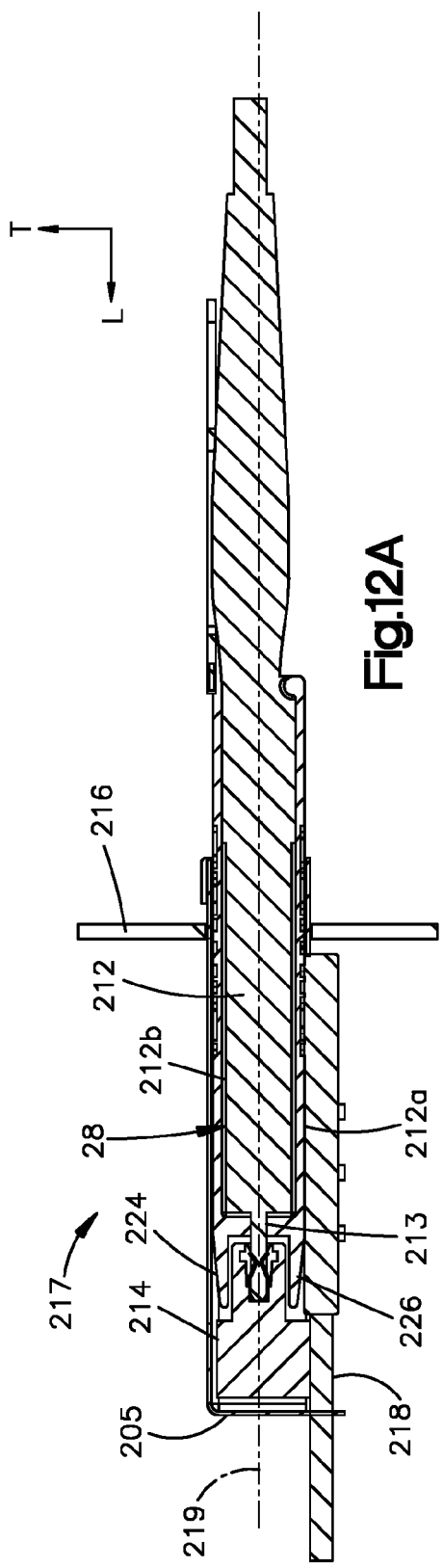
FIG. 12A is a sectional side elevation view of a panel-mount transceiver inserted into a front panel and mated with an electrical connector in a first orientation.
Figure 12B:
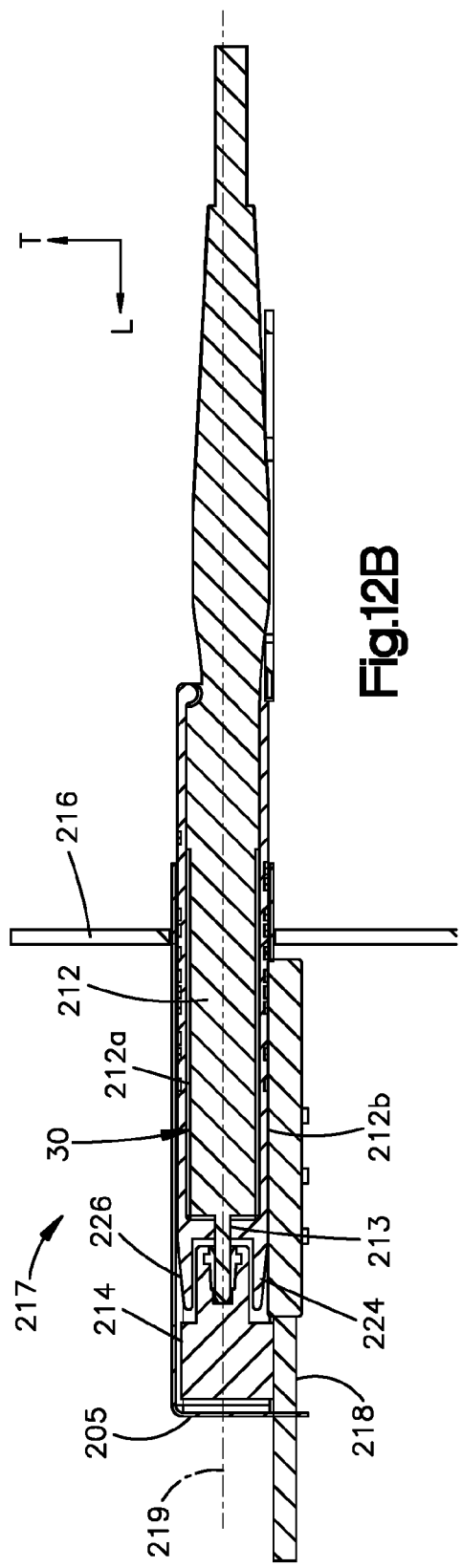
FIG. 12B is a sectional side elevation view of the panel-mount transceiver illustrated in FIG. 12A shown inserted into the front panel and mated with the electrical connector in a second orientation opposite the first orientation.

Referring now to FIGS. 12A-12B, it is recognized that alternatively constructed transceivers can be configured to mate with the same electrical connector in both a first orientation with respect to the electrical connector and in a second orientation that is opposite the first orientation with respect to the electrical connector in the manner described above. For instance, an optical transceiver 212 of the type described herein can be configured to mate with an electrical connector 214 through an aperture that extends through a panel 216 selectively in both the first orientation and in the second orientation. In particular, a communication system 217 can include the optical transceiver 212, the electrical connector 214, and a host substrate 218. In certain examples, the communication system 217 can further include a cage 205 that is configured to surround one or both of the optical transceiver 212 and the electrical connector 214. The cage 205 can be metallic, thereby shielding one or both of the optical transceiver 212 and the electrical connector 214 from electromagnetic interference (EMI) during operation and or preventing electromagnetic radiation from the transceiver or the host system to be radiated out. In some examples, the communication system 217 can include any suitable latch member as desired that assists in retaining the transceiver 212 in position when mated with the electrical connector 214.

The electrical connector 214 can include connector housing and a plurality of electrical contacts that are supported by the connector housing. The electrical contacts can define mating ends and mounting ends opposite the mating ends. The electrical connector 214 can be mounted to the host substrate 218 so as to place the electrical connector 214 in electrical communication with the host substrate 218. As described above, the host substrate 218 can be configured as a printed circuit board. The mounting ends of the electrical contacts can be placed into physical and electrical contact with respective electrical contact locations of the host substrate 218. The transceiver 212 is configured to mate with the electrical connector 214, thereby placing the transceiver 212 in electrical communication with the electrical connector 214. In one example, the optical transceiver 212 can include an edge card 213 constructed as a printed circuit board that is inserted into the electrical connector 214, thereby mating the edge card with the mating ends of the electrical contacts. In particular, the edge card defines electrical contacts that are placed in physical and electrical contact with the mating ends of respective ones of the electrical contacts of the electrical connector 214. The mating ends of the electrical contacts and the edge card 213 can define a separable interface. Thus, the edge card 213 can be mated and unmated from the mating ends without destroying the mating ends, the edge card 213, or both.

The cage 205 can be mounted to the host substrate 218, and can further be configured to extend through the aperture of the panel 216. The transceiver 212 can be inserted into the cage 205 along a longitudinal direction L. The panel 216 can be oriented along a plane that is normal to the longitudinal direction L. Thus, the plane can be defined by a transverse direction T that is perpendicular to the longitudinal direction L, and a lateral direction that is perpendicular to each of the transverse direction T and the longitudinal direction L. The aperture can extend through the panel 216 along the longitudinal direction L.

The transceiver 212 defines a first surface 212a and a second surface 212b opposite the first surface 212a along the transverse direction T. In a first orientation 28 illustrated in FIG. 12A, the transceiver 212 is mated with the electrical connector 214 such that the first surface 212a faces down. For instance, the first surface 212a can face the host substrate 218. The second surface 212b can face a top wall of the cage 205. Thus, at least a portion of the transceiver 212 is captured between the top wall of the cage 205 and the host substrate 218. In a second orientation 30 illustrated in FIG. 12B, the transceiver 212 is mated with the electrical connector 214 such that the second surface 212b faces down. For instance, the second surface 212b can face the host substrate 218. The first surface 212a can face a top wall of the cage 205. Thus, it should be appreciated that the first orientation is opposite the second orientation with respect to the transverse direction T.

In one example, at least a portion of the transceiver 212 can be symmetrical about a midplane 219 that is oriented along the longitudinal direction L and the lateral direction. Thus, the midplane 219 can bisect the at least a portion of the transceiver 212 along the transverse direction T. For instance, in one example, at least a portion of the first and second surfaces 212a and 212b can be equidistantly spaced from the midplane 219 along the transverse direction T. The edge card 213 can extend along the midplane 219, such that the midplane 219 bisects the edge card 213. The electrical connector 214 defines a receptacle that is configured to receive the edge card 213 so as to place the edge card 213, and thus the transceiver 212, in electrical communication with the electrical connector 214 in the manner described above. The midplane 219 can bisect the receptacle along the transverse direction T. It is recognized that portions of the transceiver 212 and the electrical connector 214 can be asymmetrical about the midplane 219, so long as the transceiver 212 is configured to selectively mate with the electrical connector 214 in each of the first orientation 28 and the second orientation 30.

Otherwise stated, the electrical connector 214 can be configured to mate with the transceiver edge card 213 regardless of the orientation 28 or 30 of the transceiver when the edge card 213 is inserted into the receptacle. The electrical connector 214 can further define one or more recesses 222, and the transceiver 212 can include first and second protrusions 224 and 226 that are opposite each other with respect to the transverse direction T. The first and second protrusions 224 and 226 are configured to be received into respective ones of the recesses 222 when the transceiver 212 is selectively mated with the electrical connector in each of the first and second orientations 28 and 30. The protrusions 224 and 226 can be equidistantly spaced from the midplane 219 along the transverse direction T. The protrusions 224 and 226 can be configured to protect the edge card 213 against mechanical damage or accidental electrical contact. In one example, the protrusions 224 and 226 can extend beyond the edge card 213 along the longitudinal direction L. The transceiver 212 can further include one or more latch members 230 that can be configured to engage complementary engagement members of the cage 205 so as to secure the transceiver 212 to the cage 205 when the transceiver 212 is mated with the electrical connector 214. In particular, the latch members 230 can engage the complementary engagement members of the cage 205 when the transceiver 212 is both in the first orientation 28 and when the transceiver 212 is in the second orientation 30.

The communication system 217 allows for heat to be dissipated either upward away from the host substrate 218, or downward toward the host substrate 218, in the manner described above with respect to the communication system 34, using the same transceiver 212. Thus, when the transceiver 212 is in the first orientation 28, the heat can be dissipated upward. When the transceiver 212 is in the second orientation 30, the heat can be dissipated downward. Thus, a single transceiver design or SKU (stock keeping unit) can provide both modes of heat dissipation. In one example, the heat can be dissipated from the second surface 212b of the transceiver 212. The communication system 217 can include keying features that prevents the transceiver 212 from being mated with the electrical connector 214 in any orientation other than the desired predetermined orientation. While the terms "upward" and "downward" and derivatives thereof are used with respect to the orientations illustrated in FIGS. 12A-12B, it is recognized that the actual orientations can differ during use.

While the transceiver 212 is illustrated as being pluggable into the front panel 216 so as to mate the transceiver 212 with the electrical connector 214, it should be appreciated that the transceiver 212 can alternatively be matable with the electrical connector 214 selectively in the first and second orientations 28 and 30 through a front panel or not through a front panel. It is further recognized that the transceiver 212 can be configured to mate with the electrical connector 214 in more than two orientations, as described above with respect to the communication system 34.

Figure 13:
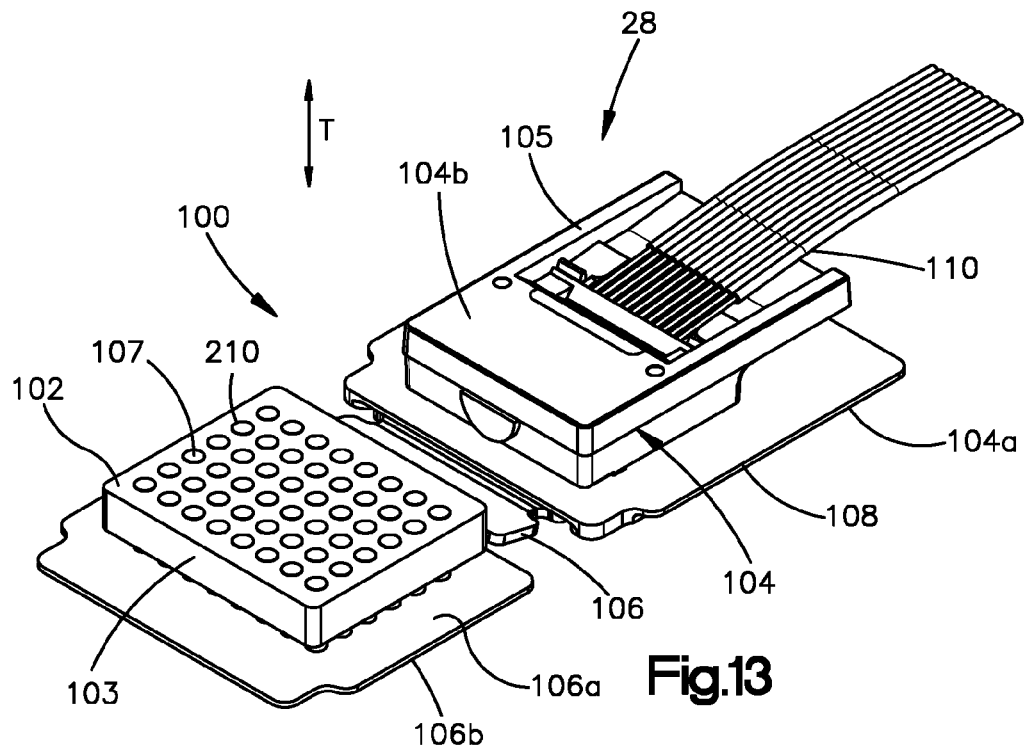
FIG. 13 is a perspective view of an optical transceiver including an electrical connector, an optical engine and a flex circuit electrically connected between the electrical connector and the optical engine.

Referring now to FIG. 13, a transceiver 100 constructed in accordance with another example can include an electrical connector 102, an optical engine 104, and a flexible electronic circuit or flex circuit 106 that places the optical engine 104 in electrical communication with the electrical connector 102. The optical transceiver 100, and in particular the transceiver housing, can further include an optical support structure 105 (also referred to as an optical block) that is configured to support an optical fiber cable 110. The transceiver 100 can include the optical fiber cable 110 in one example. Alternatively, as described above with respect to transceiver 18, the transceiver 100 can be configured to detachably couple to the optical fiber cable 110. The optical engine 104 can include one or both of an optical receiver and an optical transmitter as described above, and a base 108 that can support various components of the optical receiver and the optical transmitter. The base 108 can be configured to provide a thermal dissipation path for heat generated by the optical engine 104 during use. The optical engine 104 can include a photodetector array, a laser diode array, a lens system that optically couples these elements of the optical fiber cable 110, a laser diode array driver, and a transimpedance amplifier, as described above. Thus, the optical engine can be configured to receive optical signals, convert the optical signals to electrical signals, and output the electrical signals. In another example, the optical engine can be configured to receive electrical signals, convert the electrical signals to optical signals, and output the optical signals. In one example, the optical engine 104 may be constructed as described in U.S. Pat. Nos. 7,329,054 and 8,588,561, both of which are hereby incorporated by reference in their entirety for all purposes.

The electrical connector 102 may be a compression connector in one example. Thus, the electrical connector 102 can include an electrically insulative connector housing 103 and at least one electrical contact 210 supported by the connector housing 103. The at least one electrical contact 210 can include a plurality of electrical contacts 210. The electrical contacts 210 can include signal contacts and ground contacts. Adjacent ones of the signal contacts can define differential signal pairs. Alternatively, the signal contacts can be single ended. Alternatively still, the electrical contacts 210 can define an open pin field whereby the electrical contacts can be configured as signal contacts or ground contacts.

The electrical contacts 210 can define respective mounting ends that are configured to be mounted to the flex circuit 106. The flex circuit 106 defines a first surface 106a and a second surface 106b opposite the first surface 106a along a transverse direction T. The electrical connector 102 can be mounted to the first surface 106a of the flex circuit 106, thereby placing the electrical contacts 210 in electrical communication with the flex circuit 106. The electrical contacts 210 can further define respective mating ends 107 that are configured to mate with respective electrical contact locations 115 of a host substrate 114 (see FIG. 14B). In particular, the mating ends 107 can be compressed against respective ones of the electrical contact locations 115. Thus, the electrical connector 102 is configured to be placed in electrical communication with the host substrate 114. The electrical connector 102 can be configured as an interposer, such as a Z-ray™ interposer manufacturer by Samtec Inc. of New Albany, Ind. The electrical connector 102 may be mounted to the flexible electronic circuit element 106 using a ball grid array (BGA) or any suitable alternatively configured electrical contacts. While one example of the electrical connector 102 has been described, it should be appreciated that the electrical connector 102 can be alternatively constructed as desired.

Further, the optical engine 104 is configured to be mounted to the flex circuit 106. Mounting the optical engine 104 to the flex circuit 106 places the optical transceiver in electrical communication with the flex circuit 106. Further, when the flex circuit 106 is in electrical communication with the electrical connector 102, mounting the optical engine 104 to the flex circuit 106 can further place the optical engine 104 in electrical communication with the electrical connector 102. In particular, the optical engine 104 can include electrical contacts that are configured to be placed into physical and electrical contact with the flex circuit 106. When both the electrical connector 102 and the optical engine 104 are mounted to the flex circuit 106, the flex circuit 106 can transmit electrical signals from the optical engine 104 to the electrical connector 102 and/or vice versa. Thus, the flex circuit 106 places the optical engine 104 in electrical communication with the electrical connector 102. Thus, the optical engine 104 can be configured to transmit electrical signals to the electrical connector 102, and can be further configured to receive electrical signals from the electrical connector 102.

As described above, the optical transceiver 104 can include the optical fiber cable 110 or can be configured to be coupled to the optical fiber cable 110 that is, in turn, optically coupled to the optical engine 104 and allows transmission of optical signals from the optical engine to the optical fiber cable 110 and/or reception of optical signals by the optical engine from the optical fiber cable 110. The optical fiber cable 110 can be coupled to the optical engine at a location closer to the second surface 104b than the first surface 104a.

In one example, the optical engine 104 is configured to be mounted to the first surface 106a of the flex circuit 106 in a first orientation 28. In particular, the optical transceiver 104 defines a first surface 104a and a second surface 104b opposite the first surface along the transverse direction T. The first surface 104a can be mounted to the flex circuit 106 in one example. In particular, the optical engine 104 can be mounted to the first surface 106a of the flex cable 106. However, as will be appreciated from the description below, the optical transceiver 104 can alternatively be mounted to the second surface 106b of the flex cable 106.

The flex circuit 106 allows each of the compression connector 102 and the engine 104 to be properly seated when mounted despite possible misalignment due to component fabrication, assembly process tolerances, or the like. It should be recognized that in FIG. 13, the optical engine 104 is mounted to the flex circuit 106 in a first orientation 28 with respect to the host substrate 114. In the first orientation, the first surface 104a of the optical engine 104 can attach to the first surface 106a of the flex circuit 106.

Figure 14A:
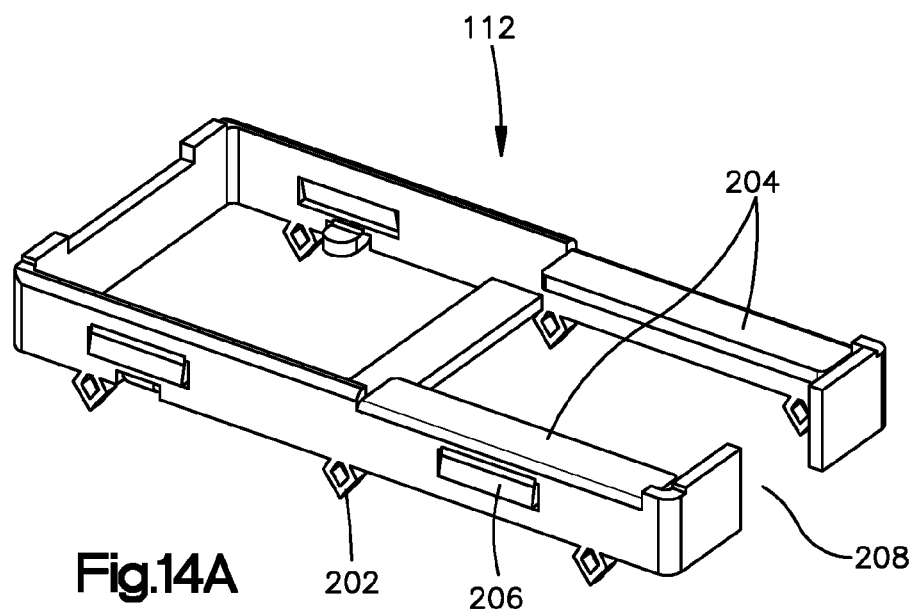
FIG. 14A is a perspective view of a cage according to an embodiment.
Figure 14B:
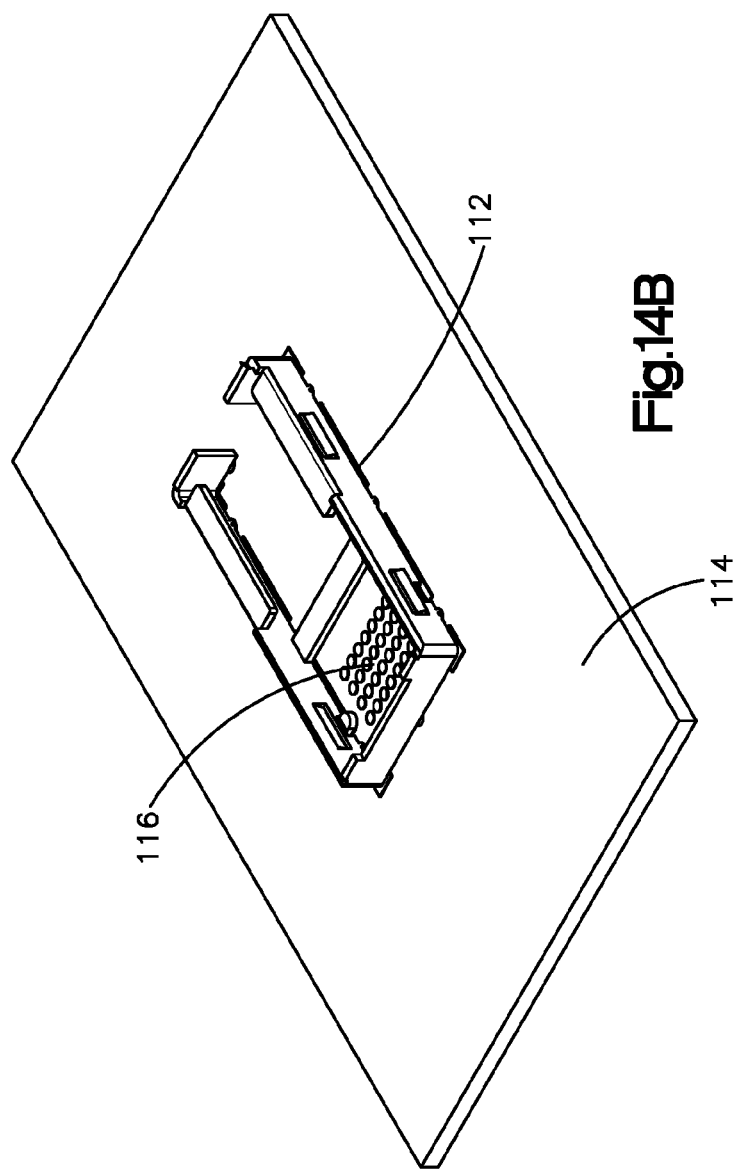
FIG. 14B is a perspective view of the cage illustrated in FIG. 14A mounted to a host substrate according to an embodiment.
Figure 14C:
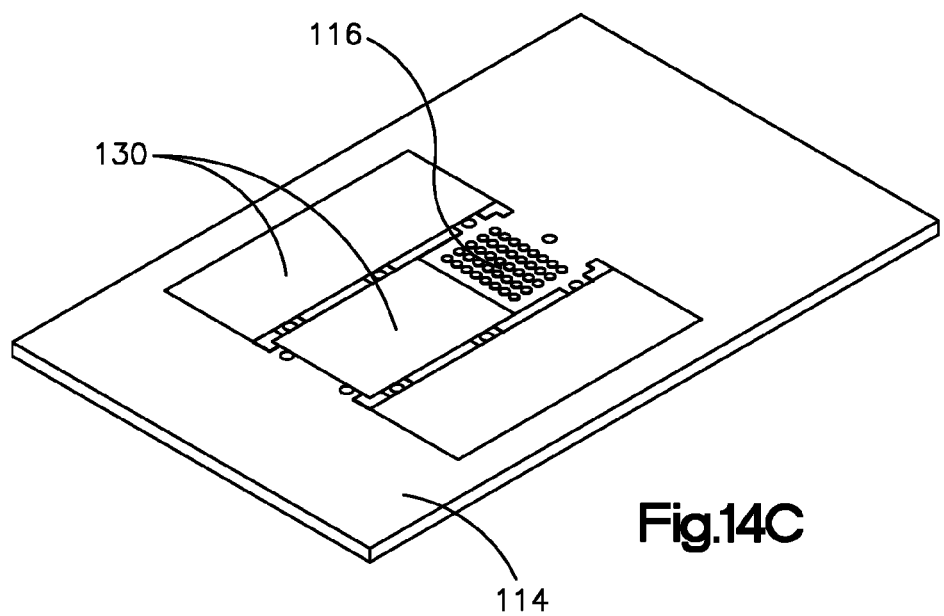
FIG. 14C is a perspective view of the host substrate illustrated in FIG. 14B.

Referring now to FIGS. 14A-14C, a communication system 200 (see also FIG. 15) can include a cage 112 that can enclose at least a portion of the transceiver 100. In particular, the cage 112 may be electrically conductive. In one example, the cage 112 can be formed from sheet metal by stamping and bending operations. The cage 112 can be configured to be mounted to a host substrate 114. For instance, the cage 112 can include press fit tails 202 that may be used to mount the cage 112 to a host substrate 114 (see FIG. 14B). In one example, the press-fit tails 202 can be configured as eye-of-the-needle tails. As described above, the host substrate 114 can be configured as a printed circuit board (PCB). It should be appreciated that the cage 112 can be mounted to the host substrate 114 in any suitable manner as desired including, but not limited to, soldering, press-fitting, crimping, staking, or adhesive bonding. The cage 112 can include thermal contact regions 204 that provide a heat transfer path for heat generated by the optical transceiver 104. The cage 112 can define an opening 208 that provides clearance for the optical fiber cable 110. The cage 112 can also include at least one latch member 206 configured to secure to a lid 118 (see FIGS. 16 and 19). The at least one latch member 206 can be defined by stamped-out side wall regions. Thus, the cage 112 can include a plurality of latch members, including a pair of latch members 206. Alternatively, the cage 112 can be a molded structure having inserts that are configured to attach to the host substrate and the lid. For instance, the cage 112 can be a molded polymer. The polymer can be metal filled to increase its thermal and electrical conductivity. The cage 112 could also be formed by overmolding metallic inserts to provide low thermal resistance, structural reinforcements, attachment points and EMI shielding or any combination of these, along with a polymer. The cage 112 can also be formed by metal injection molding.

Figure 15:
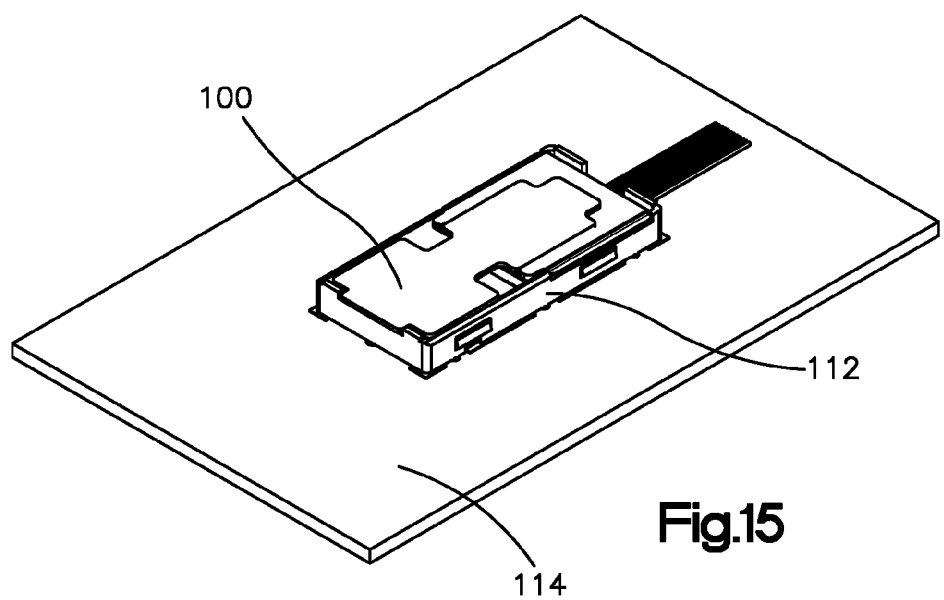
FIG. 15 is a perspective view of a communication system including the transceiver illustrated in FIG. 13 surrounded by the cage illustrated in FIG. 14B, such that the electrical connector is mounted to the host substrate.

The transceiver 100 may be mounted onto the host substrate 114 as shown in FIGS. 14B and 15. In particular, the cage 112 can be mounted to the host substrate 114, and at least a portion up to an entirety of the transceiver 100 can be disposed in the cage 112. As described above, the cage 112 can be mounted to the host substrate 114 using press-fit tails, solder tails, surface mount technology, adhesive, mechanical fasteners or by any suitable means. The host substrate 114 may include a plurality of electrical contact locations 115 configured to mate with complementary electrical contacts of the connector 102. The electrical contacts of the PCB 114 and the electrical contacts 210 of the connector 102 can define a separable interface. Thus, the connector 102 can be repeatedly mated and unmated with the host substrate 114 without destroying the electrical contacts of the host substrate 114, the electrical contacts 210 of the electrical connector 102, or both. The electrical contact locations 115 of the PCB 114 can be configured as a land grid array (LGA) 116. The LGA 116 can be contained within a footprint of the cage 112. The LGA 116 can be disposed at an electrical contact region of the host substrate 114. The placement of the cage 112 and LGA 116 can be controlled so that the cage 114 and the LGA 116 define a relative spatial relationship that is within the alignment tolerance of the electrical connector 102 such that the mating ends 107 of the electrical contacts 210 of the electrical connector 102 contact the LGA 116 pads. A high-speed processor, such as an integrated circuit (IC) can be mounted to the host substrate 114 at a location adjacent the cage 112.

It should therefore be appreciated that the electrical connector 102 is configured to mate with a complementary electrical device. In one example, the complementary electrical device can be configured as the LGA 116. Further, because the optical engine 104 is in electrical communication with the electrical connector 102, the optical engine 104 is similarly configured to be placed in electrical communication with the complementary electrical device. Further still, the optical engine 104 is configured to be placed in electrical communication with electrical traces of the host substrate through the complementary electrical device. Thus, it can be said that the optical engine 104 is configured to be placed in electrical communication with the complementary electrical device while the optical engine 104 is in a first orientation with respect to the complementary electrical device.

The host substrate 114 can also include at least one thermal plane 130 that covers a majority of the footprint of the cage 112 that is not covered by the LGA 116 as shown in FIG. 14C. The thermal plane 130 can extend outside of the footprint of the cage 112. The thermal plane 130 can be in thermal communication with the optical transceiver 104 through the base 108 and cage 112 and help to dissipate heat generated by the optical transceiver 104. In some embodiments, the thermal plane 130 may be an internal layer in the host substrate 114 and not visible on the host substrate 114 top surface. The cage 112 can be electrically and thermally connected to the thermal plane 130 in the host substrate 114 when the cage 112 is mounted to the host substrate 114. The thermal plane could be further connected to heat dissipation member and carry the heat generated by the transceiver away from the transceiver.

Referring now to FIG. 15, the communication system 200 can include the host substrate 114 and the transceiver 100, and the cage 112. As described above, the transceiver 100, and in particular the electrical connector 102, can be mated to the host substrate 114 in the cage 112. In particular, the mating ends of the electrical contacts of the electrical connector 102 are mated to respective ones of the electrical contacts of the host substrate 114 that defines the LGA. The transceiver 100 can be inverted when it is mated to the host substrate 114, so that components of the optical engine 104 are disposed between the host substrate 114 and the base 108 with respect to the transverse direction T. However, as will be appreciated from the description below, other arrangements are contemplated. The cage 112 may be electrically conductive, such as made of metal, and be electrically connected to the thermal plane 130 of the host substrate 114.

Figure 16:
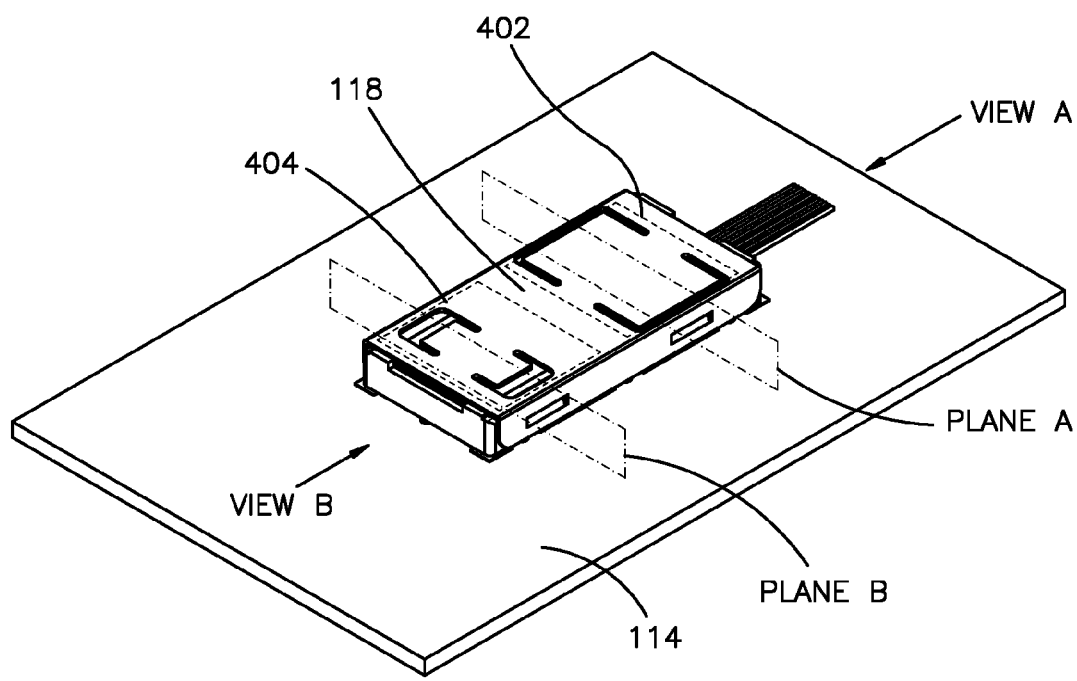
FIG. 16 is a perspective view of the communication system illustrated in FIG. 15, further including a lid that is mounted to the cage.

Referring now to FIG. 16, the communication system 200 can include a lid 118 that is configured to cover the optical transceiver. In one example, the lid 118 can be mounted to the cage 112. It should be appreciated, however, that the lid 118 can mount to any suitable alternative structure, such as the host substrate 114. The lid 118 and cage 112 can combine with the host substrate 114 as to define an internal space that receives the transceiver. Thus, the lid 118, the cage 112, and the host substrate 114 can combine so as to enclose the electrical connector 102, the flex circuit 106, and the optical engine 104. The base 108, the flex circuit 106, and the electrical connector 102 can be captured between the host substrate 114 and the lid 118 with respect to the transverse direction T. The lid 118 can be electrically conductive and in electrical contact with the cage 112. Together with the thermal plane 130 of the host substrate 114, the lid 118 and the cage 112 can define a Faraday cage around the transceiver 100. Accordingly, electromagnetic interference (EMI) generated during operation of the optical transceiver 100 can be confined within the internal space defined by the lid 118, the cage 112, and the host substrate 114, and in particular the thermal plane 130 of the host substrate 114. EMI that is radiated or conducted from the optical transceiver 100 toward electrical elements that are disposed near the optical transceiver 100 can thus be reduced or eliminated by the Faraday cage. Similarly, the Faraday cage may protect the optical transceiver 104 against externally generated EMI.

FIG. 16 also shows two regions of the lid 118, including an optical engine region 402 and an electrical connection region 404. In the optical engine region 402 the lid 118 is configured to push down on the base 108 toward the host substrate 114 along the transverse direction. In the electrical connection region 404, the lid 118 is configured to push down on the electrical connector 102 toward the host substrate 114 along the transverse direction T. As is described in more below, the lid 118 can have properties in the optical engine region 402 and different properties in the electrical connection region 404.

Figure 17:
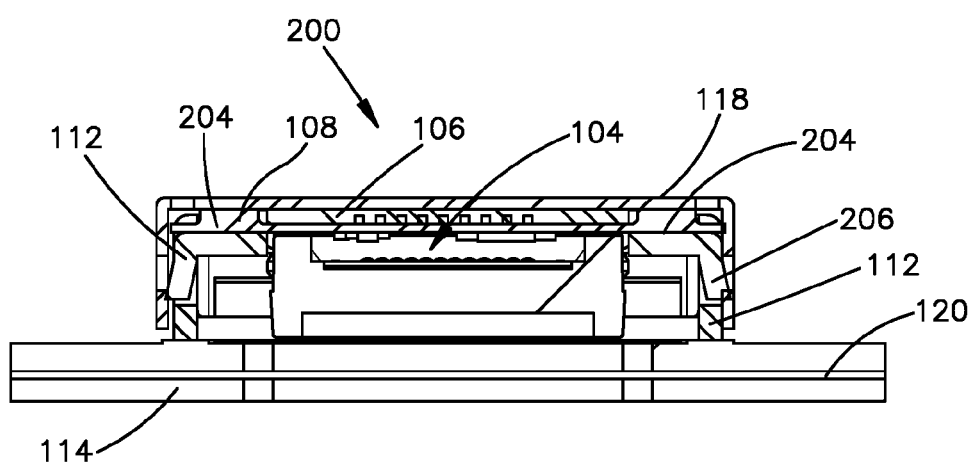
FIG. 17 is a cross-sectional view through an optical engine region of the communication system, taken along plane A illustrated in FIG. 16.

Referring now to FIG. 17, the host substrate 114 can include a metallized layer or region 120 that is in electrical contact with an electrical ground on the host substrate 114 and the cage 112. The metallized region 120 can be disposed within the host substrate 114 such that electrical contact between the cage 112 and host substrate 114 is made by the press fit tail 202. Alternatively or additionally, the metallized region 120 may be disposed on a top surface of the host substrate 114, as shown with respect to the thermal plane 130 in FIG. 14C. The top surface of the host substrate 114 can face upward toward the optical transceiver 104. The base 108 can be in direct contact with the thermal contact regions 204 of the cage 112. In particular, the base 108 can be compressed against the thermal contact regions 204 by the lid 118. The compression force is produced by elastically deforming the lid 118 as it is mounted to the cage 112. The compressive force and relatively large thermal contact regions 204 can provide a low impedance thermal path for heat generated by the optical transceiver 104 to be transferred into the cage 112. The metallized region 120 of the host substrate 114 is in thermal contact with the cage 112 and helps provide a low impedance thermal transfer path into the host substrate 114 and away from the optical transceiver 104. In other embodiments, the host substrate 114 can include metallized layers at the top or bottom thereof, alone or in combination with at least one internal metallized layer. The host substrate 114 can include metal-filled thru vias to facilitate heat transfer between the top and bottom surfaces of the host substrate 114. The metalized regions and/or thru hole metal-filled vias can be in thermal contact with an external heat sink 900 (see FIG. 21) having either dedicated pins or fins, or with structural holders and frame elements. The external heat sink and/or structural and frame elements can dissipate heat generated in the optical transceiver 104 during its operation.

Figure 18:
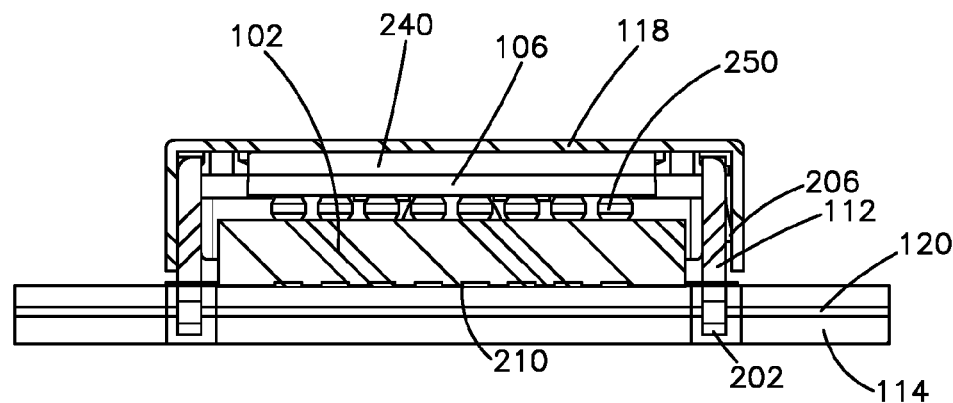
FIG. 18 is a cross-sectional view through an electrical connection region of a communication system, taken along plane B illustrated in FIG. 16.

Referring now to FIG. 18, and as described above, the press-fit tails 202 can mount the cage 112 to the host substrate 114. The electrical connector 102 may include elastically deformable electrical contacts 210 to make electrical contact with the LGA 116 on the top surface of the host substrate 114. When the electrical connector 102 is placed in electrical communication with the flex circuit 106 and the host substrate 114, the flex circuit and host substrate 114 are placed in electrical communication with each other. The lid 118 can provide a compressive force that compresses the deformable electrical contacts against the LGA 116. The communication system 200 can further include a bolster plate 240 that is disposed on the opposite side of the flex circuit 106 from the electrical connector 102 to stiffen the flex circuit 106. Thus, the bolster plate 240 can bear against the second surface 106b of the flex circuit 106. In one example, the electrical connection between the flex circuit 106 and compression connector 102 is made with a ball grid array (BGA) 250. In other embodiments, an electrical connection to the host circuit board may be made by a BGA and the connection to the flex can be by elastically deformable electrical contacts similar to the electrical contacts 210. In yet other embodiments, the electrical connector 102 can be configured to define a separable interface with the flex circuit 106. Thus, the connector 102 can be repeatedly mated and unmated with the flex circuit 106 without destroying the electrical contacts 210 of the electrical connector 102, the flex circuit 106, or both. In one example, the electrical contacts 210 can be compressible on both sides of electrical connector 102. Further, the electrical contacts 210 of the electrical connector 102 described herein can be replaced by a BGA, or wire bond with adhesive covering process to place the flex circuit 106 in electrical communication with the host substrate 114.

The flex circuit 106 allows for mechanical float between the electrical connector 102 and the base 108 along the transverse direction T, which can be oriented substantially perpendicular to the top and bottom surfaces of the host substrate 114. The lid 118 can thus simultaneously compress both 1) the electrical connector 102 against the LGA 116, and 2) the base 108, and thus the optical engine, against the cage 112. In particular, the lid can compress the base 108 against the thermal contact regions 204 of the cage 112 in the manner described above. Without mechanical float, it would be difficult and expensive to produce and assemble the transceiver elements within the necessary mechanical tolerance to simultaneously and optimally compress both the electrical contact region and thermal contact region(s) of the communication subassembly 100 against their respective regions on the host substrate 114 and cage 112.

Figure 19:
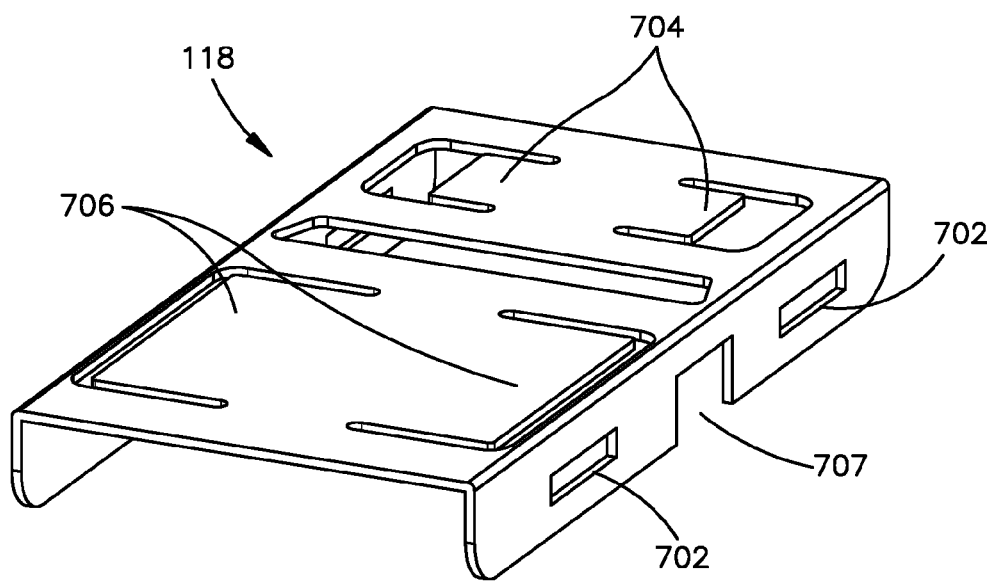
FIG. 19 is a perspective view of the lid illustrated in FIG. 16.

Referring now to FIG. 19, the lid 118 defines opposed sides that can each have at least one engagement member that is configured to engage with a respective one of the latch members 206 of the cage 112 so as to attach the lid 118 to the cage 112. The at least one engagement member can be configured as a respective aperture 702 that extends through the lid 118. In one example, each side of the lid can define respective first and second apertures 702. The apertures 702 are configured to receive respective ones of the latch members 206 when the lid 118 is mounted to the cage 112. The lid 118 can be elastically deformed when it is installed on the cage 112. In particular, the lid 118 can include a connector flexure member 704 that is configured to apply a compressive force that urges the electrical connector 102 down against the host substrate 104. The lid 118 can further include a base flexure member 706 urges the base 108 down toward the host substrate 114. It is recognized that the terms "down" and "up" and derivatives thereof are used herein with reference to the figures in the respective orientations illustrated, it being recognized that the actual directions can vary during use. The base flexure member 706 can be bent, so that it primarily supplies a compressive force over the thermal contact regions 204 of the cage 112. It should be appreciated that in some examples, the connector flexure members 704 does not directly contact the electrical connector 102, but may press against it through the bolster 109 and flex circuit 106. Thus, the connector flexure member 704 can urge the electrical connector 102 directly or indirectly against the underlying host substrate 114. The connector flexure member 704 can be relatively flat, and the lid 118 can be bent, such that the connector flexure member 704 compresses the electrical connector 102 substantially uniformly across its bottom surface against the host substrate 114 when the lid 118 is mounted to the cage 112. The lid 118 can further include an off-center notch 707 that keys the lid 118 with the cage 112 so that it cannot be mounted to the cage in any orientation other than the desired predetermined orientation.

It should be appreciated that the communication system 200 can achieve a relatively low height of the optical transceiver 104 above the host substrate 114 along the transverse direction T. In one example, the height can be less than 2.5 mm. Further, the transceiver 100 is configured to mate to the complementary electrical device in the form of the LGA at a location outboard of the optical engine 104. The cage 112 and lid 118 combine to define a sturdy and rigid retention member for the optical transceiver 104 disposed in the internal space. This, combined with the low mass of the optical transceiver 104, render the resulting communication system resilient to shock and vibration. Further, the low height allows use of optical transceivers in architectures where height is limited or at a premium. It also allows for a reduced board-to-board separation distance in card based systems. The low height of the optical transceiver can be provided by displacing the electrical contact region of the host substrate 114 from the optical transceiver along a direction substantially parallel to the major surfaces of the host substrate 114. Thus, the direction can be substantially perpendicular to the transverse direction T. Accordingly, the communication system 200 can be constructed such that the electrical connector 102 is not aligned with the optical transceiver 104 and host substrate 114 along the transverse direction T, as is the case with many conventional optical transceivers. Further, the optical transceiver can include a microprocessor or microcontroller or alternatively the microprocessor may be mounted on the host substrate 114. If the microprocessor is mounted on the host substrate 114, control signals to the optical transceiver can be directed through the electrical connector 102. Locating the control microprocessor outside of the optical transceiver can also help reduce the size of the optical transceiver.

Figure 20:
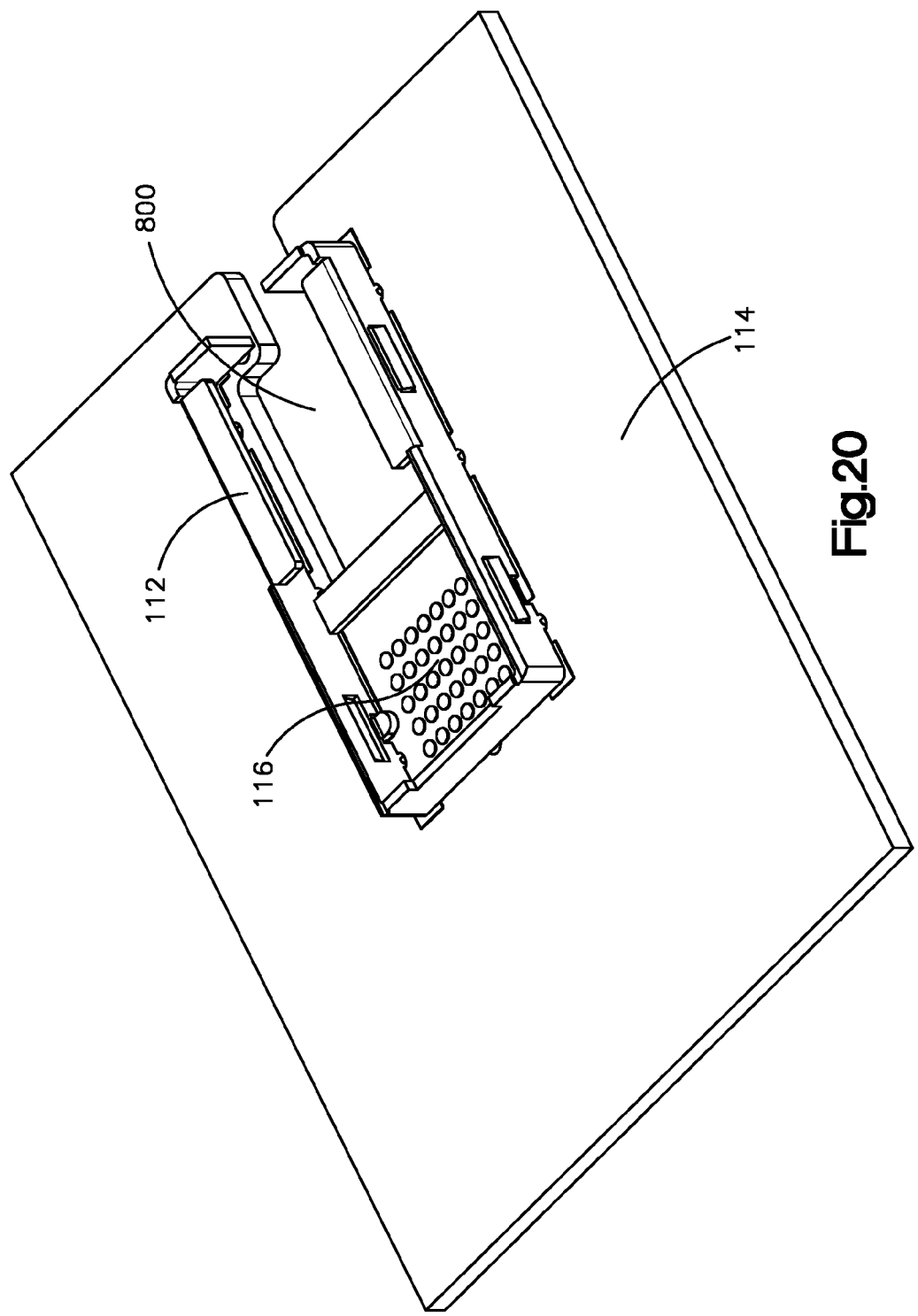
FIG. 20 is a perspective view of a host substrate similar to the host substrate illustrated in FIG. 14B, but showing the host substrate with a portion removed in another example.

Referring now to FIG. 20, it is recognized that the height of the optical transceiver above the host substrate 114 can be further reduced by removing a portion of the host substrate 114 within a mounting footprint of the cage 112. Thus, the host substrate 114 can define an aperture 800 that extends at least into the top surface of the host substrate 114 along the transverse direction T. In one example, the aperture 800 can extend entirely through the host substrate 114 along the transverse direction T. The optical engine 104 is typically taller than the electrical connector 102. The optical engine 104 can sit at least partially in the aperture 800, thereby reducing the height of the optical engine 104, and thus of the optical transceiver, with respect to the top surface of the host substrate 114. In some examples, the aperture 800 can extend into the top surface of the host substrate 114 but not through the host substrate 114, thereby creating a pocket that receives the optical transceiver 104. It is appreciated that the aperture 800 can reduce the height of the optical transceiver 104 as measured from the top surface of the host substrate 114 to less than 2 mm. For instance, the height can be less than 1.5 mm.

Figure 21:
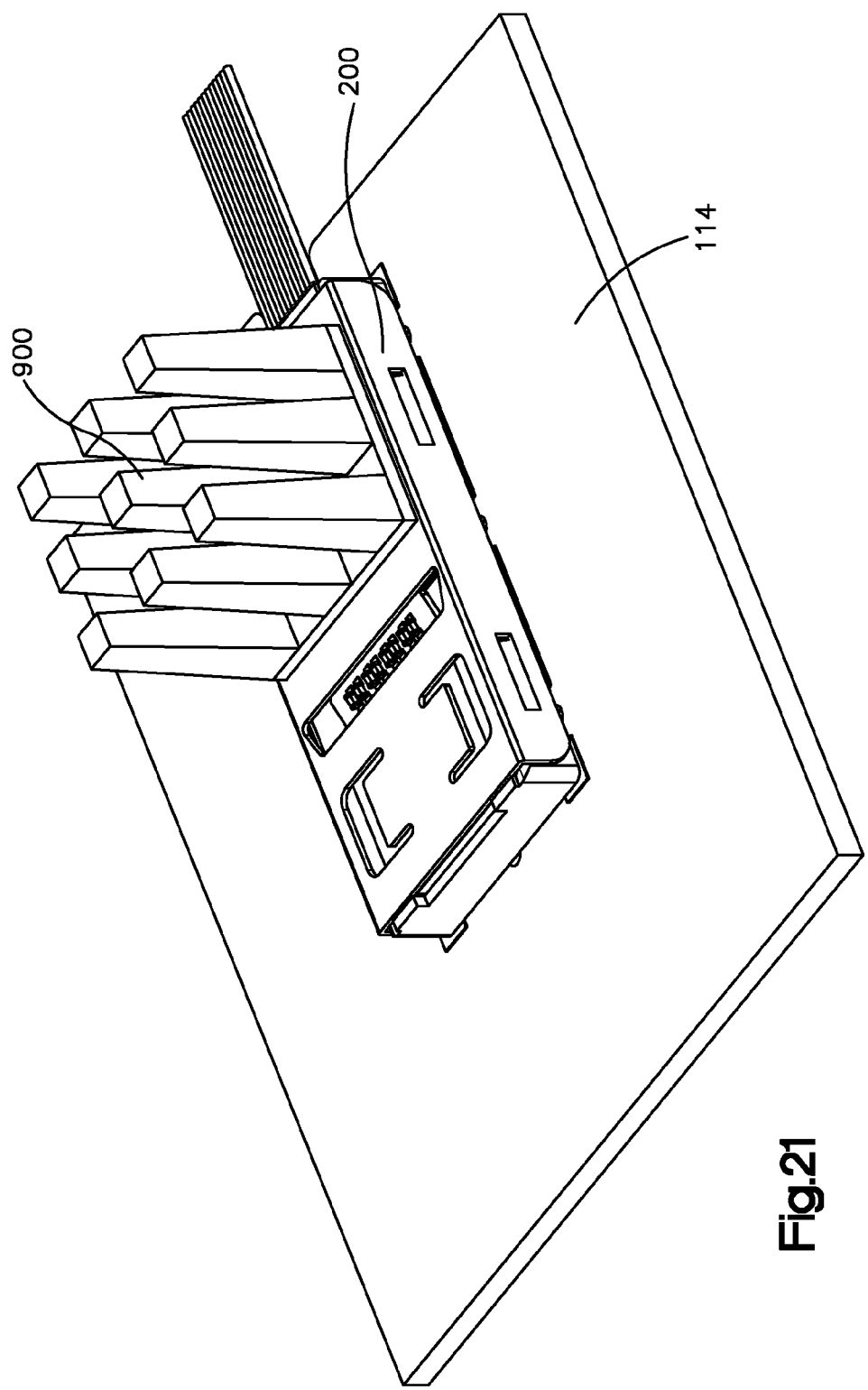
FIG. 21 is a perspective view of the communication system illustrated in FIG. 15, but shown including a heat sink constructed in accordance with one embodiment.

Referring now to FIG. 21, the communication system can include a heat sink 900 that extends out with respect to the optical transceiver 100. In particular, in one example, the heat sink 900 can mount to the base 108 to establish a low impedance thermal path between the optical transceiver 100 and the heat sink 900. Accordingly, the optical transceiver 100 can dissipate heat from the first surface 104a in certain examples. However, as will be appreciated from the description below, the optical transceiver 100 alternatively be configured to dissipate heat from the second surface 104b. While the heat sink 900 can be configure as a pin fin type heat sink as shown, other heat sink styles, such as fins, and the like may also be used. In one example, the heat sink 900 can be aligned with the optical engine 104 along the transverse direction T, and offset from the electrical connector 102 along a direction perpendicular to the transverse direction T. In another example, the heat sink 900 can be at least partially aligned with each of the optical engine 104 and the electrical connector 102 along the transverse direction T.

Figure 22:
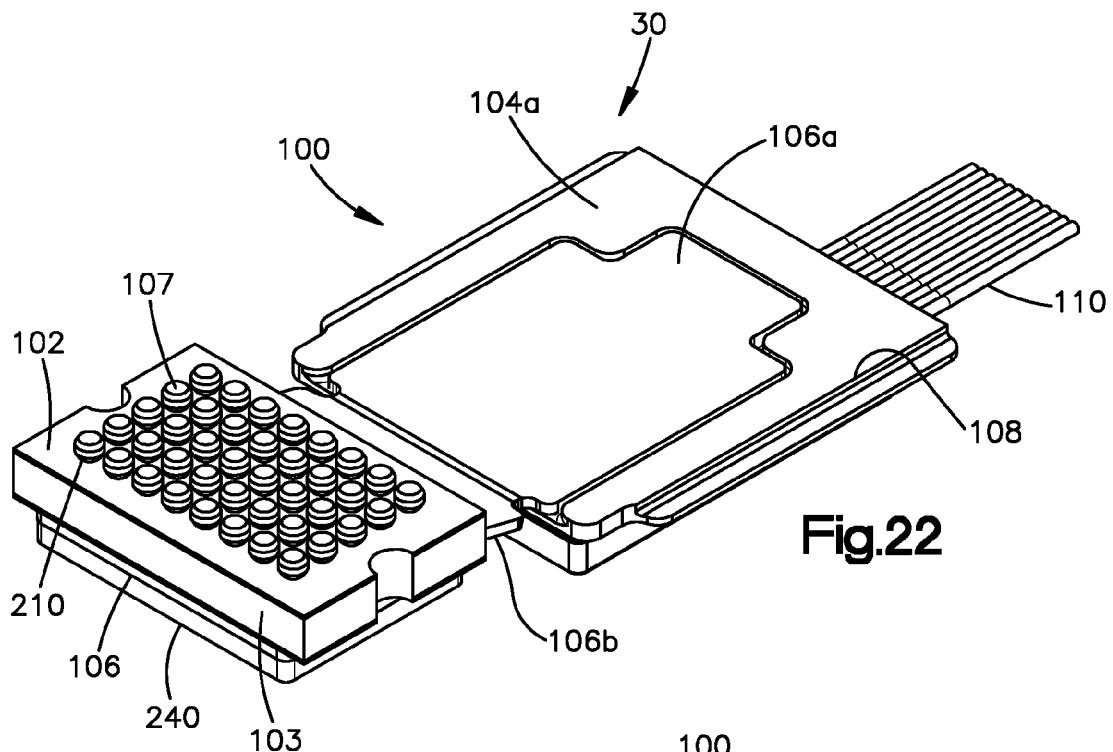
FIG. 22 is a perspective view of an optical transceiver similar to the optical transceiver illustrated in FIG. 13, but showing the optical engine mounted to the flex circuit in a second orientation.
Figure 23:
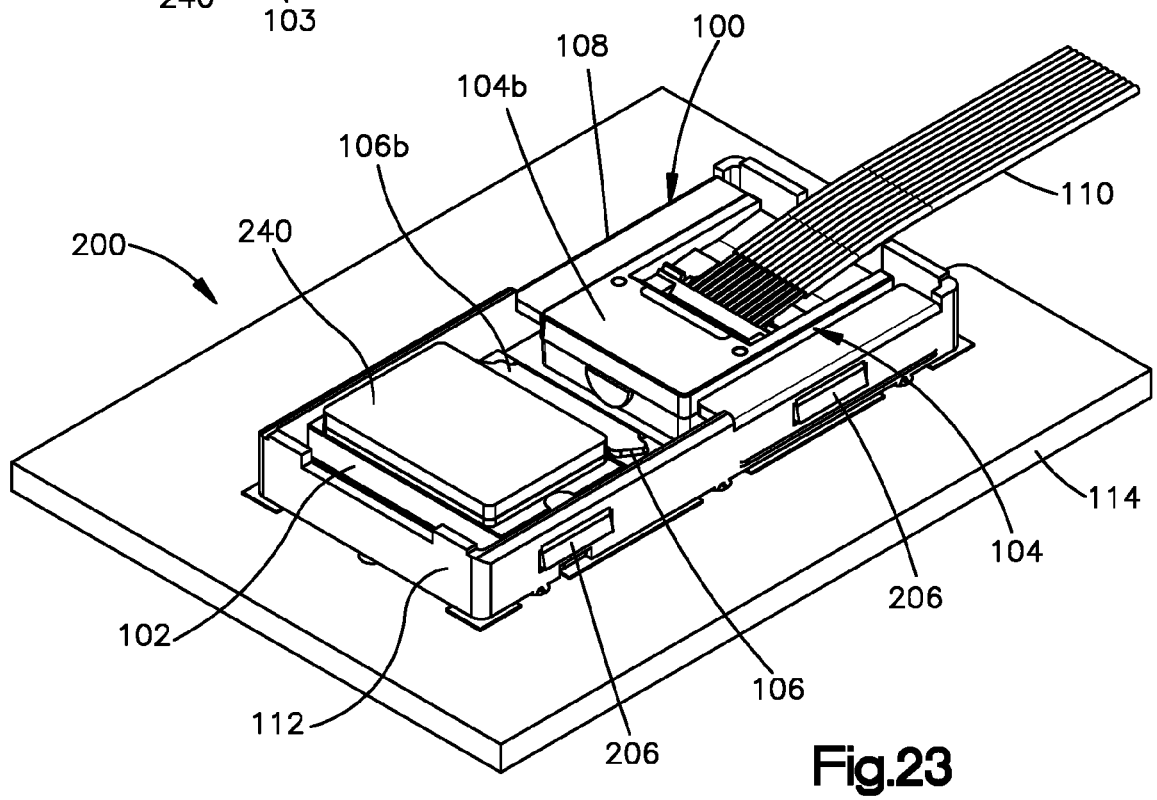
FIG. 23 is a perspective view of a communication system including the optical transceiver illustrated in FIG. 24 shown mounted to the host substrate.

Referring now to FIGS. 22-23, it is recognized that the optical engine 104 can be placed in electrical communication with the same complementary electrical device both when the optical engine 104 is in the first orientation 28 illustrated in FIG. 13, and in a second orientation 30 that is opposite the first orientation. In one example, the first and second orientations 28 and 30 can be with respect to the complementary electrical device. As described above, the complementary electrical device can be configured as the LGA 116. For instance, the transceiver 104 can be mounted to the flex circuit 106 and the base 108 in a second orientation 30 that is opposite the first orientation 28 illustrated in FIG. 13 with respect to the transverse direction T.

In particular, the first surface 104a of the transceiver can be mounted to the second surface 106b of the flex circuit 106. Thus, the electrical connector 102 and the transceiver 104 can be mounted to opposite surfaces of the flex circuit 106. Thus, the first surface 104a of the optical transceiver can be thermally conductive. For instance, the first surface 104a can be metallic and thermally conductive. Alternatively, the first surface 104a can be nonmetallic and thermally conductive. The second surface 104b can be thermally nonconductive. As illustrated in FIG. 23, the second surface 104b of the optical engine 104 can be spaced above the first surface 104a of the optical engine 104 when the transceiver is mated to the host substrate 114. In one example, the first surface 104a can be disposed between the flex circuit 106 and the second surface 104b with respect to the transverse direction T. Alternatively, the first surface 104a can be coplanar with the flex circuit 106. Further, the first surface 104a can face the host substrate 114 when the transceiver is mated to the host substrate 114 while the optical engine 104 is in the second orientation 30. When the optical engine 104 is in the first orientation 28 as illustrated in FIG. 15, the second surface 104b can face the host substrate 114 when the transceiver is mated to the host substrate 114. Further, the first surface 104a can be spaced above the second surface 104b.

The cage 112 can be mounted to the host substrate 114 in the manner described above. The communication subassembly 100 can be mounted to the host substrate 114 in the cage 112 in the manner described above, so as to thereby define the communication system 200. In particular, the electrical connector 102 can be mated to the host substrate 114 so as to define the communication system 200. When the electrical connector 102 is mated to the host substrate 114, the mating ends 107 of the electrical contacts of the electrical connector 102 are mated to respective ones of the electrical contacts of the host substrate 114 that defines the LGA. In particular, the mating ends 107 can be compressed against the electrical contacts of the host substrate 114. When the communication assembly 100 is mated to the host substrate 114, it should be appreciated that the transceiver 100 can be inverted in the manner described above. However, in FIG. 23, the optical engine 104 is in the second orientation 30 that is opposite the first orientation illustrated in FIG. 15 with respect to the transverse direction T. In particular, the first surface 104a is disposed between the host substrate 114 and the second surface 104b with respect to the transverse direction T when the optical engine 104 is in the second orientation 30. The lid can be installed onto the cage 112 in the manner described above, such that the lid compresses the first surface 104a against the host substrate 114, either directly or indirectly. The communication system 200 can further include the bolster plate as described above to stiffen the flex circuit 106.

The electrical compression connector described in above could be replaced by an edge connector, a ZIF (zero insertion force) connector, or any other type of low profile connector including connectors that reside or partially reside in the thickness of the host substrate, either in one or more recesses or cut outs of the host substrate. It should be understood that terms such as top, bottom, up, down, right, left, sides, vertical, and horizontal are relative terms and the embodiments described herein can be used in any orientation.

It should be noted that the illustrations and discussions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

What is claimed is:

1. An optical transceiver comprising:
    a transceiver housing defining a first surface and a second surface opposite the first surface along a transverse direction;
    a plurality of electrical contacts supported by the transceiver housing;
    an optical engine supported by the transceiver housing and in electrical communication with respective ones of the electrical contacts; and
    wherein the electrical contacts are configured to be selectively placed in electrical communication with a complementary electrical device both when the optical transceiver is in a first orientation with respect to the electrical device, and when the optical transceiver is in a second orientation that is different than the first orientation, and wherein the complementary electrical device is configured to be placed in electrical communication with a host substrate.

2. The optical transceiver as recited in claim 1, further comprising at least one optical fiber, wherein the optical transceiver defines at least one optical path that extends between the optical engine and the at least one optical fiber.

3. The optical transceiver as recited in claim 1, wherein the first and second orientations are opposite each other along the transverse direction, such that the first surface faces the substrate along the transverse direction when the transceiver is in the first orientation and the electrical connector is mounted to the substrate, and the first surface faces away from the substrate along the transverse direction when the transceiver is in the second orientation and the electrical connector is mounted to the substrate.

4. The optical transceiver as recited in claim 1, wherein the first and second orientations are opposite each other along a direction that is oriented perpendicular to the transverse direction.

5. The optical transceiver as recited in claim 4, wherein the first surface faces the substrate both when the transceiver is in the first orientation and when the transceiver is in the second orientation.

6. The optical transceiver as recited in claim 4, wherein the first surface faces away from the substrate both when the transceiver is in the first orientation and when the transceiver is in the second orientation.

7. The optical transceiver as recited in claim 1, wherein the first surface is thermally conductive.

8. The optical transceiver as recited in claim 7, wherein the first surface is metallic.

9. The optical transceiver as recited in claim 8, wherein the transceiver housing comprises an electrically nonconductive body, and respective portions of the electrical contacts are embedded in the electrically nonconductive body so as to be electrically isolated from the metallic first surface.

10. The optical transceiver as recited in claim 9, wherein the electrically nonconductive body comprises first and second electrically nonconductive layers, and the respective portions of the electrical contacts are disposed at an interface of the first and second electrically nonconductive layers.

11. The optical transceiver as recited in claim 10, wherein the first and second layers comprise different electrically nonconductive materials.

12. The optical transceiver as recited in claim 10, wherein the first and second layers comprise the same electrically nonconductive material.

13. The optical transceiver as recited in claim 7, wherein the first surface is non-metallic.

14. The optical transceiver as recited in claim 13, wherein the first surface comprises ceramic.

15. The optical transceiver as recited in claim 7, wherein the first surface is in thermal communication with the optical engine.

16. The optical transceiver as recited in claim 2, wherein the optical fibers are supported at a location disposed closer to the second surface than the first surface with respect to the transverse direction.

17. The optical transceiver as recited in claim 1, wherein the electrical contacts define respective mating ends that are configured to mate with respective ones of complementary electrical contacts of the complementary electrical device both when the transceiver is in the first orientation and when the transceiver is in the second orientation, and the mating ends self-center with the complementary electrical contacts when the transceiver is mated with the electrical connector.

18. The optical transceiver as recited in claim 1, further comprising a first motion limiter element configured to engage a complementary motion limiter element of the electrical connector so as to limit movement of the transceiver with respect to the electrical connector along the transverse direction when the transceiver is mated with the electrical connector.

19. A method of placing an optical engine in electrical communication with a complementary electrical device when the optical engine is selectively oriented in one of first and second orientations that are different than each other, whereby the optical engine is configured to be placed in electrical communication with the complementary electrical device in each of the first and second orientations.

20. The method as recited in claim 19, further comprising the step of placing the optical engine in electrical communication with a host substrate through the complementary electrical device.

21. The optical transceiver as recited in claim 1, wherein the first surface is configured to be placed in thermal communication with a heat dissipation member.

* * * * *